United States Patent
Abe

(10) Patent No.: US 10,581,518 B2
(45) Date of Patent: Mar. 3, 2020

(54) OPTICAL TRANSMISSION/RECEPTION DEVICE, OPTICAL COMMUNICATION SYSTEM, AND OPTICAL COMMUNICATION METHOD

(71) Applicant: NEC Corporation, Tokyo (JP)

(72) Inventor: Ryota Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/920,847

(22) Filed: Mar. 14, 2018

(65) Prior Publication Data

US 2018/0205453 A1 Jul. 19, 2018

Related U.S. Application Data

(63) Continuation of application No. 15/129,105, filed as application No. PCT/JP2015/001579 on Mar. 20, 2015, now Pat. No. 9,954,607.

(30) Foreign Application Priority Data

Mar. 27, 2014 (JP) ................................. 2014-066137

(51) Int. Cl.
H04B 10/03 (2013.01)
H04B 10/07 (2013.01)
(Continued)

(52) U.S. Cl.
CPC .......... *H04B 10/03* (2013.01); *H04B 10/296* (2013.01); *H04B 10/80* (2013.01); *H04B 10/85* (2013.01);
(Continued)

(58) Field of Classification Search
None
See application file for complete search history.

(56) References Cited

U.S. PATENT DOCUMENTS 6,411,411 B1 * 6/2002 Okazaki .............. H04J 14/0221
359/578
8,009,985 B1 * 8/2011 Roberts .................... H04J 3/14
398/47
(Continued)

FOREIGN PATENT DOCUMENTS

CN 102474379 A 5/2012
CN 103460623 A 12/2013
(Continued)

OTHER PUBLICATIONS

Extended European Search Report issued by the European Patent Office for the European Application No. 15769619.6 dated Oct. 17, 2017 (8 pages).
(Continued)

*Primary Examiner* — Shi K Li
(74) *Attorney, Agent, or Firm* — Wilmer Cutler Pickering Hale and Dorr LLP

(57) ABSTRACT

[Problem] To provide an optical transmission/reception device, an optical communication system, an optical communication method, and a program which are capable of securing the confidentiality of information included in an optical signal even when the optical signal is transferred to a device that is not an original transmission destination device.

[Solution] This optical transmission/reception device is provided with: a wave separation unit for receiving a wavelength-multiplexed optical signal and separating the same into a plurality of optical signals; a plurality of reception units for receiving each of the plurality of optical signals separated by the wave separation unit; a plurality of output units for outputting optical signals differing in wavelength from each other; a control unit for requesting, in response to the inclusion in the received wavelength-multiplexed optical signal of an optical signal to which a prescribed process has (Continued)

been applied, that a prescribed change be applied to the optical signal outputted by at least one of the plurality of output units; and a wave combining unit for combining the plurality of optical signals outputted from the plurality of output units and outputting the combined signal.

16 Claims, 37 Drawing Sheets

(51) Int. Cl.
  *H04B 10/85* (2013.01)
  *H04B 10/296* (2013.01)
  *H04B 10/80* (2013.01)
  *H04J 14/02* (2006.01)
(52) U.S. Cl.
  CPC ........ *H04J 14/021* (2013.01); *H04J 14/0221* (2013.01); *H04J 14/02* (2013.01)

(56) References Cited

U.S. PATENT DOCUMENTS

| 9,954,607 | B2* | 4/2018 | Abe | H04B 10/85 |
| 2005/0158055 | A1* | 7/2005 | Fukushima | H04B 10/2569 |
| | | | | 398/152 |
| 2005/0168806 | A1* | 8/2005 | Maeda | H04J 14/0291 |
| | | | | 359/341.4 |
| 2011/0311216 | A1 | 12/2011 | Inoue | |
| 2012/0027107 | A1* | 2/2012 | Takahashi | H04L 25/4915 |
| | | | | 375/259 |
| 2012/0263476 | A1* | 10/2012 | Sabet | H04B 10/0705 |
| | | | | 398/104 |
| 2013/0058647 | A1* | 3/2013 | Boertjes | H04B 10/0775 |
| | | | | 398/38 |
| 2015/0172173 | A1* | 6/2015 | Mitsumori | H04L 45/28 |
| | | | | 370/225 |
| 2016/0006512 | A1 | 1/2016 | Konishi et al. | |
| 2016/0308638 | A1* | 10/2016 | Zhang | H04J 14/0205 |

FOREIGN PATENT DOCUMENTS

| JP | 2010-098547 A | 4/2010 |
| JP | 2011-082751 A | 4/2011 |
| JP | 2012-160947 A | 8/2012 |
| JP | 2012-182725 A | 9/2012 |
| JP | 2012-531866 A | 12/2012 |
| JP | 2014-513477 A | 5/2014 |
| JP | 2017-509183 A | 3/2017 |
| WO | WO-2011/000786 A1 | 1/2011 |
| WO | WO-2012/142426 A1 | 10/2012 |

OTHER PUBLICATIONS

International Search Report corresponding to PCT/JP2015/001579, dated Apr. 21, 2015 (3 pages).
Written Opinion corresponding to PCT/JP2015/001579, dated Apr. 21, 2015 (5 pages).
Chinese Notification of First Office Action issued in Chinese Patent Application No. 201580016934.7, dated Jan. 26, 2018, 14 pages.
Japanese Decision to Grant issued in Japanese Patent Application No. 2018-080760, dated Aug. 6, 2019, 3 pages.

* cited by examiner

FIG. 33

| OPTICAL SIGNAL TRANSMITTED IN INTERVAL BETWEEN A BASE STATION 10-1 ⇔ BU30 | | OPTICAL SIGNAL TRANSMITTED IN INTERVAL BETWEEN B BASE STATION 10-2 ⇔ BU30 | |
|---|---|---|---|
| 1 | OPTICAL SIGNAL TRANSMITTED/RECEIVED BETWEEN "A BASE STATION 10-1 14-1-A" AND "B BASE STATION 10-2 14-1-B" | 1 | OPTICAL SIGNAL TRANSMITTED/RECEIVED BETWEEN "A BASE STATION 10-1 14-1-A" AND "B BASE STATION 10-2 14-1-B" |
| 2 | OPTICAL SIGNAL TRANSMITTED/RECEIVED BETWEEN "A BASE STATION 10-1 14-2-A" AND "B BASE STATION 10-2 14-2-B" | 2 | OPTICAL SIGNAL TRANSMITTED/RECEIVED BETWEEN "A BASE STATION 10-1 14-2-A" AND "B BASE STATION 10-2 14-2-B" |
| 3 | OPTICAL SIGNAL TRANSMITTED/RECEIVED BETWEEN "A BASE STATION 10-1 14-3-A" AND "C BASE STATION 10-3 14-1-C" | 3 | OPTICAL SIGNAL TRANSMITTED/RECEIVED BETWEEN "B BASE STATION 10-2 14-3-B" AND "D BASE STATION 10-4 14-1-D" |
| 4 | OPTICAL SIGNAL TRANSMITTED/RECEIVED BETWEEN "A BASE STATION 10-1 14-4-A" AND "C BASE STATION 10-3 14-2-C" | 4 | OPTICAL SIGNAL TRANSMITTED/RECEIVED BETWEEN "B BASE STATION 10-2 14-4-B" AND "D BASE STATION 10-4 14-2-D" |
| 5 | OPTICAL SIGNAL TRANSMITTED/RECEIVED BETWEEN "A BASE STATION 10-1 14-5-A" AND "C BASE STATION 10-3 14-3-C" | 5 | OPTICAL SIGNAL TRANSMITTED/RECEIVED BETWEEN "B BASE STATION 10-2 14-5-B" AND "D BASE STATION 10-4 14-3-D" |

FIG. 35

| | OPTICAL SIGNAL TRANSMITTED IN INTERVAL BETWEEN A BASE STATION 10-1 ⇔ BU30 | | OPTICAL SIGNAL TRANSMITTED IN INTERVAL BETWEEN B BASE STATION 10-2 ⇔ BU30 | |
|---|---|---|---|---|
| | OPTICAL SIGNAL TRANSMITTED/RECEIVED BETWEEN "A BASE STATION 10-1 14-1-A" AND "B BASE STATION 10-2 14-1-B" | OPTICAL SIGNAL TRANSMITTED/RECEIVED BETWEEN "A BASE STATION 10-1 14-2-A" AND "B BASE STATION 10-2 14-2-B" | OPTICAL SIGNAL TRANSMITTED/RECEIVED BETWEEN "A BASE STATION 10-1 14-1-A" AND "B BASE STATION 10-2 14-1-B" | OPTICAL SIGNAL TRANSMITTED/RECEIVED BETWEEN "A BASE STATION 10-1 14-2-A" AND "B BASE STATION 10-2 14-2-B" |
| 1 | | | 1 | 2 |
| 2 | | | | |
| 3 | DISAPPEAR | | 3 | DISAPPEAR |
| 4 | DISAPPEAR | | 4 | DISAPPEAR |
| 5 | DISAPPEAR | | 5 | DISAPPEAR |

FIG. 36

| | OPTICAL SIGNAL TRANSMITTED IN INTERVAL BETWEEN A BASE STATION 10-1 ⇔ BU30 | OPTICAL SIGNAL TRANSMITTED IN INTERVAL BETWEEN B BASE STATION 10-2 ⇔ BU30 | |
|---|---|---|---|
| 1 | OPTICAL SIGNAL TRANSMITTED/RECEIVED BETWEEN "A BASE STATION 10-1 14-1-A" AND "B BASE STATION 10-2 14-1-B" | OPTICAL SIGNAL TRANSMITTED/RECEIVED BETWEEN "A BASE STATION 10-1 14-1-A" AND "B BASE STATION 10-2 14-1-B" | 1 |
| 2 | OPTICAL SIGNAL TRANSMITTED/RECEIVED BETWEEN "A BASE STATION 10-1 14-2-A" AND "B BASE STATION 10-2 14-2-B" | OPTICAL SIGNAL TRANSMITTED/RECEIVED BETWEEN "A BASE STATION 10-1 14-2-A" AND "B BASE STATION 10-2 14-2-B" | 2 |
| 3 | OPTICAL SIGNAL TRANSMITTED/RECEIVED BETWEEN "A BASE STATION 10-1 14-3-A" AND "B BASE STATION 10-2 14-3-B" | OPTICAL SIGNAL TRANSMITTED/RECEIVED BETWEEN "A BASE STATION 10-1 14-3-A" AND "B BASE STATION 10-2 14-3-B" | 3 |
| 4 | OPTICAL SIGNAL TRANSMITTED/RECEIVED BETWEEN "A BASE STATION 10-1 14-4-A" AND "B BASE STATION 10-2 14-4-B" | OPTICAL SIGNAL TRANSMITTED/RECEIVED BETWEEN "A BASE STATION 10-1 14-4-A" AND "B BASE STATION 10-2 14-4-B" | 4 |
| 5 | OPTICAL SIGNAL TRANSMITTED/RECEIVED BETWEEN "A BASE STATION 10-1 14-5-A" AND "B BASE STATION 10-2 14-5-B" | OPTICAL SIGNAL TRANSMITTED/RECEIVED BETWEEN "A BASE STATION 10-1 14-5-A" AND "B BASE STATION 10-2 14-5-B" | 5 |

OPTICAL TRANSMISSION/RECEPTION DEVICE, OPTICAL COMMUNICATION SYSTEM, AND OPTICAL COMMUNICATION METHOD

CROSS-REFERENCE TO RELATED APPLICATIONS

The present application is a continuation of application Ser. No. 15/129,105 filed Sep. 26, 2016, which is a national stage application of International Application No. PCT/JP2015/001579 entitled "OPTICAL TRANSMISSION/RECEPTION DEVICE, OPTICAL COMMUNICATION SYSTEM, AND OPTICAL COMMUNICATION METHOD," filed on Mar. 20, 2015, which claims the benefit of priority of Japanese Patent Application No. 2014-066137, filed on Mar. 27, 2014, the disclosures of which are incorporated herein in their entirety by reference thereto.

TECHNICAL FIELD

The present invention relates to an optical transmission/reception device, an optical communication system, and an optical communication method.

BACKGROUND ART

In recent years, with an increase in traffic, a submarine cable system is demanded to have a wide-band circuit (line) or to have a network having a high functionality. A technique such as an OADM (Optical Add-Drop Multiplexer) or an ROADM (Reconfigurable Optical Add-Drop Multiplexer) is therefore applied to a submarine cable system.

A submarine ROADM system uses a wavelength division multiplexing (WDM: Wavelength Division Multiplexing) communication. In a submarine ROADM system, for example, a transmit device inputs a client signal as a wavelength multiplexed optical signal in a submarine cable to accommodate a plurality of paths in one optical fiber, thereby improving flexibility of a network.

In a submarine cable system having an OADM function, the total power of a signal transmitted in a cable composed of optical fibers is set to be constant. When a part of wavelength components of a signal disappears by a breakage of the cable or the like, the signal amplifies other wavelength components, thereby keeping the total power of the signal constant.

By increasing only the power of a specific wavelength component of a signal up to a predetermined value or larger, however, optical spectrum changes caused by deterioration of a waveform of the signal or the like by a nonlinear effect of an optical fiber, thereby deteriorating the transmission quality of the signal.

An optical communication system described in PTL 1 discloses a technique in which, when a failure occurs in a cable, the total power of a signal is corrected by a dummy light to secure communication quality. In an optical communication system described in PTL 1, a terminal equipment (optical transmission device) comprises a dummy light generating unit which generates a dummy light corresponding to a location where an optical signal break has occurred when a cable break failure is generated, and keeps the intensity (power) of a signal to be transmitted constant. PTL 2 describes a configuration for enhancing a security function of a signal wavelength.

CITATION LIST

Patent Literature

[PTL 1] Japanese Unexamined Patent Application Publication No. 2010-098547
[PTL 2] Japanese Unexamined Patent Application Publication No. 2011-082751

SUMMARY OF INVENTION

Technical Problem

As mentioned above, a terminal equipment (optical transmission device) described in PTL 1 needs to generate a dummy light to compensate an optical signal, and has to comprise a dummy light generating unit.

Accordingly, in order for a terminal equipment (optical transmission device) to compensate an optical signal without comprising a dummy light generating unit, it is considered to compensate a disappeared optical signal by an optical signal transmitted by another terminal equipment. When the optical signal transmitted by the other terminal equipment used for compensation is received by a device which is not an original communication destination of the optical signal, however, secrecy of information included in the optical signal cannot be secured, which is problematic.

An object of the present invention is to solve the above-described problem, and to provide an optical transmission/reception device, an optical communication system, an optical communication method, and a program in which, even when an optical signal is forwarded to a device which is not an original transmission destination device, secrecy of information included in the optical signal can be secured.

Solution to Problem

An optical transmission/reception device of the present invention comprises: a demultiplexing unit which receives a wavelength multiplexed optical signal, and demultiplexes the signal into a plurality of optical signals; a plurality of reception units which receive each of the plurality of optical signals demultiplexed by the demultiplexing unit; a plurality of output units which respectively output optical signals having different wavelengths; a control unit which requests to apply a predetermined change to an optical signal output from at least one of the plurality of output units, when the received wavelength multiplexed optical signal includes an optical signal to which a predetermined processing is applied; and a multiplexing unit which multiplexes the plurality of optical signals output from the plurality of output units and outputs the multiplexed signal.

An optical communication system of the present invention is characterized by comprising: an optical communication device which outputs a wavelength multiplexed optical signal; and an optical transmission/reception device comprising a demultiplexing unit which receives the wavelength multiplexed optical signal, and demultiplexes the signal into a plurality of optical signals, a plurality of reception units which receive each of the plurality of optical signals demultiplexed by the demultiplexing unit, a plurality of output units which respectively output optical signals having different wavelengths, a control unit which requests to apply a predetermined change to an optical signal output from at least one of the plurality of output units when the received wavelength multiplexed optical signal includes an optical signal to which a predetermined processing is applied, and a multiplexing unit which multiplexes the plurality of optical signals output from the plurality of output units and outputs the multiplexed signal.

An optical communication method of the present invention is characterized by comprising: a multiplexing unit of receiving a wavelength multiplexed optical signal; requesting to apply a predetermined change to an optical signal to be output, when the received wavelength multiplexed optical signal includes an optical signal to which a predetermined processing is applied; and multiplexing a plurality of optical signals having different wavelengths including an optical signal to which the predetermined change has been applied, and outputting the multiplexed signal.

A program of the present invention is characterized by making a computer execute: a processing to receive a wavelength multiplexed optical signal; a processing which requests to apply a predetermined change to an optical signal to be output, when the received wavelength multiplexed optical signal includes an optical signal to which a predetermined processing is applied; and a processing to multiplex a plurality of optical signals having different wavelengths including an optical signal to which the predetermined change has been applied, and to output the multiplexed signal.

Advantageous Effects of Invention

The present invention exhibits an effect capable of securing secrecy of information included in the optical signal even when an optical signal is forwarded to a device which is not an original transmission destination device.

BRIEF DESCRIPTION OF DRAWINGS

FIG. 33 is a table illustrating optical signals transmitted by an interval between an A base station 10-1 and the optical branch device 3, and an interval between the optical branch device 3 and a B base station 10-2, in the communication system of the twelfth exemplary embodiment of the present invention.

FIG. 35 is a table illustrating a connection relation of the transponder 14 which transmits/receives an optical signal in an interval between the A base station 10-1 and the optical branch device 3, and an interval between the optical branch device 3 and the B base station 10-2 of a communication system in the twelfth exemplary embodiment of the present invention.

FIG. 36 is a table illustrating a connection relation of the transponder 14 which transmits/receives an optical signal in an interval between the A base station 10-1 and the optical branch device 3, and an interval between the optical branch device 3 and the B base station 10-2 of a communication system after the optical branch device 3 has switched a path in the twelfth exemplary embodiment of the present invention.

DESCRIPTION OF EMBODIMENTS

First Exemplary Embodiment

A summary of the first exemplary embodiment of the present invention will be described with reference to the drawings. It is noted that a reference sign for each of the drawings in the summary has been added for convenience to each element as one example for helping understanding, and the description of the summary should not be construed as limiting in any way.

Figure 1:
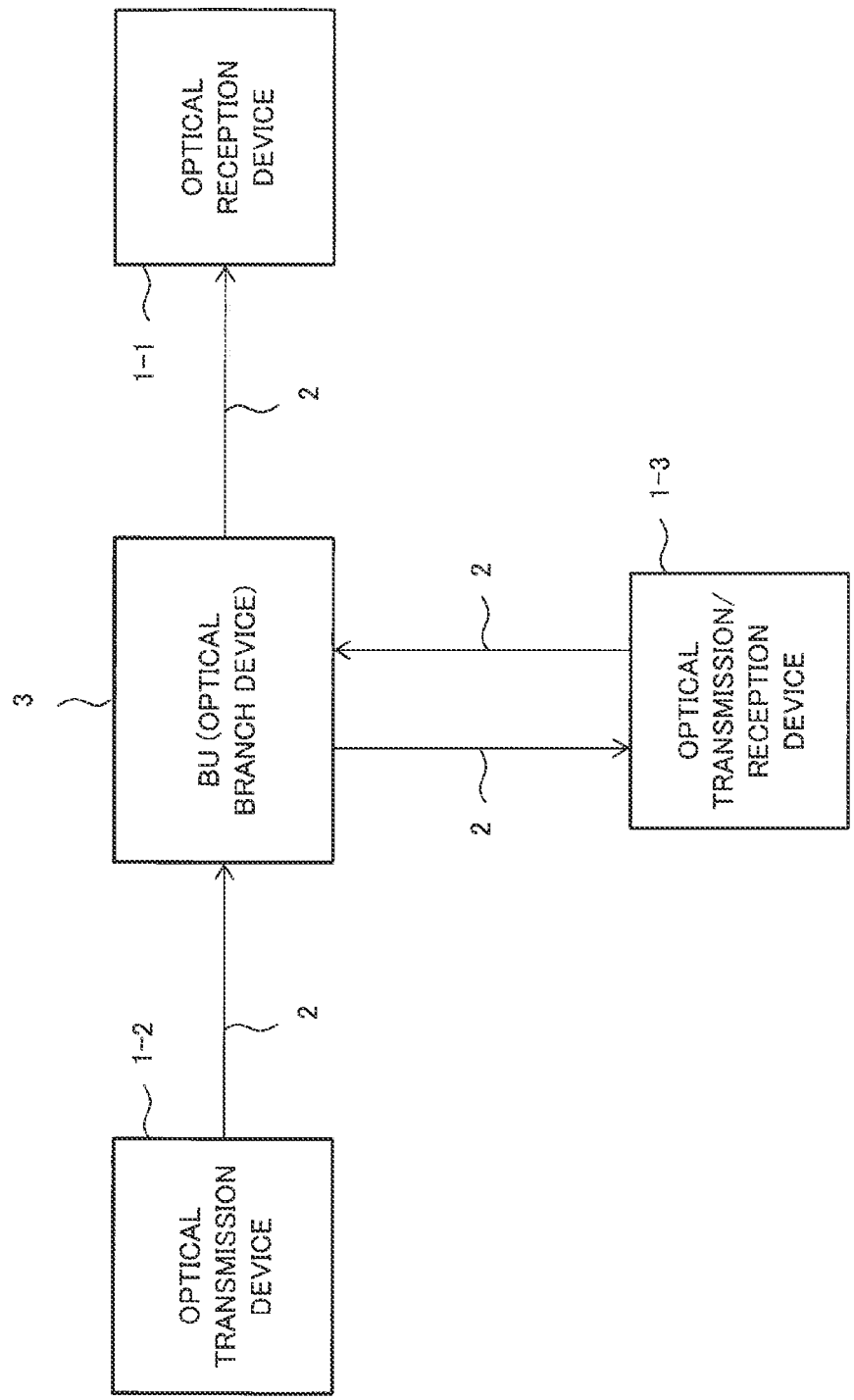
FIG. 1 is a configuration example of an optical communication system in a first exemplary embodiment of the present invention.

FIG. 1 is a configuration example of an optical communication system in the first exemplary embodiment of the present invention. As illustrated in FIG. 1, the optical communication system includes an optical reception device 1-1 which receives a wavelength multiplexed optical signal, an optical transmission device 1-2 which transmits a wavelength multiplexed optical signal, and an optical transmission/reception device 1-3 which transmits/receives a wavelength multiplexed optical signal. The optical communication system illustrated in FIG. 1 includes a transmission path 2 which transmits a wavelength multiplexed optical signal, and an optical branch device (Branch Unit: BU) 3 which multiplexes and branches a wavelength multiplexed optical signal.

Figure 2:
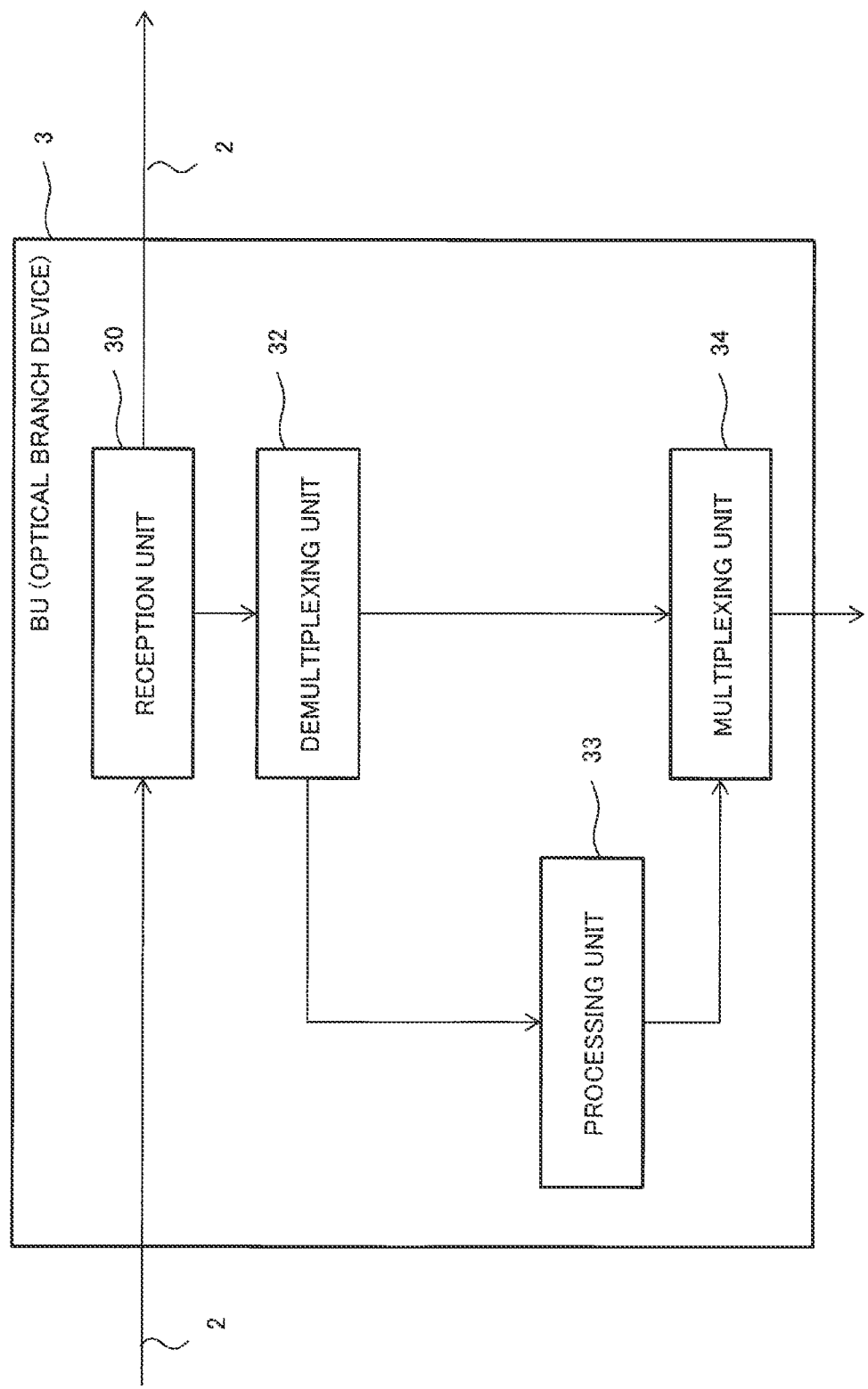
FIG. 2 is a diagram illustrating a configuration example of an optical branch device 3 in the first exemplary embodiment of the present invention.

FIG. 2 is a diagram illustrating a configuration example of the optical branch device 3. The optical branch device 3 comprises a reception unit 30, a demultiplexing unit 32, a processing unit 33, and a multiplexing unit 34.

The reception unit 30 receives a wavelength multiplexed optical signal input from the transmission path 2.

The optical reception unit 30 may be a branch unit 31. In this case, the branch unit 31 branches a wavelength multiplexed optical signal input from the transmission path 2, inputs one wavelength multiplexed optical signal to the demultiplexing unit 32, and outputs the other wavelength demultiplexing signal to another external device (for example, the optical reception device 1-1). The other wavelength multiplexed optical signal is output to another external device (for example, the optical reception device 1-1) after a predetermined processing is applied in another device (not illustrated) included in the optical branch device 3. The other wavelength multiplexed optical signal is output as it is to another external device when a predetermined processing does not need to be applied.

The demultiplexing unit 32 demultiplexes a wavelength multiplexed optical signal into a first demultiplexed light including a first wavelength and a second demultiplexed light including a second wavelength. The demultiplexing unit 32 inputs the first demultiplexed light to the processing unit 33, and inputs the second demultiplexed light to the multiplexing unit 34.

The processing unit 33 applies a predetermined processing to the first demultiplexed light input from the demultiplexing unit 32, and outputs the light to the multiplexing unit 34. As the predetermined processing, the processing unit 33 adds a predetermined pattern to an optical signal to be output. The predetermined pattern is, for example, a dummy pattern in which 0 and 1 are randomly arranged, or a fixed pattern in which 0 and 1 are arranged in a specific pattern. As the predetermined processing, the processing unit 33 may scramble an optical signal to be output. As the predetermined processing, the processing unit 33 may deteriorate transmission characteristics of an optical signal to be output.

The multiplexing unit 34 multiplexes the first demultiplexed light on which a predetermined processing has been performed input from the processing unit 33 and the second demultiplexed light input from the demultiplexing unit 32, and outputs the multiplexed light to the transmission path 2.

Figure 3:
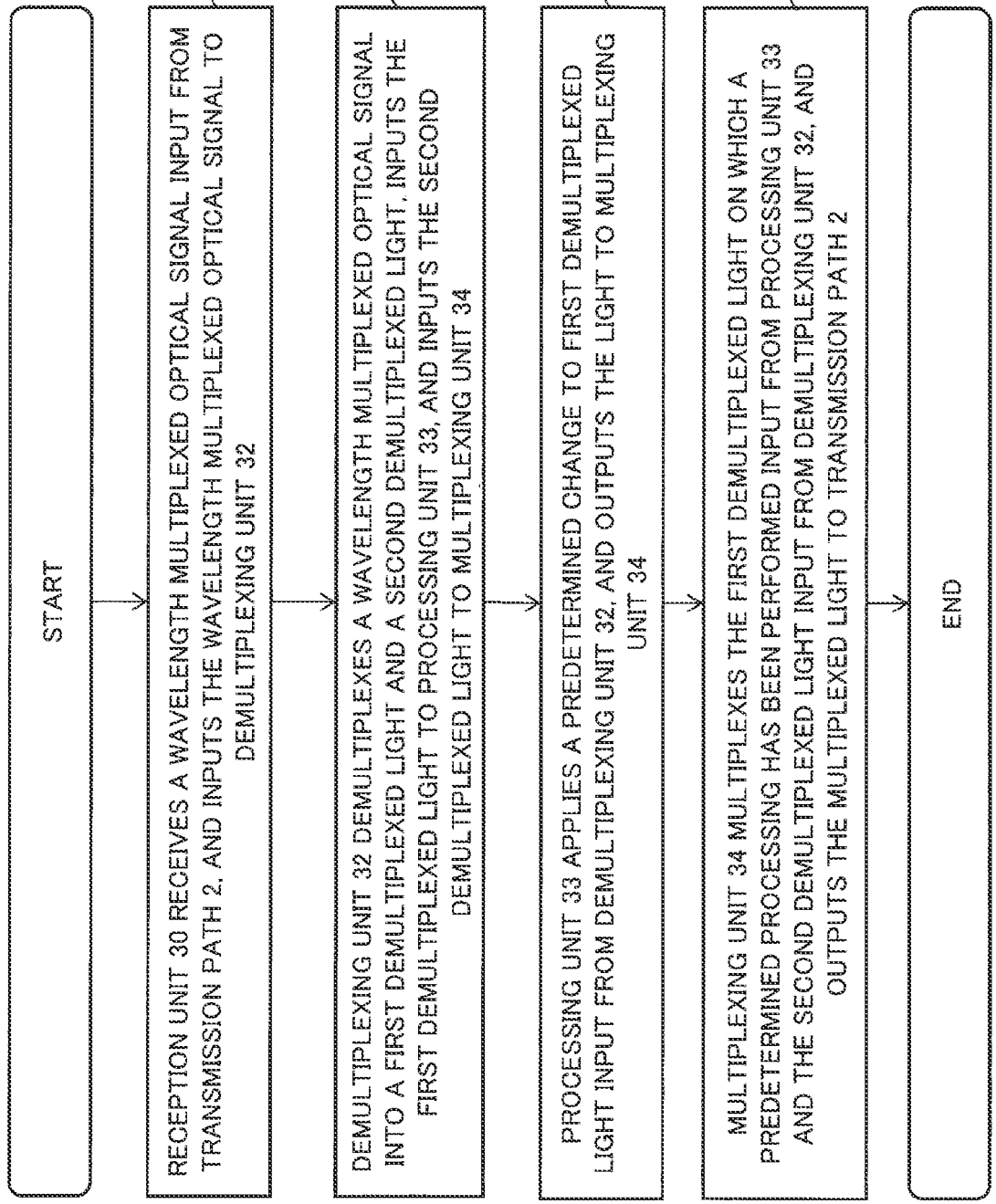
FIG. 3 is a flow chart illustrating an operational example of the optical branch device 3 in the first exemplary embodiment of the present invention.

FIG. 3 is a flow chart illustrating an operational example of the optical branch device 3 in the first exemplary embodiment of the present invention.

The reception unit 30 receives a wavelength multiplexed optical signal input from the transmission path 2, and inputs the wavelength multiplexed optical signal to the demultiplexing unit 32 (S101).

The demultiplexing unit 32 demultiplexes a wavelength multiplexed optical signal into the first demultiplexed light including the first wavelength and the second demultiplexed light including the second wavelength, inputs the first demultiplexed light to the processing unit 33, and inputs the second demultiplexed light to the multiplexing unit 34 (S102).

The processing unit 33 performs a predetermined processing on the first demultiplexed light input from the demultiplexing unit 32, applies a predetermined change thereto, and outputs the light to the multiplexing unit 34 (S103).

The multiplexing unit 34 multiplexes the first demultiplexed light on which a predetermined processing has been performed input from the processing unit 33 and the second demultiplexed light input from the demultiplexing unit 32, and outputs the multiplexed light to the transmission path 2 (S104).

As mentioned above, for example, when an optical signal including data is forwarded to a device which is not an original transmission destination, the optical branch device 3 of the first exemplary embodiment of the present invention performs a predetermined processing on an optical signal including the data. An optical signal on which a predetermined processing has been performed is, for example, an optical signal including a predetermined pattern, or a scrambled optical signal, and it is difficult to reproduce data (read data) included in an original optical signal. As a result, even when an optical signal including data is forwarded to a device which is not an original transmission destination, secrecy of data included in the optical signal can be secured.

Second Exemplary Embodiment

A second exemplary embodiment of the present invention will be described with reference to the drawings. In the second exemplary embodiment of the present invention, a description of a configuration similar to the first exemplary embodiment of the present invention will be omitted.

A configuration example of an optical communication system in the second exemplary embodiment of the present invention is similar to the optical communication system illustrated in FIG. 1.

In the second exemplary embodiment of the present invention, a wavelength multiplexed optical signal received by the optical transmission/reception device 1-3 may include an optical signal to which a predetermined processing has been applied. The predetermined processing is applied for the purpose that data superimposed on an optical signal cannot be extracted, and is applied by an optical transmission device 1-1 or the optical branch device 3. In other words, the optical transmission device 1-1 or the optical branch device 3 applies the predetermined processing to an optical signal which is not destined for the optical transmission/reception device 1-3, thereby securing secrecy of data superimposed on the optical signal.

For this reason, it is highly probable that, to a reception unit which has received an optical signal to which a predetermined processing is applied in the optical transmission/reception device 1-3, a channel which the optical transmission/reception device 1-3 does not use for transmitting/receiving data is assigned. It is also highly probable that, to an output unit (an output unit corresponding to the reception unit) which outputs an optical signal using the same channel as that of the reception unit in the optical transmission/reception device 1-3, a channel which the optical transmission/reception device 1-3 does not use for transmitting/receiving data is assigned.

Here, when an output unit to which a channel which the optical transmission/reception device 1-3 does not use for transmitting/receiving data is assigned outputs an optical signal on which data is superimposed, the optical signal on which data is superimposed is received by a device which is not an original destination. In this case, secrecy of data superimposed on the optical signal may not be secured.

Accordingly, the optical transmission/reception device 1-3 of the second exemplary embodiment of the present invention applies a predetermined change to an optical signal output from an output unit corresponding to (whose channel is the same as that of) a reception unit which has received an optical signal to which a predetermined processing has been applied. The optical transmission/reception device 1-3 applies a predetermined change to an optical signal from an output unit to which a channel which own device does not use for transmitting/receiving data is assigned such that data cannot be extracted, thereby securing secrecy of data superimposed on the optical signal.

Figure 4:
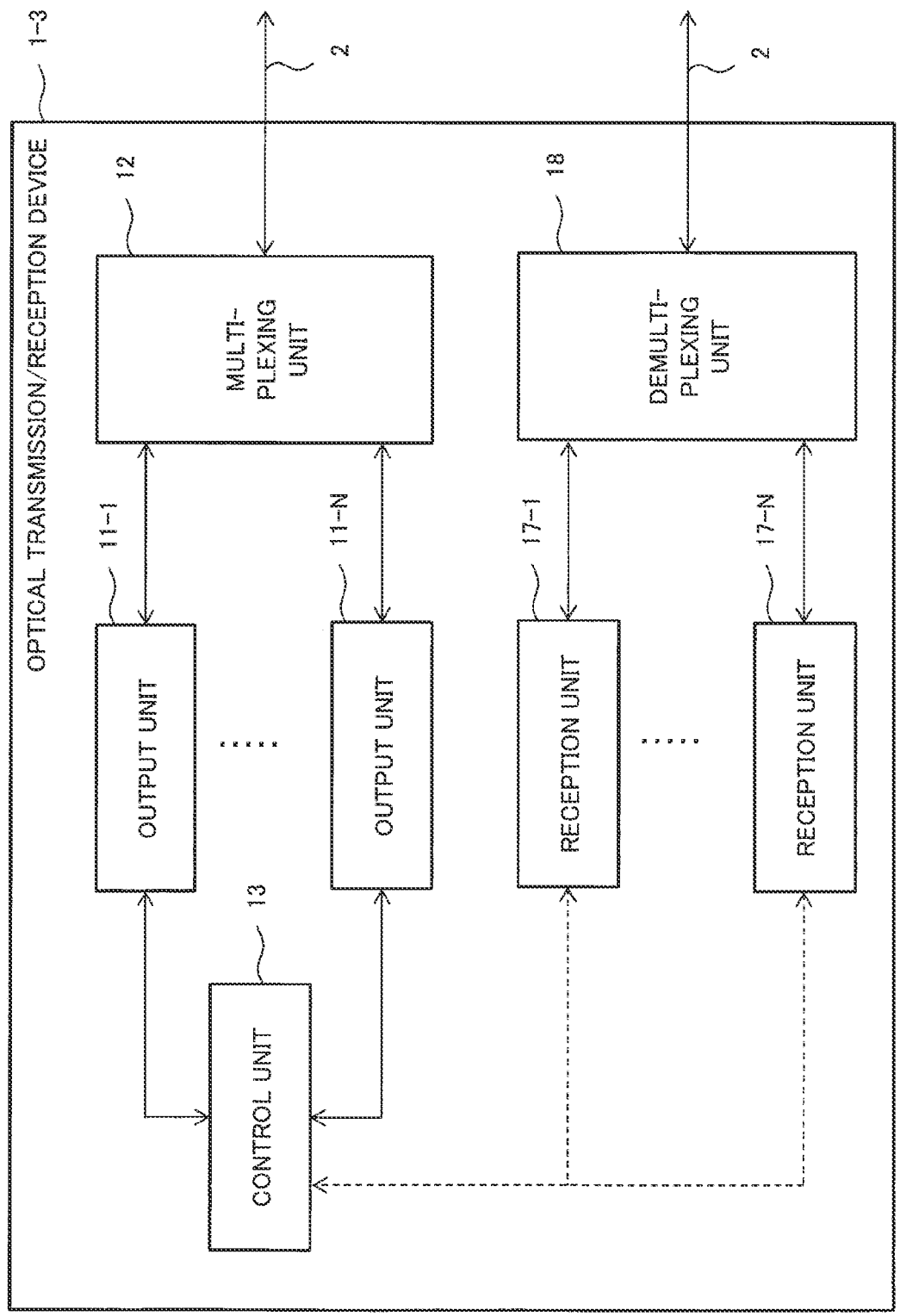
FIG. 4 is a diagram illustrating a configuration example of the optical transmission/reception device 1-3 in a second exemplary embodiment of the present invention.

FIG. 4 is a diagram illustrating a configuration example of the optical transmission/reception device 1-3. The optical transmission/reception device 1-3 comprises a plurality of output units 11-1 to 11-N (when there is no particular distinction, referred to as "output unit 11"), a multiplexing unit 12, a control unit 13, a plurality of reception units 17-1 to 17-N (when there is no particular distinction, referred to as "reception unit 17"), and a demultiplexing unit 18.

The demultiplexing unit 18 demultiplexes a wavelength multiplexed optical signal received from the transmission path 2, and outputs the demultiplexed signals to each of the plurality of reception units 17. To each of the plurality of reception units 17, a wavelength of an optical signal to be received is assigned. The demultiplexing unit 18 outputs an optical signal having the assigned wavelength to each of the plurality of reception units 17.

In the second exemplary embodiment of the present invention, a wavelength multiplexed optical signal received by the demultiplexing unit 18 includes an optical signal to which a predetermined processing is applied. The optical signal to which a predetermined processing is applied is, for example, an optical signal including a predetermined pattern. The predetermined pattern is a dummy pattern in which 0 and 1 are randomly arranged, or a fixed pattern in which 0 and 1 are arranged in a specific pattern, and data cannot be extracted (read) from an optical signal including the predetermined pattern. The optical signal to which a predetermined processing is applied may be, for example, a scrambled optical signal or an optical signal whose transmission characteristics are deteriorated, and data cannot be extracted (read) also from such an optical signal.

The output unit 11 outputs an optical signal having a predetermined wavelength. The output unit 11 includes, for example, a laser or the like, and can output an optical signal obtained by superimposing data on a light output from the laser. The type of the structure or the like of the laser is not restricted, and may be, for example, a variable wavelength laser or the like in which an output wavelength can be changed.

Among the plurality of output units 11, the control unit 13 specifies the reception unit 17 which has received an optical signal to which a predetermined processing is applied, and requests the output unit 11 corresponding to the specified reception unit 17 to output an optical signal to which a predetermined change has been applied. The output unit 11 corresponding to the specified reception unit 17 is the output unit 11 which outputs an optical signal by using the same channel as that of the reception unit 17.

The control unit 13 watches (monitors) an optical signal received by each of the plurality of reception units 17, and specifies the reception unit 17 which has received an optical signal to which a predetermined processing is applied. The control unit 13 may receive a control signal to notify a wavelength of an optical signal to which a predetermined change has been applied, and specify the reception unit 17 which has received an optical signal having the wavelength notified by the control signal as the reception unit 17 which has received an optical signal to which a predetermined processing is applied. The control unit 13 may receive a notification that an optical signal to which a predetermined processing has been applied is received from at least one of the reception units 17, and specify the notified reception unit 17 as an input/output unit which has received the optical signal to which a predetermined processing has been applied.

The output unit 11 applies a predetermined change to an optical signal to be output in response to a request from the control unit 13. As the predetermined change, the output unit 11 adds a predetermined pattern to an optical signal to be output. The predetermined pattern is, for example, a dummy pattern in which 0 and 1 are randomly arranged, or a fixed pattern in which 0 and 1 are arranged in a specific pattern. As the predetermined change, the output unit 11 may scramble an optical signal to be output. As the predetermined change, the output unit 11 may deteriorate transmission characteristics of an optical signal to be output.

The output unit 11, when not instructed by the control unit 13, converts an electric signal input from a device (not illustrated in FIG. 2) in a previous stage into an optical signal, and outputs the optical signal to the multiplexing unit 12. In other words, the output unit 11 outputs an optical signal including data when not requested from the control unit 13.

The multiplexing unit 12 multiplexes a plurality of optical signals input from each of the plurality of output units 11, and outputs the multiplexed signal.

Figure 5:
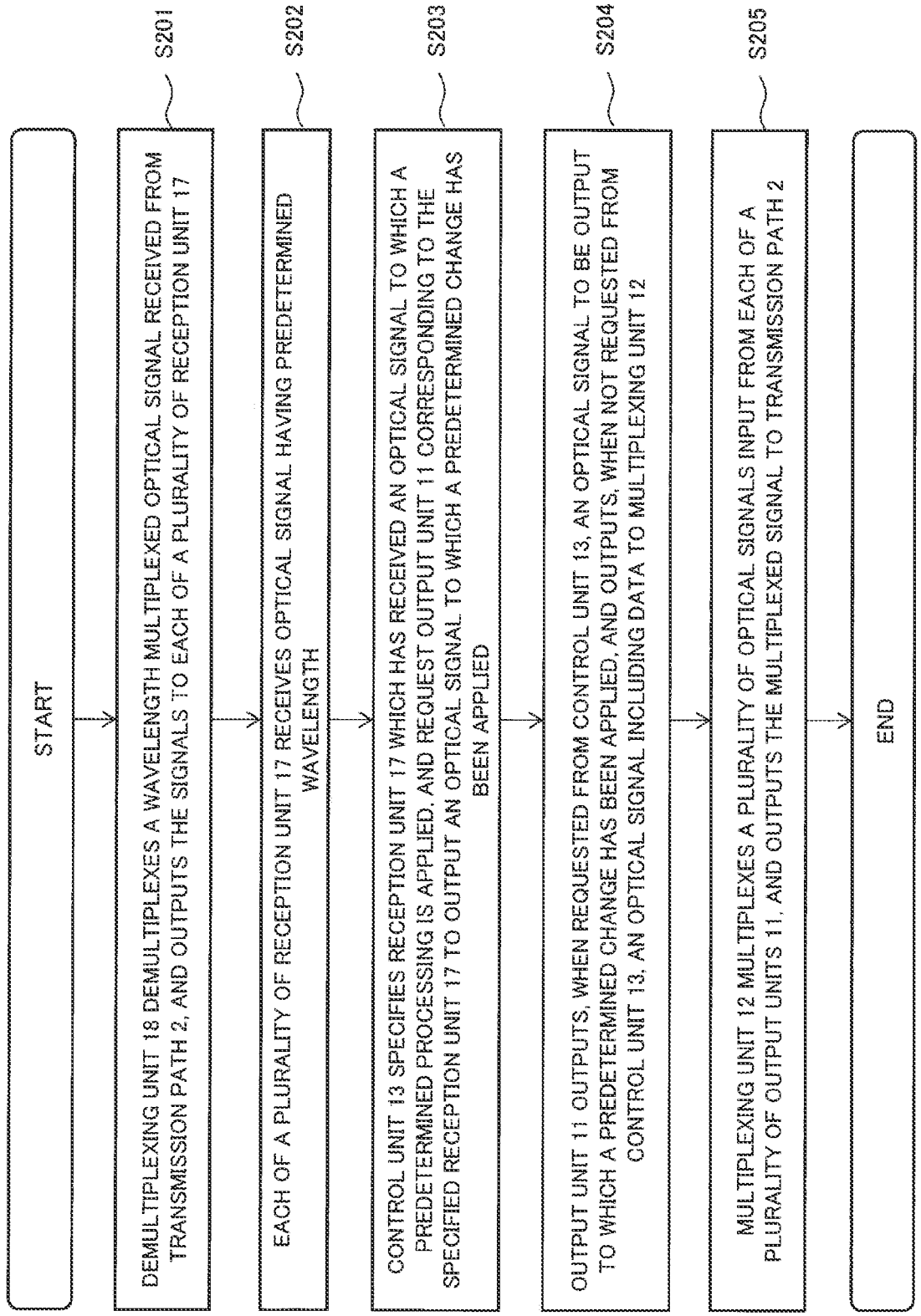
FIG. 5 is a flow chart illustrating an operational example of the optical transmission/reception device 1-3 in the second exemplary embodiment of the present invention.

FIG. 5 is a flow chart illustrating an operational example of the optical transmission/reception device 1-3 in the second exemplary embodiment of the present invention.

The demultiplexing unit 18 demultiplexes a wavelength multiplexed optical signal received from the transmission path 2, and outputs the demultiplexed signals to each of the plurality of reception units 17 (S201).

Each of the plurality of reception units 17 receives an optical signal having a predetermined wavelength (S202).

Among the plurality of reception units 17, the control unit 13 specifies the reception unit 17 which has received an optical signal to which a predetermined processing is applied, and requests the output unit 11 corresponding to the specified reception unit 17 to output an optical signal to which a predetermined change has been applied (S203).

The output unit 11, when requested from the control unit 13, outputs an optical signal to be output to which a predetermined change has been applied, and, when not requested from the control unit 13, outputs an optical signal including data to the multiplexing unit 12 (S204).

The multiplexing unit 12 multiplexes a plurality of optical signals input from each of the plurality of output units 11, and outputs the multiplexed signal to the transmission path 2 (S205).

As mentioned above, the optical transmission/reception device 1-3 of the second exemplary embodiment outputs an optical signal to which a predetermined change has been applied from the output unit 11 corresponding to the reception unit 17 which has received an optical signal to which a predetermined processing is applied among the plurality of reception units 17.

As mentioned above, in the second exemplary embodiment of the present invention, the optical transmission/reception device 1-3 applies a predetermined change to an optical signal output from the output unit 11 corresponding to (whose channel is the same as that of) a reception unit 17 which has received an optical signal to which a predetermined processing has been applied. For this reason, the optical transmission/reception device 1-3 can secure secrecy of data superimposed on an optical signal output from the output unit 11 to which a channel which is not used for transmitting/receiving data is assigned.

Third Exemplary Embodiment

A summary of a third exemplary embodiment of the present invention will be described with reference to the drawings. In the third exemplary embodiment of the present invention, a description of a configuration similar to the above-described exemplary embodiments of the present invention will be omitted.

A configuration example of an optical communication system in the third exemplary embodiment of the present invention is similar to FIG. 1.

Figure 6:
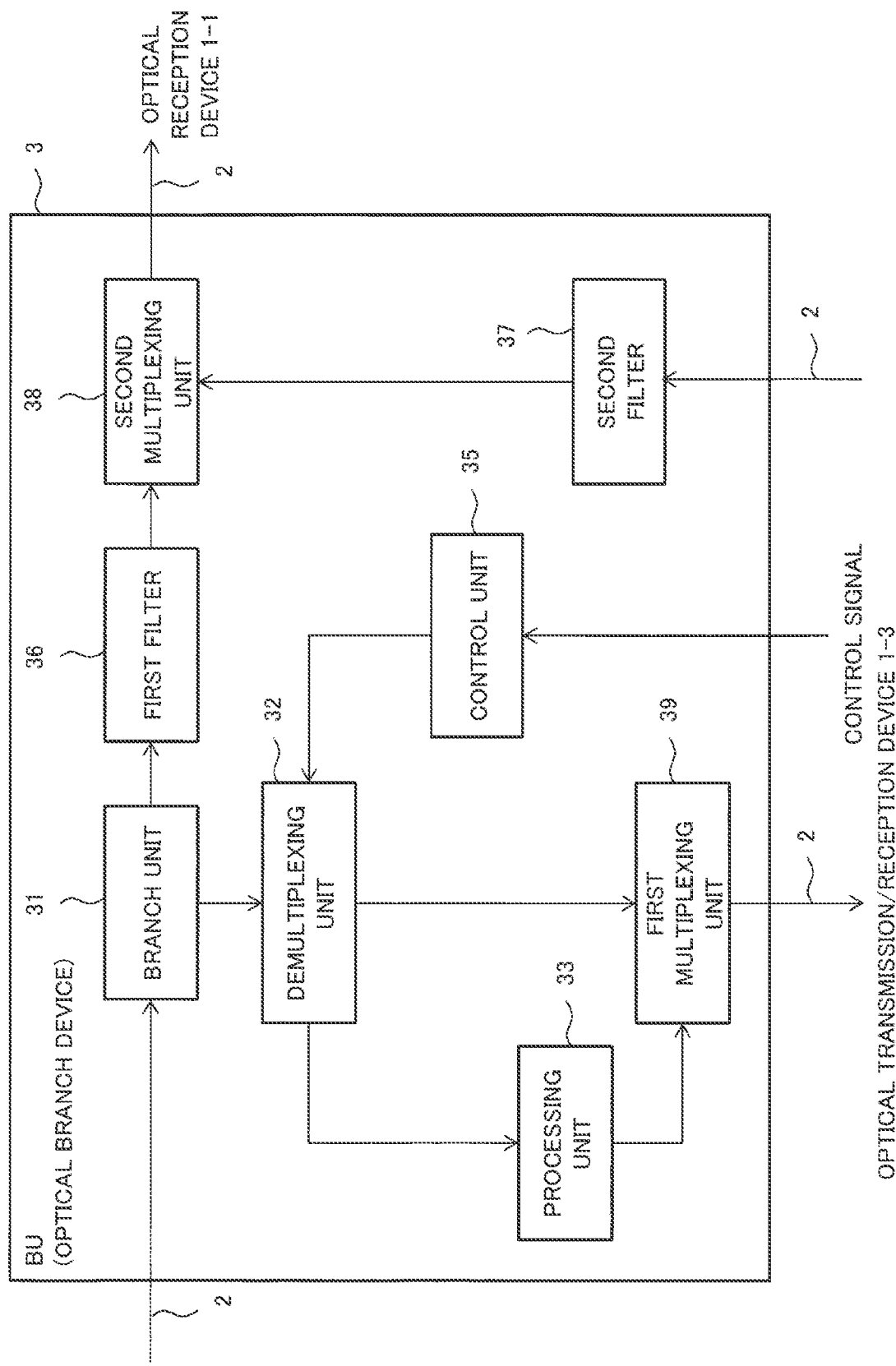
FIG. 6 is a diagram illustrating a configuration example of the optical branch device 3 in a third exemplary embodiment of the present invention.

FIG. 6 is a diagram illustrating a configuration example of the optical branch device 3. The optical branch device 3 comprises a branch unit 31, a demultiplexing unit 32, a processing unit 33, a first multiplexing unit 39, a control unit 35, a first filter 36, a second filter 37, and a second multiplexing unit 38. The first multiplexing unit 39 corresponds to the multiplexing unit 34 in the first exemplary embodiment of the present invention.

The branch unit 31 branches a wavelength multiplexed optical signal input from the transmission path 2, inputs one wavelength multiplexed optical signal to the demultiplexing unit 32, and inputs the other wavelength multiplexed optical signal to the first filter 36.

The control unit 35 notifies the demultiplexing unit 32 of information about an optical signal to be input to the processing unit 33. The control unit 35 may receive a control signal which notifies of a wavelength of an optical signal to perform a predetermined processing, and notify the demultiplexing unit 32 of a wavelength of a first demultiplexed light which the demultiplexing unit 32 inputs to the processing unit 33.

The demultiplexing unit 32 demultiplexes a wavelength multiplexed optical signal into the first demultiplexed light including the first wavelength and the second demultiplexed light including the second wavelength based on the notification from the control unit 35. The demultiplexing unit 32 inputs a first demultiplexed light to the processing unit 33, and a second demultiplexed light to the first multiplexing unit 39.

The processing unit 33 performs a predetermined processing on the first demultiplexed light input from the demultiplexing unit 32, and inputs the light to the first multiplexing unit 39.

The first multiplexing unit 39 multiplexes the first demultiplexed light on which a predetermined processing has been performed input from the processing unit 33 and the second demultiplexed light input from the demultiplexing unit 32, and outputs the multiplexed light to the transmission path 2.

Among a plurality of optical signals included in a wavelength multiplexed optical signal, the first filter 36 blocks an optical signal which is destined for the optical transmission/reception device 1-3, and passes an optical signal which is destined for the optical reception device 1-1.

Among wavelength multiplexed optical signals from the optical transmission/reception device 1-3, the second filter 37 blocks an optical signal to which a predetermined change has been applied, and passes the other optical signal.

The second multiplexing unit 38 outputs a wavelength multiplexed optical signal obtained by multiplexing an optical signal input from the first filter 36 and an optical signal input from the second filter 37 to the transmission path 2.

Figure 7:
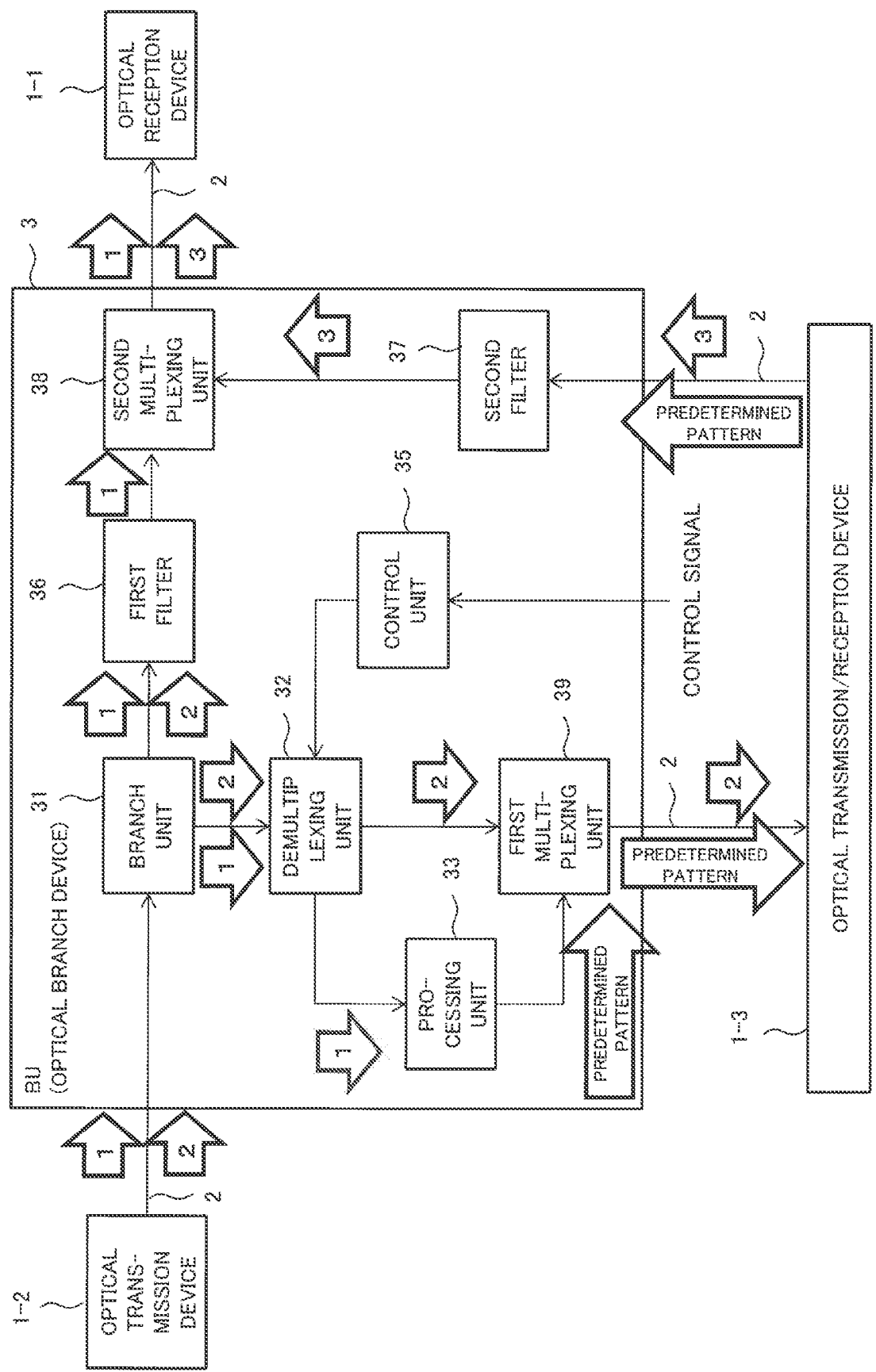
FIG. 7 is a diagram illustrating a state of an optical signal which transmits an optical communication system in the third exemplary embodiment of the present invention.

FIG. 7 is a diagram illustrating a state of an optical signal which transmits an optical communication system in the third exemplary embodiment of the present invention. FIG. 7 illustrates an example in which the processing unit 33 of the optical branch device 3 adds a predetermined pattern to a first demultiplexed light.

An optical transmission device 1-2, as illustrated in FIG. 7, outputs a wavelength multiplexed optical signal including an optical signal Sub-band 1 (block arrow "1" in FIG. 7) and an optical signal Sub-band 2 (block arrow "2" in FIG. 7). In an example of FIG. 7, the optical signal Sub-band 1 is an optical signal destined for the optical reception device 1-1, and the optical signal Sub-band 2 is an optical signal destined for the optical transmission/reception device 1-3.

The branch unit 31 of the optical branch device 3 inputs one wavelength multiplexed optical signal output from the optical transmission device 1-2, and inputs the other to the first filter 36.

The demultiplexing unit 32 inputs the optical signal Sub-band 1 included in a wavelength multiplexed optical signal to the processing unit 33, and inputs the optical signal Sub-band 2 to the first multiplexing unit 39.

The processing unit 33 outputs an optical signal Sub-band 1' (block arrow "predetermined pattern" in FIG. 7) obtained by applying a predetermined processing to the input optical signal Sub-band 1. The processing unit 33 adds, for example, a predetermined pattern as a predetermined processing to the optical signal Sub-band 1. Since the optical signal Sub-band 1 is an optical signal destined for the optical reception device 1-1, the optical branch device 3 outputs an optical signal (i.e., optical signal Sub-band 1') obtained by applying a predetermined processing to the optical signal Sub-band 1 so as not to be received by the optical transmission/reception device 1-3.

The first multiplexing unit 39 outputs a wavelength multiplexed optical signal obtained by multiplexing the optical signal Sub-band 2 input from the demultiplexing unit 32 and the optical signal Sub-band 1' input from the processing unit 33 to the optical transmission/reception device 1-3.

The optical transmission/reception device 1-3 outputs a wavelength multiplexed optical signal obtained by multiplexing an optical signal Sub-band 3 (block arrow "3" in FIG. 7) destined for the optical reception device 1-1 and an optical signal (block arrow "predetermined pattern" in FIG. 7) obtained by applying a predetermined change to an optical signal whose wavelength corresponds to the optical signal Sub-band 1'. The optical transmission/reception device 1-3 adds, for example, a predetermined pattern as a predetermined change to the optical signal Sub-band 1.

Among wavelength multiplexed optical signals input from the optical transmission/reception device 1-3, the second filter 37 passes only the optical signal Sub-band 3 destined for the optical reception device 1-1, and blocks an optical signal to which a predetermined change has been applied.

On the other hand, among the input wavelength multiplexed optical signals, the first filter 36 passes only the optical signal Sub-band 1 destined for the optical reception device 1-1, and blocks the optical signal Sub-band 2.

The second multiplexing unit 38 outputs a wavelength multiplexed optical signal obtained by multiplexing the optical signal Sub-band 1 input from the first filter and the optical signal Sub-band 3 input from the second filter to the optical reception device 1-1.

Figure 8:
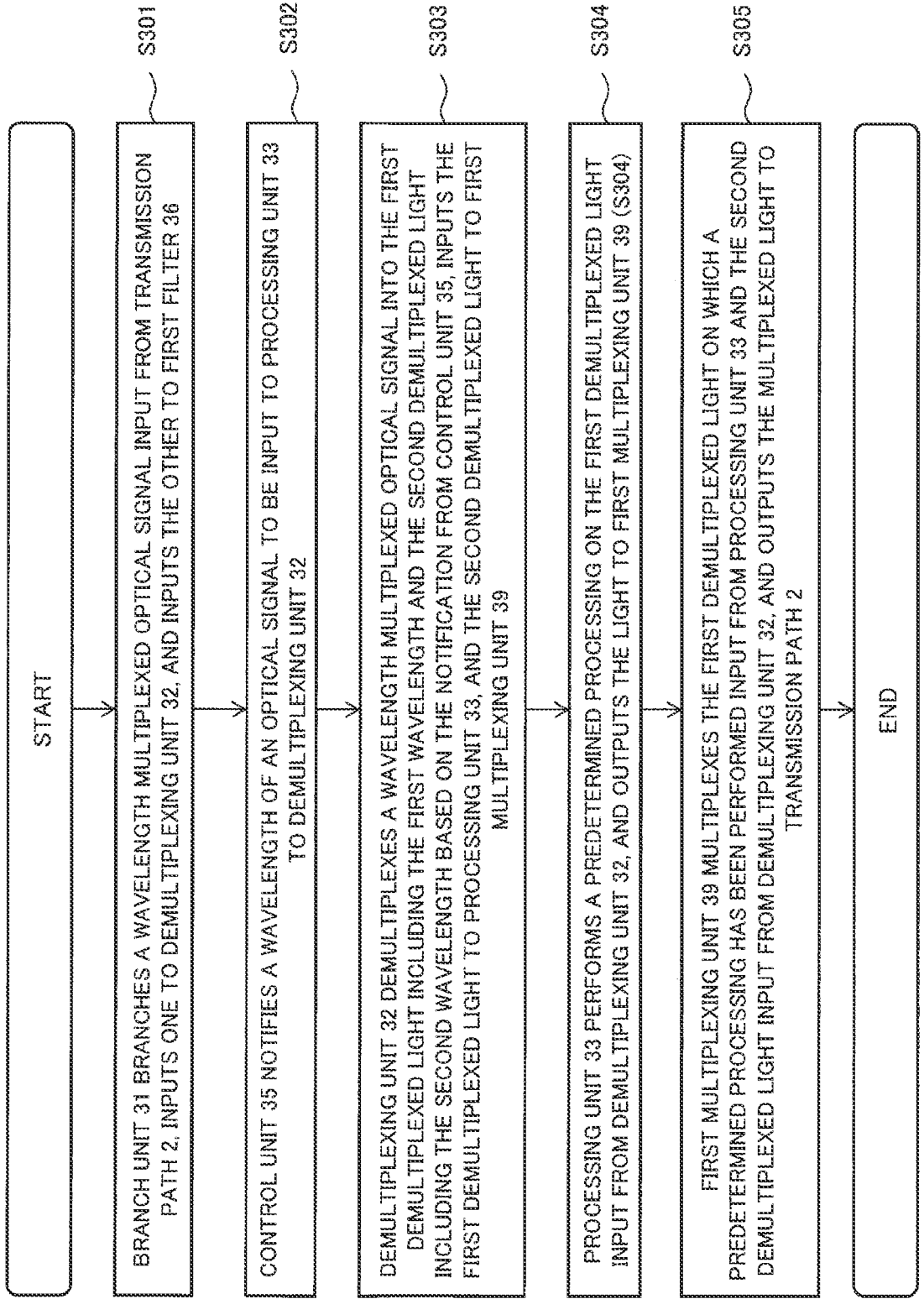
FIG. 8 is a flow chart illustrating an operational example when the optical branch device 3 in the third exemplary embodiment of the present invention outputs a wavelength multiplexed optical signal to the optical transmission/reception device 1-3.
Figure 9:
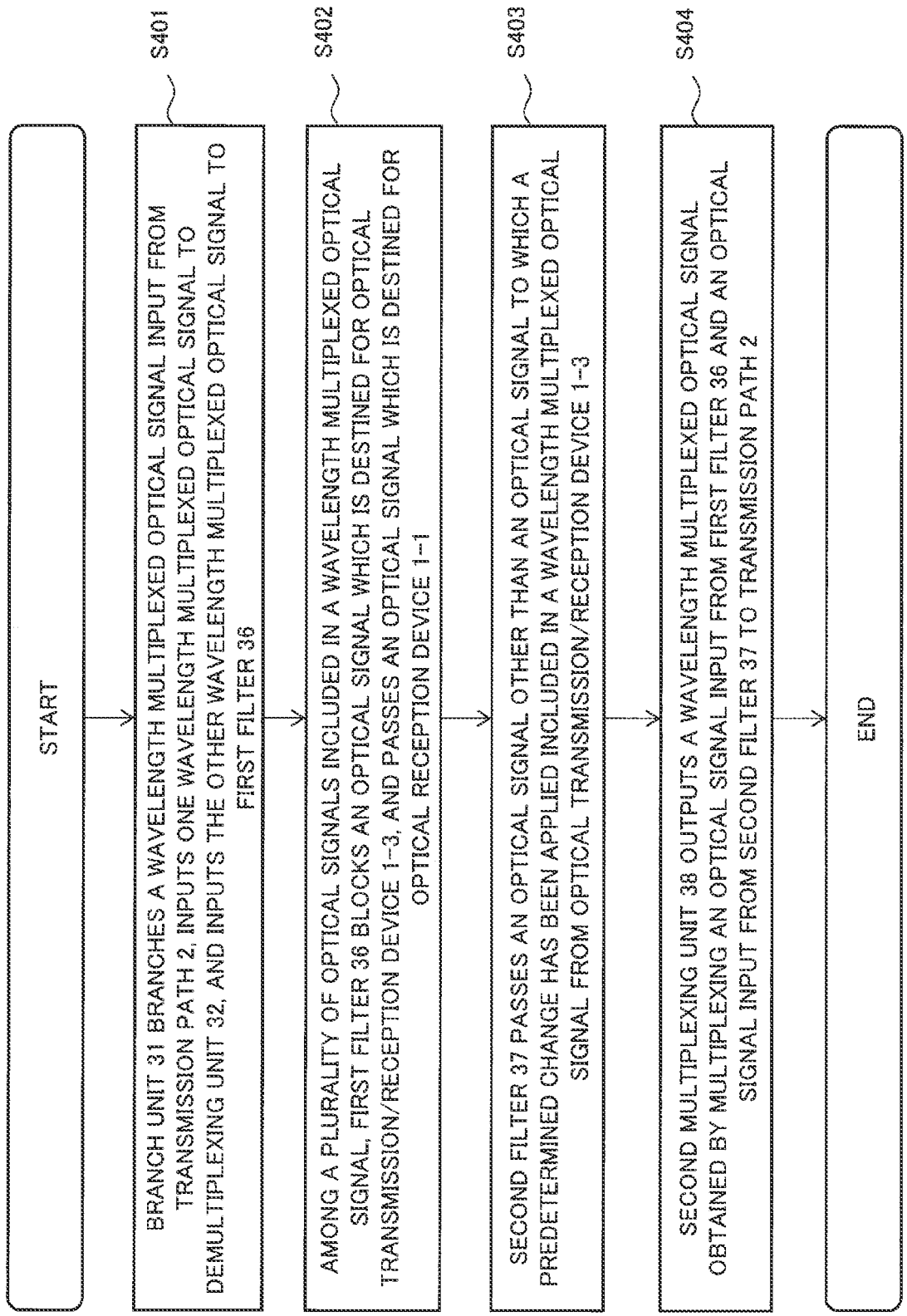
FIG. 9 is a flow chart illustrating an operational example when the optical branch device 3 in the third exemplary embodiment of the present invention outputs a wavelength multiplexed optical signal to an optical reception device 1-1.

FIG. 8 and FIG. 9 are flow charts illustrating an operational example of the optical branch device 3 in the third exemplary embodiment of the present invention. FIG. 8 is a flow chart illustrating an operational example when the optical branch device 3 outputs a wavelength multiplexed optical signal to the optical transmission/reception device 1-3.

The branch unit 31 branches a wavelength multiplexed optical signal input from the transmission path 2, inputs one signal to demultiplexing unit 32, and inputs the other signal to the first filter 36 (S301).

The control unit 35 notifies a wavelength of an optical signal to be input to the processing unit 33 to the demultiplexing unit 32 (S302).

The demultiplexing unit 32 demultiplexes a wavelength multiplexed optical signal into the first demultiplexed light including the first wavelength and the second demultiplexed light including the second wavelength based on the notification from the control unit 35, inputs a first demultiplexed light to the processing unit 33, and a second demultiplexed light to the first multiplexing unit 39 (S303).

The processing unit 33 performs a predetermined processing on the first demultiplexed light input from the demultiplexing unit 32, and outputs the light to the first multiplexing unit 39 (S304).

The first multiplexing unit 39 multiplexes the first demultiplexed light on which a predetermined processing has been performed input from the processing unit 33 and the second demultiplexed light input from the demultiplexing unit 32, and outputs the multiplexed light to the transmission path 2 (S305).

FIG. 9 is a flow chart illustrating an operational example when the optical branch device 3 outputs a wavelength multiplexed optical signal to the optical reception device 1-1.

The branch unit 31 branches a wavelength multiplexed optical signal input from the transmission path 2, inputs one wavelength multiplexed optical signal to the demultiplexing unit 32, and inputs the other wavelength multiplexed optical signal to the first filter 36 (S401).

Among a plurality of optical signals included in a wavelength multiplexed optical signal, the first filter 36 blocks an optical signal which is destined for the optical transmission/reception device 1-3, and passes an optical signal which is destined for the optical reception device 1-1 (S402).

The second filter 37 passes an optical signal other than an optical signal to which a predetermined change has been applied included in a wavelength multiplexed optical signal from the optical transmission/reception device 1-3 (S403).

The second multiplexing unit 38 outputs a wavelength multiplexed optical signal obtained by multiplexing an optical signal input from the first filter 36 and an optical signal input from the second filter 37 to the transmission path 2 (S404).

The demultiplexing unit 32 may be a 3-port wavelength filter module. Among a wavelength multiplexed optical signal input from the first port, the 3-port wavelength filter module, including three ports, for example, reflects an optical signal Sub-band 1 and passes an optical signal Sub-band 2 from the second port. The 3-port wavelength filter module outputs the reflected optical signal Sub-band 1 from the third port. Accordingly, by connecting the second port of the 3-port wavelength filter module to the first multiplexing unit 39 and connecting the third port to the processing unit 33, only the optical signal Sub-band 1 can be input to the processing unit 33. The 3-port wavelength filter module is a variable filter which can change an optical signal which reflects or passes based on an instruction from the control unit 35.

In the optical branch device 3, the demultiplexing unit 32 may be a WSS (Wavelength Selective Switch). In the optical branch device 3, in place of the first filter 36, the second filter 37, and the second multiplexing unit 38, a WSS may be employed.

A WSS is a switch which can independently set any path for each of a plurality of wavelengths included in a wavelength multiplexed optical signal. Here, as the WSS, a WSS described in Japanese Patent No. 5128254 can be used. The WSS includes a multiplexing/demultiplexing function, and can independently demultiplex or multiplex each of a plurality of optical signals included in a wavelength multiplexed optical signal.

Figure 10:
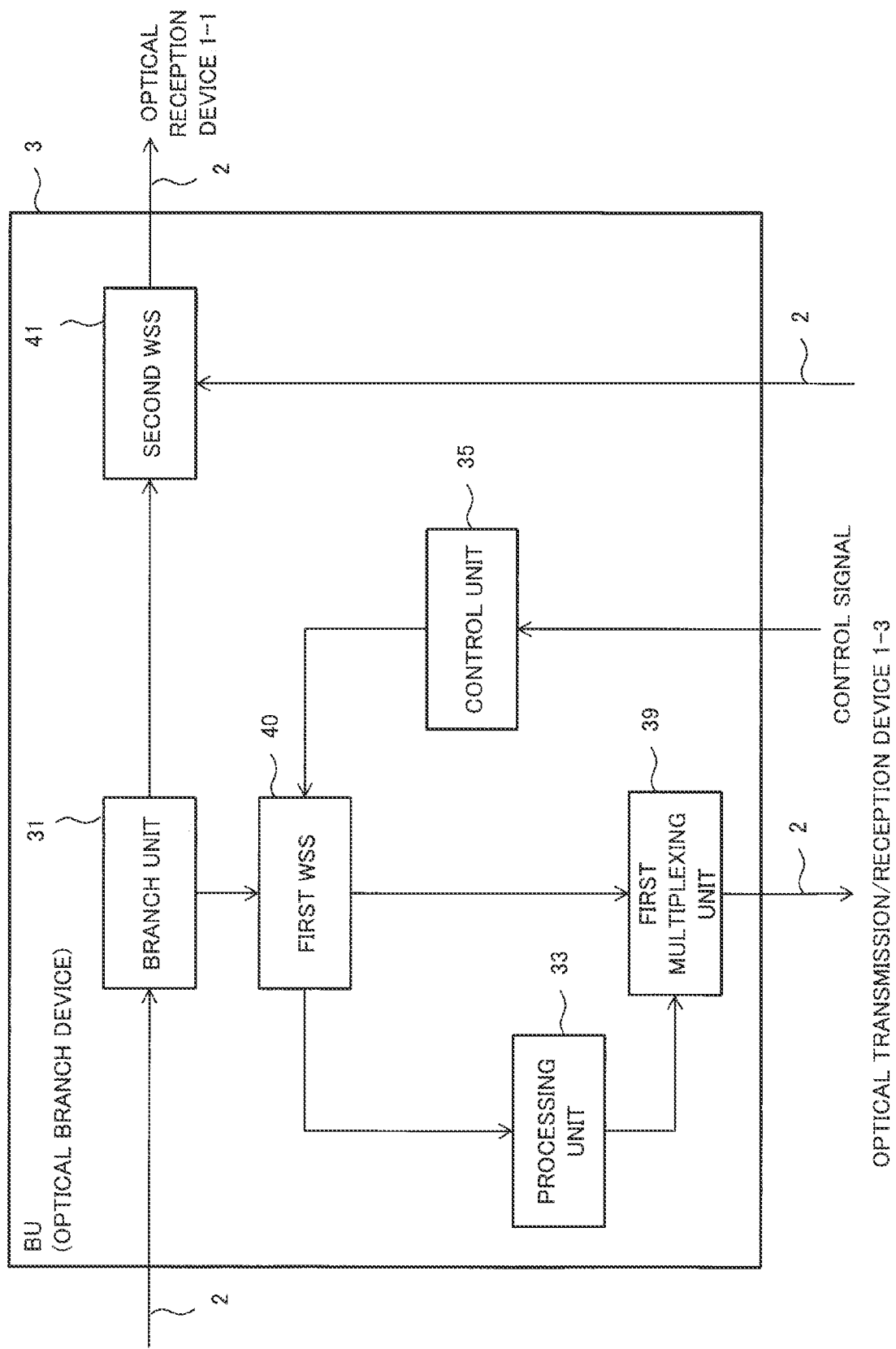
FIG. 10 is a diagram illustrating a configuration example of the optical branch device 3 when WSS is used in the third exemplary embodiment of the present invention.

FIG. 10 is a diagram illustrating a configuration example of the optical branch device 3 when a WSS is used. As illustrated in FIG. 10, the optical branch device 3 comprises a first WSS 40 in place of the demultiplexing unit 32. The first WSS 40 inputs at least one optical signal included in a wavelength multiplexed optical signal based on a notification from the control unit 35, and inputs the other optical signal (an optical signal which is not input to the processing unit 33) to the first multiplexing unit 39.

As illustrated in FIG. 10, the optical branch device 3 comprises a second WSS 41 in place of the first filter 36, the second filter 37, and the second multiplexing unit 38. The second WSS 41 multiplexes an optical signal destined for the optical reception device 1-1 among a plurality of optical signals included in a wavelength multiplexed optical signal from the optical transmission device 1-2 and an optical signal destined for the optical reception device 1-1 among a plurality of optical signals included in a wavelength multiplexed optical signal from the optical transmission/reception device 1-3. The second WSS 41 blocks an optical signal destined for the optical transmission/reception device 1-3 among a plurality of optical signals included in a wavelength multiplexed optical signal from the optical transmission device 1-2. The second WSS blocks an optical signal to which a predetermined change has been applied among a plurality of optical signals included in a wavelength multiplexed optical signal from the optical transmission/reception device 1-3.

As mentioned above, the optical branch device 3 in the third exemplary embodiment of the present invention performs a predetermined processing on the optical signal in such a way that, for example, an optical signal destined for the optical reception device 1-1 is not forwarded to the optical transmission/reception device 1-3. As a result, the optical branch device 3 can secure secrecy of data included in the optical signal even when an optical signal destined for the optical reception device 1-1 is forwarded to the optical transmission/reception device 1-3.

Fourth Exemplary Embodiment

A summary of a fourth exemplary embodiment of the present invention will be described with reference to the drawings. In the fourth exemplary embodiment of the present invention, a description of a configuration similar to the first exemplary embodiment of the present invention and the second exemplary embodiment of the present invention will be omitted.

A configuration example of an optical communication system in the fourth exemplary embodiment of the present invention is similar to FIG. 1.

Figure 11:
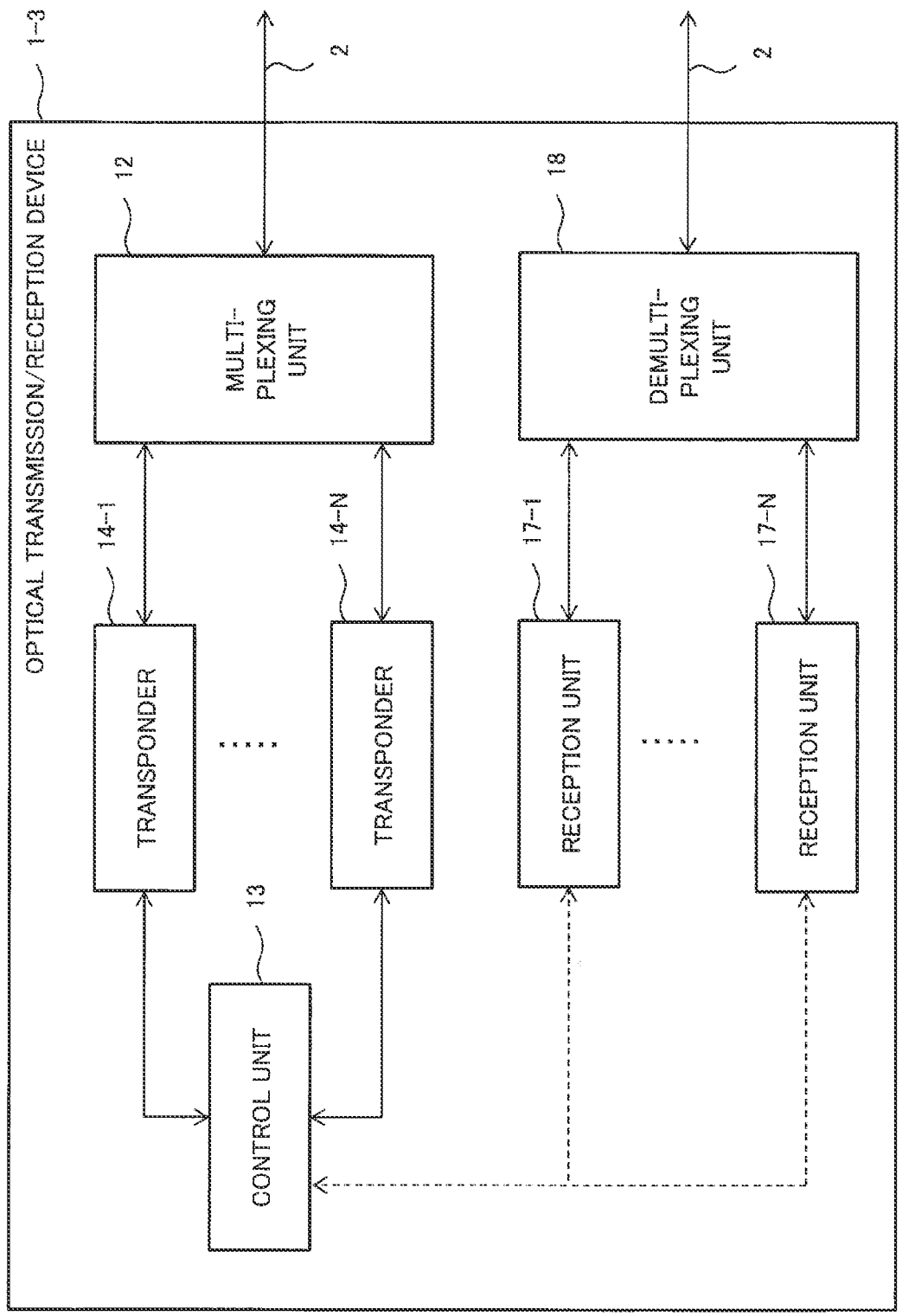
FIG. 11 is a diagram illustrating a configuration example of the optical transmission/reception device 1-3 in a fourth exemplary embodiment of the present invention.

FIG. 11 is a diagram illustrating a configuration example of the optical transmission/reception device 1-3. The optical transmission/reception device 1-3 comprises a multiplexing unit 12, a control unit 13, a plurality of transponders 14-1 to 14-N (when there is no particular need for distinction, referred to as "transponder 14"), a plurality of reception units 17-1 to 17-N, and a demultiplexing unit 18. In the fourth exemplary embodiment of the present invention, the transponder 14 corresponds to the output unit 11 in the second exemplary embodiment of the present invention.

Among the plurality of transponders 14, the control unit 13 specifies the reception unit 17 which has received an optical signal to which a predetermined processing is applied, and requests the transponder 14 corresponding to the specified reception unit 17 to output an optical signal to which a predetermined change has been applied.

Each of the transponders 14 outputs an optical signal of a predetermined wavelength.

Figure 12:
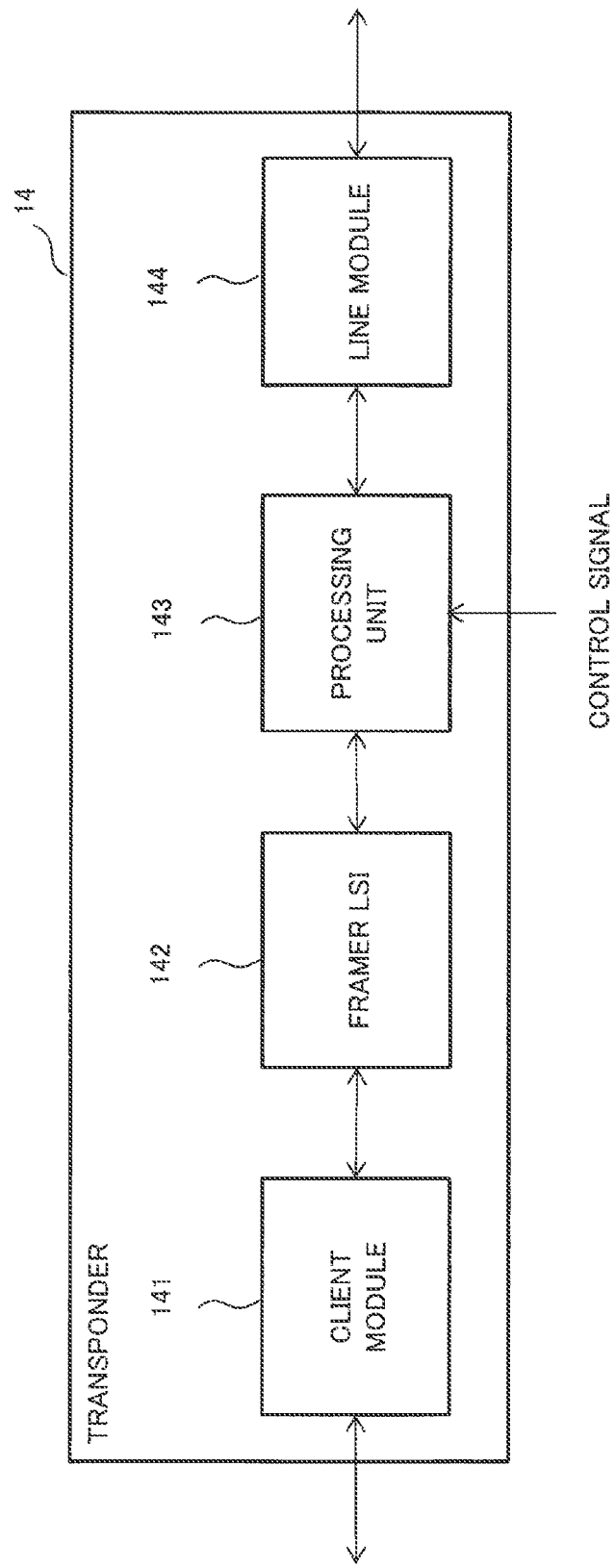
FIG. 12 is a configuration example of a transponder 14 in the fourth exemplary embodiment of the present invention.

FIG. 12 is a configuration example of the transponder 14 in the fourth exemplary embodiment of the present invention. The transponder 14 comprises a client module 141, a Framer LSI 142, a processing unit 143, and a line module 144. LSI is an abbreviation of large scale integration (large scale integrated circuit).

The client module 141 converts an optical signal received from a client device (not illustrated) into an electric signal, and outputs the electric signal as a signal received from a client to the Framer LSI 142.

The Framer LSI 142 accommodates the client signal input from the client module 141 in a frame for a line signal, and outputs the signal to the processing unit 143.

The processing unit 143 outputs an electric signal including a predetermined pattern (such as a dummy pattern or a fixed pattern) in place of the frame for a line signal to the line module 144 in response to a request from the control unit 13. On the other hand, when a control signal which requests to output an optical signal of a predetermined pattern is not received, the frame for a line signal received from the Framer LSI 142 is output to the line module 144.

The processing unit 143, in response to a request from the control unit 13, may as a scrambler randomly reshuffle a bit string of an electric signal input from the Framer LSI 142.

The line module 144 converts the input electric signal (a frame for a line signal or an electric signal of a predetermined pattern) into an optical signal of a predetermined wavelength, and outputs the signal to the multiplexing unit 12.

Figure 13:
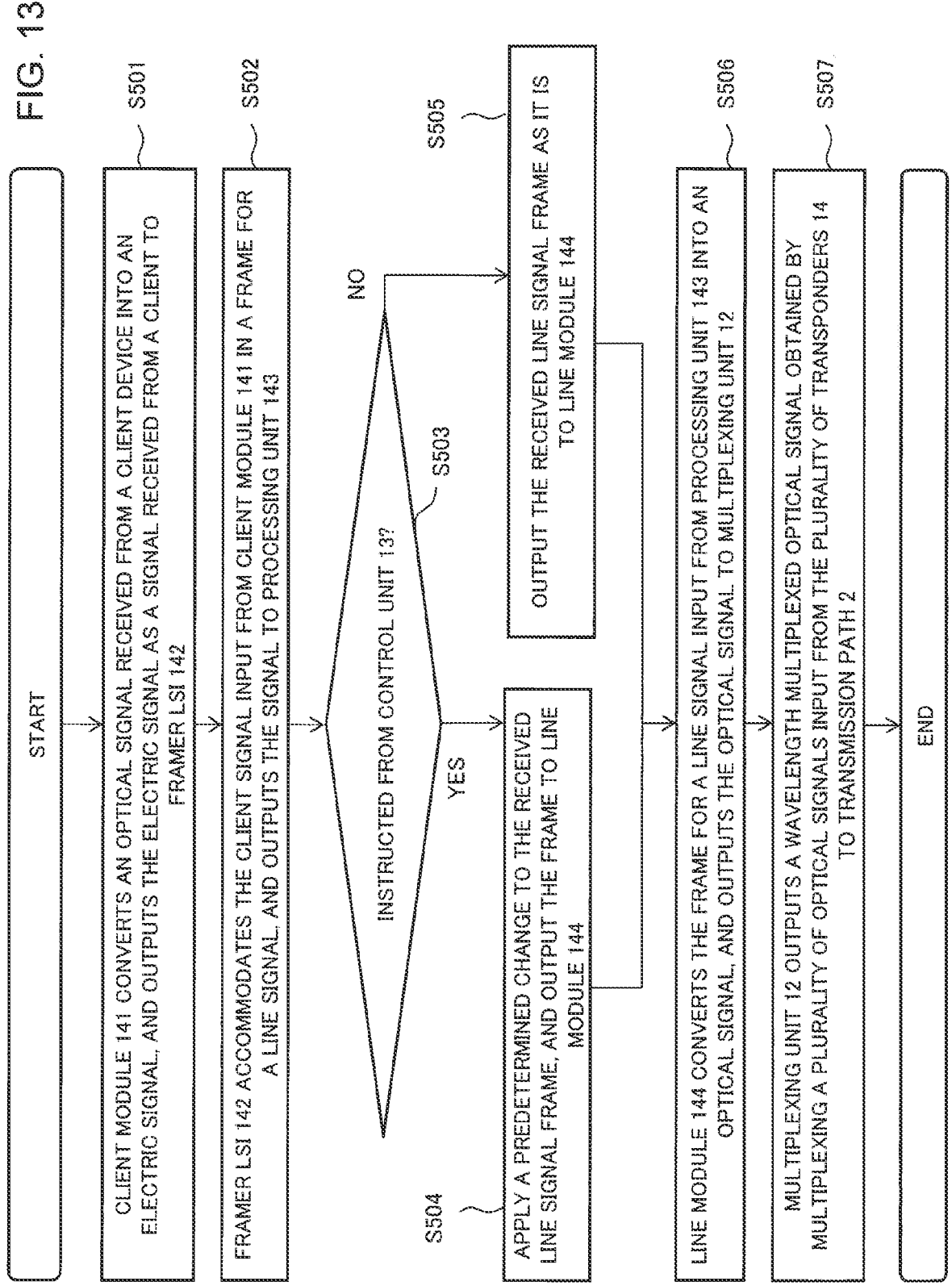
FIG. 13 is a flow chart illustrating an operational example of the optical transmission/reception device 1-3 in the fourth exemplary embodiment of the present invention.

FIG. 13 is a flow chart illustrating an operational example of the optical transmission/reception device 1-3 in the fourth exemplary embodiment of the present invention. FIG. 13 is an example when the optical transmission/reception device 1-3 transmits an optical signal.

The client module 141 converts an optical signal received from a client device (not illustrated) into an electric signal, and outputs the electric signal as a signal received from a client to the Framer LSI 142 (S501).

The Framer LSI 142 accommodates the client signal input from the client module 141 in a frame for a line signal, and outputs the signal to the processing unit 143 (S502).

The processing unit 143 determines whether the control unit 13 has requested to output an optical signal to which a predetermined change has been applied (S503).

The processing unit 143, in response to a request from the control unit 13 (YES in S503), applies a predetermined change to the received line signal frame, and outputs the frame to the line module 144 (S504).

On the other hand, the processing unit 143, when not requested from the control unit 13 (NO in S503), outputs the received line signal frame as it is to the line module 144 (S505).

The line module 144 converts the frame for a line signal input from the processing unit 143 into an optical signal, and outputs the optical signal to the multiplexing unit 12 (S506).

The multiplexing unit 12 outputs a wavelength multiplexed optical signal obtained by multiplexing a plurality of optical signals input from the plurality of transponders 14 to the transmission path 2 (S507).

Figure 14:
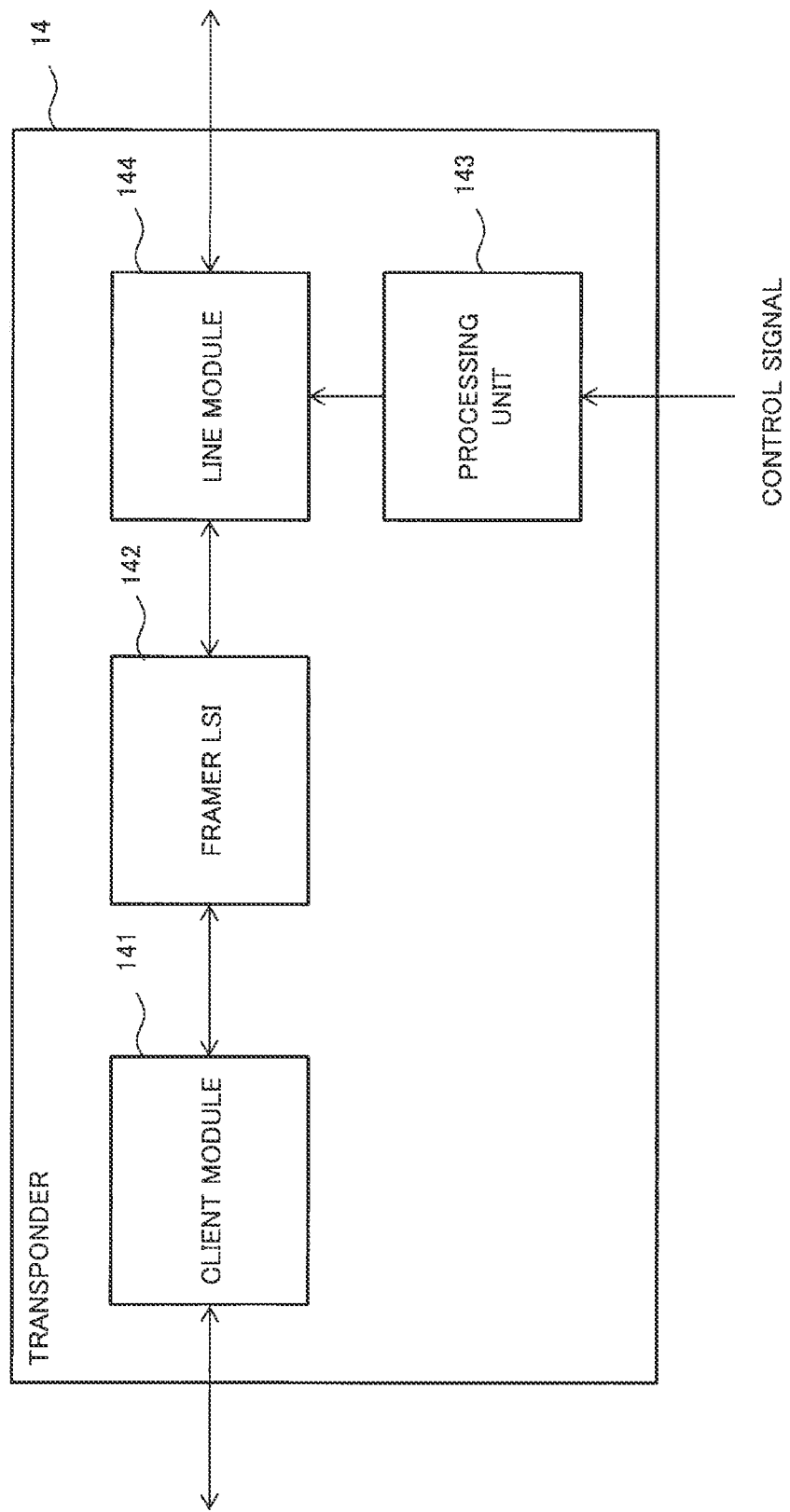
FIG. 14 is another configuration example of the transponder 14 in the fourth exemplary embodiment of the present invention.

The transponder 14 may be a configuration example illustrated in FIG. 14. In this case, the processing unit 143, in response to a request from the control unit 13, outputs an electric signal including a predetermined pattern (such as a dummy pattern or a fixed pattern) to the line module 144. The line module 144, when an electric signal including a predetermined pattern is input from the processing unit 143, converts, in place of the frame for a line signal, an electric signal including a predetermined pattern into an optical signal of a predetermined wavelength, and outputs the signal to the multiplexing unit 12.

Figure 15:
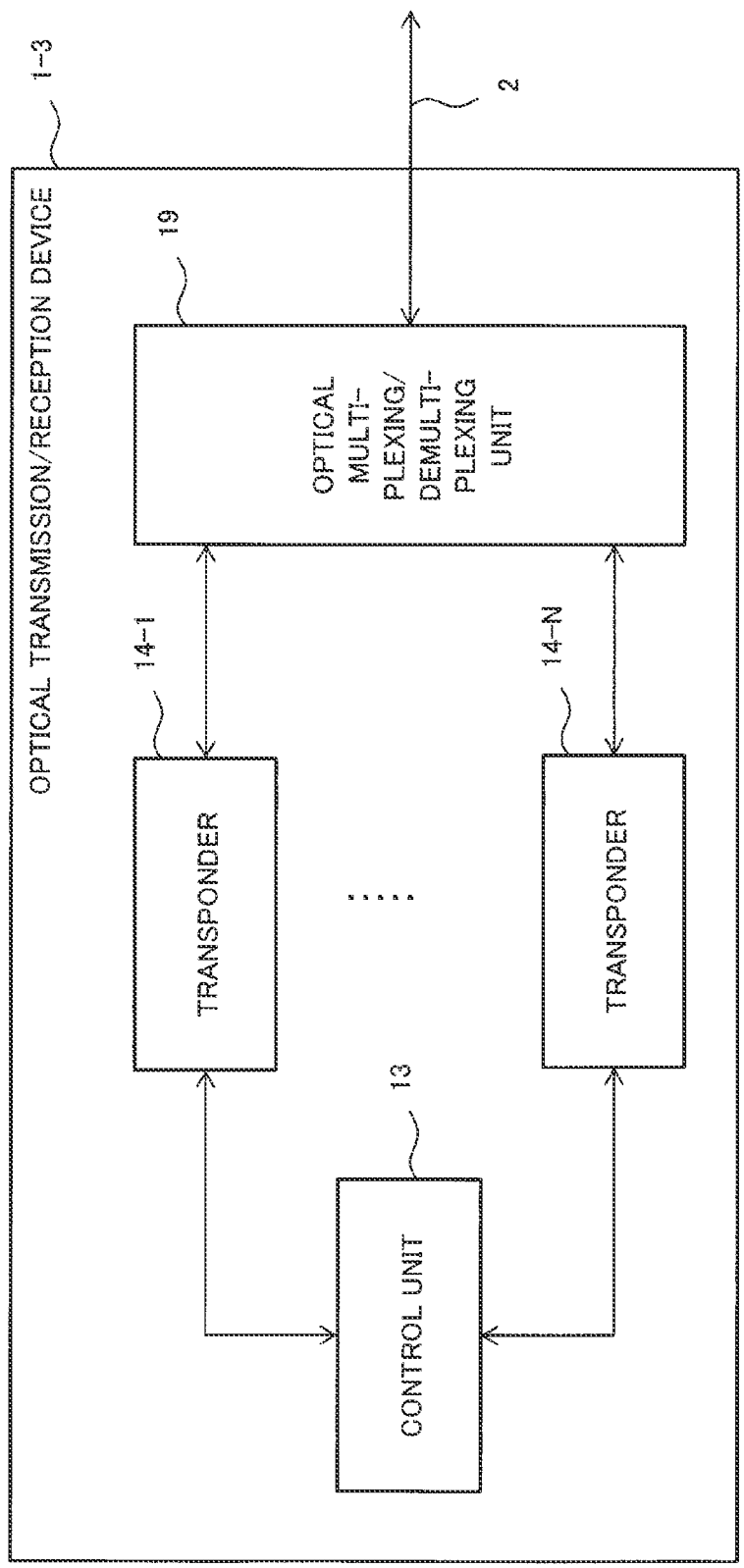
FIG. 15 is a diagram illustrating another configuration example of the optical transmission/reception device 1-3 in the fourth exemplary embodiment of the present invention.

The optical transmission/reception device 1-3 may be a configuration example illustrated in FIG. 15. As illustrated in FIG. 15, the optical transmission/reception device 1-3 comprises a transponder 14, a control unit 13, and an optical multiplexing/demultiplexing unit 19.

The optical multiplexing/demultiplexing unit 19 demultiplexes a wavelength multiplexed optical signal received from the transmission path 2, and outputs the demultiplexed signals to each of the plurality of transponders 14. To each of the plurality of transponders 14, a wavelength of an optical signal to be input/output is assigned. The optical multiplexing/demultiplexing unit 19 outputs an optical signal having the assigned wavelength to each of the plurality of transponders 14. The optical multiplexing/demultiplexing unit 19 multiplexes a plurality of optical signals input from each of the plurality of transponders 14, and outputs the multiplexed signal. In the fourth exemplary embodiment of the present invention, a wavelength multiplexed optical signal received by the optical multiplexing/demultiplexing unit 19 includes an optical signal to which a predetermined processing has been applied.

In an example of FIG. 15, a case in which the transponder 14 of the optical transmission/reception device 1-3 has received an optical signal from the optical multiplexing/demultiplexing unit 19 will be described.

The line module 144 converts an optical signal received from the multiplexing unit 12 into an electric signal, and outputs the signal as a line-received signal (line signal frame) to the processing unit 143. The processing unit 143 outputs the line-received signal (frame for a line signal) input from the line module 144 to the Framer LSI 142.

The Framer LSI 142 extracts a client signal from the frame for a line signal input from the processing unit 143, and outputs the extracted signal as an electric signal to the client module 141.

The client module 141 converts the electric signal input from the Framer LSI 42 into an optical signal, and transmits the converted signal as a client signal to a client device (not illustrated).

In the optical transmission/reception device 1-3 illustrated in FIG. 15, a configuration and an operation when the transponder 14 of the optical transmission/reception device 1-3 transmits an optical signal to the optical multiplexing/demultiplexing unit 19 are similar to the case of FIG. 11 described above.

As mentioned above, in the fourth exemplary embodiment of the present invention, the optical transmission/reception device 1-3 applies a predetermined change to an optical signal output from the transponder 14 corresponding to (whose channel is the same as that of) a reception unit 17 which has received an optical signal to which a predetermined processing has been applied. For this reason, the optical transmission/reception device 1-3 can secure secrecy of data superimposed on an optical signal output from the transponder 14 to which a channel which is not used for transmitting/receiving data is assigned.

Fifth Exemplary Embodiment

A summary of a fifth exemplary embodiment of the present invention will be described with reference to the drawings.

In the fifth exemplary embodiment of the present invention, an optical transmission device 1-2 outputs an optical signal to which a predetermined change has been applied based on a predetermined condition (for example, an optical signal output from the transmission unit 121 has been forwarded to a device which is not an original transmission destination).

In the fifth exemplary embodiment of the present invention, a configuration example of an optical communication system is similar to a configuration example of an optical communication system illustrated in FIG. 1.

Figure 16:
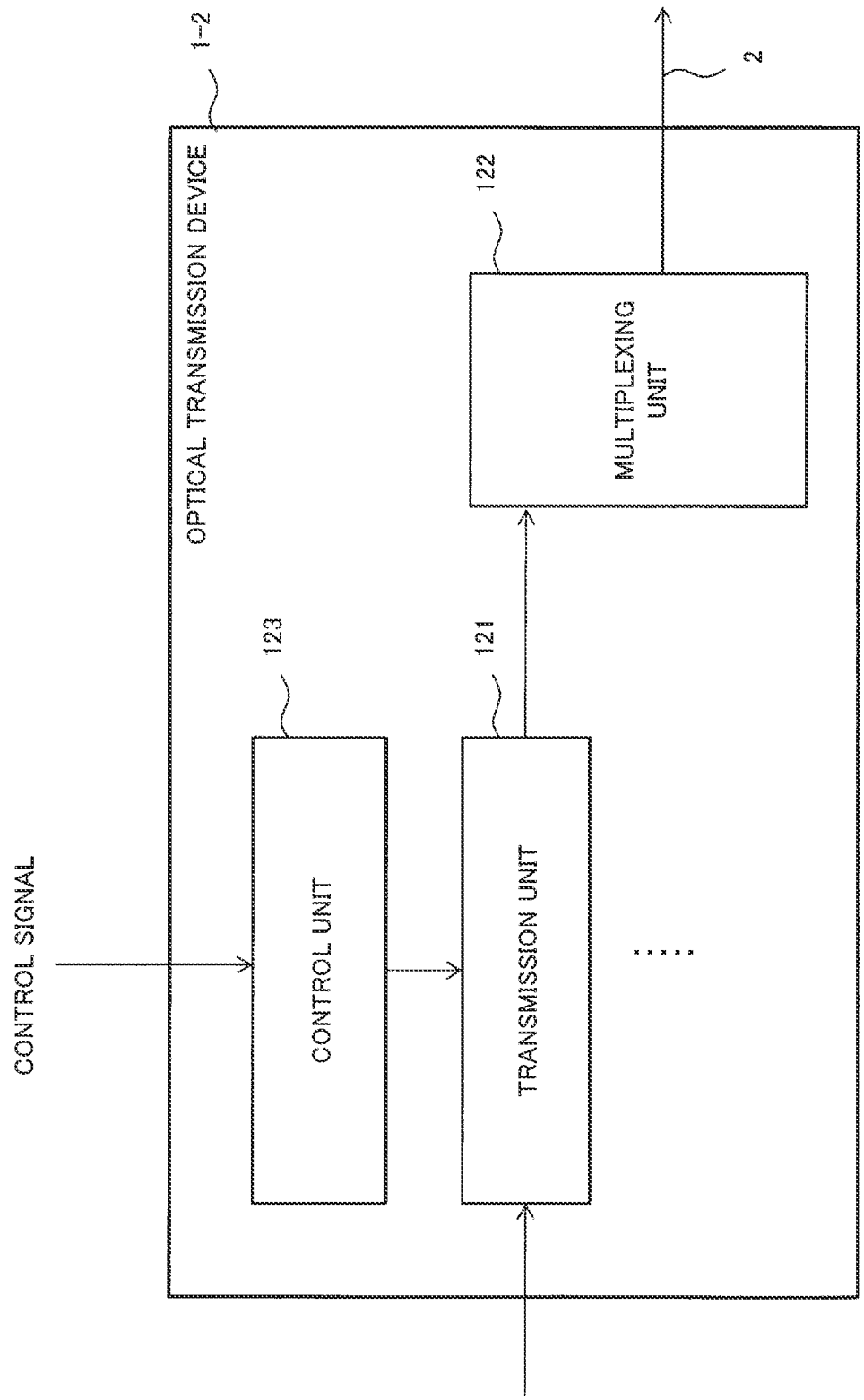
FIG. 16 is a diagram illustrating a configuration example of an optical transmission device 1-2 in a fifth exemplary embodiment of the present invention.

FIG. 16 is a diagram illustrating a configuration example of the optical transmission device 1-2. The optical transmission device 1-2 comprises a transmission unit 121, a multiplexing unit 122, and a control unit 123. The optical transmission device 1-2 comprises a plurality of transmission units 121.

The multiplexing unit 122 outputs a wavelength multiplexed signal light obtained by multiplexing optical signals input from each of the plurality of transmission units 121 to the transmission path 2.

The control unit 123, when a predetermined condition is satisfied, requests the transmission unit 121 to apply a predetermined change to an optical signal to be output.

The predetermined condition is, for example, that a control signal which requests to output an optical signal of a predetermined pattern has been received. The control signal is transmitted to the control unit 123 when a failure occurs in the transmission path 2 and when an optical signal output from the optical transmission device 1-2 is forwarded to a device which is not an original transmission destination.

The transmission unit 121, when instructed from the control unit 123, applies a predetermined change to an optical signal to be output, and outputs the signal to the multiplexing unit 122. The optical signal to which a predetermined change has been applied is, for example, an optical signal including a predetermined pattern. The predetermined pattern is, for example, a dummy pattern in which 0 and 1 are randomly arranged, or a fixed pattern in which 0 and 1 are arranged in a specific pattern.

The transmission unit 121, when not instructed by the control unit 123, converts an electric signal input from a device (not illustrated in FIG. 16) in a previous stage into an optical signal, and outputs the optical signal to the multiplexing unit 122. In other words, the transmission unit 121 outputs an optical signal including data when not instructed by the control unit 123.

Figure 17:
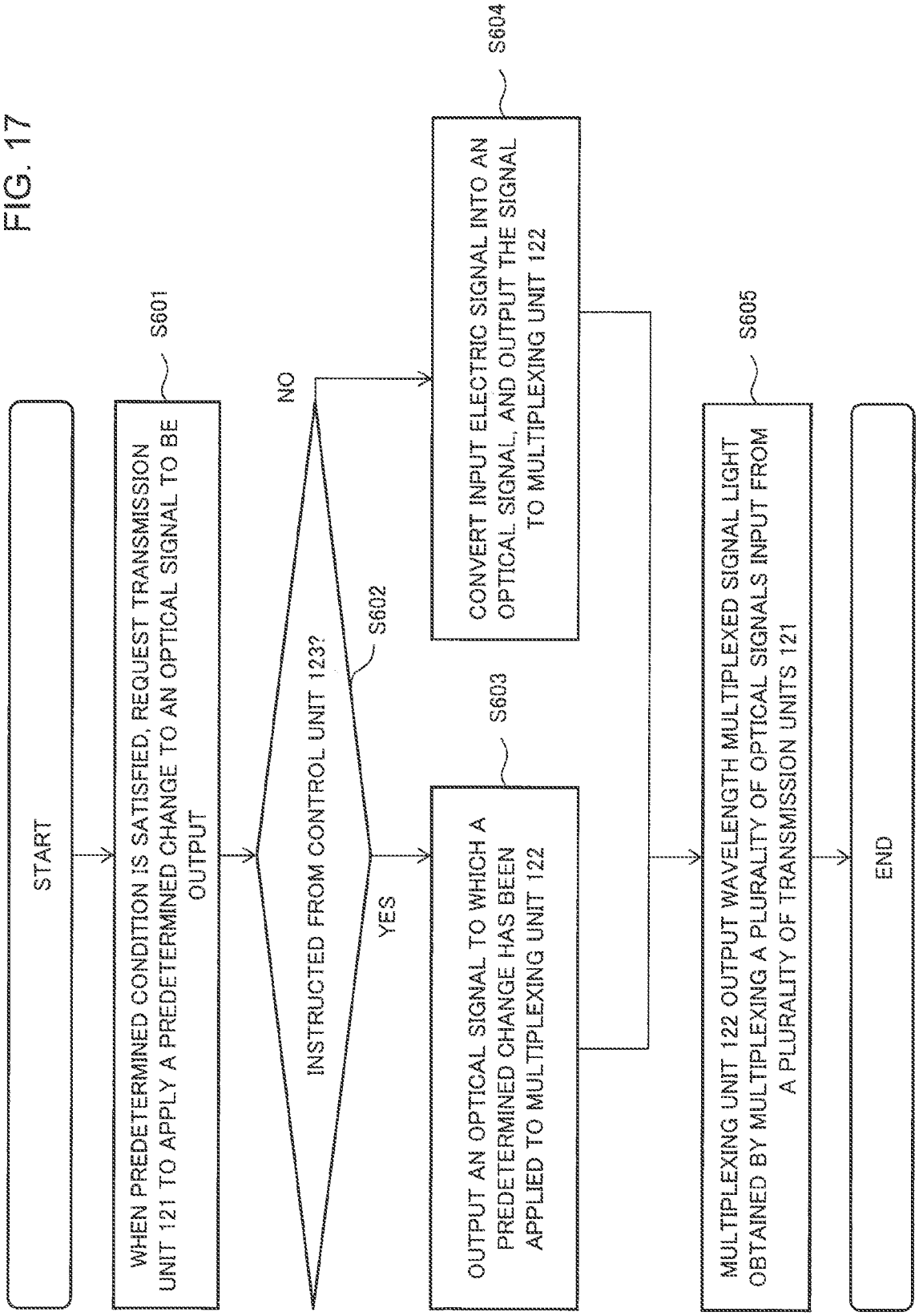
FIG. 17 is a flow chart illustrating an operational example of the optical transmission device 1-2 in the fifth exemplary embodiment of the present invention.

FIG. 17 is a flow chart illustrating an operational example of the optical transmission device 1-2 in the fifth exemplary embodiment of the present invention.

The control unit 123, when a predetermined condition is satisfied, requests the transmission unit 121 to apply a predetermined change to an optical signal to be output (S601).

The transmission unit 121 determines whether the control unit 123 has instructed (S602).

The transmission unit 121, when instructed from the control unit 123 (YES in S602), outputs an optical signal to which a predetermined change has been applied to the multiplexing unit 122 (S603).

The transmission unit 121, when not instructed by the control unit 123 (NO in S602), converts the input electric signal into an optical signal, and outputs the signal to the multiplexing unit 122 (S604).

The multiplexing unit 122 outputs a wavelength multiplexed signal light obtained by multiplexing a plurality of optical signals input from a plurality of transmission units 121 to the transmission path 2 (S605).

As mentioned above, the optical transmission device 1-2 of the fifth exemplary embodiment of the present invention outputs an optical signal to which a predetermined change has been applied based on a predetermined condition (for example, an optical signal output from the transmission unit 121 has been forwarded to a device which is not an original transmission destination). An optical signal to which a predetermined change has been applied is, for example, an optical signal including a dummy pattern in which 0 and 1 are randomly arranged, or a fixed pattern in which 0 and 1 are arranged in a specific pattern, and it is difficult to reproduce an original optical signal. As a result, the optical transmission device 1-2 can secure secrecy of data included in the optical signal even when an optical signal including data is forwarded to a device which is not an original transmission destination.

Sixth Exemplary Embodiment of the Present Invention

A summary of a sixth exemplary embodiment of the present invention will be described with reference to the drawings. In the sixth exemplary embodiment of the present invention, a description of a configuration similar to the above-described exemplary embodiments of the present invention will be omitted.

A configuration example of an optical communication system in the sixth exemplary embodiment of the present invention is similar to FIG. 1.

Figure 18:
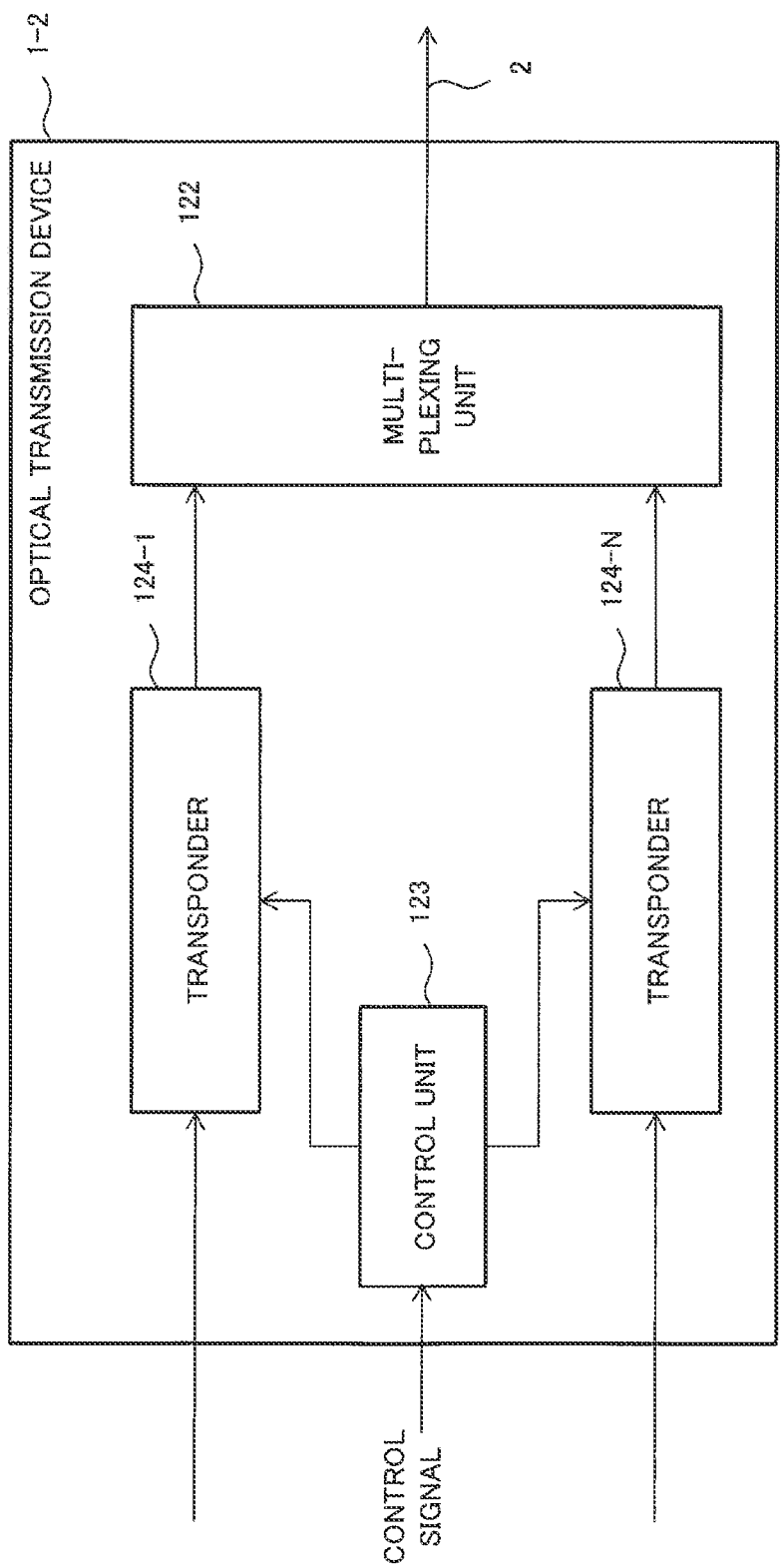
FIG. 18 is a diagram illustrating a configuration example of the optical transmission device 1-2 in a sixth exemplary embodiment of the present invention.

FIG. 18 is a diagram illustrating a configuration example of the optical transmission device 1-2. The optical transmission device 1-2 comprises a multiplexing unit 122, a control unit 123, and a plurality of transponders 124-1 to 124-N (when there is no particular need for distinction, referred to as "transponder 124"). The transponder 124 in the sixth exemplary embodiment of the present invention corresponds to the transmission unit 121 in the fifth exemplary embodiment of the present invention.

The control unit 123, when a predetermined condition is satisfied, instructs the transponder 124 to output an optical signal including a predetermined pattern.

The predetermined condition is, for example, that a control signal which requests to output an optical signal of a predetermined pattern has been received. The control signal is transmitted to the control unit 123 when a failure occurs in the transmission path 2 and when an optical signal output from the optical transmission device 1-2 is forwarded to a device which is not an original transmission destination.

The transponder 124, when instructed from the control unit 123, outputs an optical signal of a predetermined pattern to the multiplexing unit 122.

The transponder 124, when not instructed by control unit 123, converts an electric signal input from a device in a previous stage (for example, a client device) into an optical signal, and outputs the signal to the multiplexing unit 122.

Figure 19:
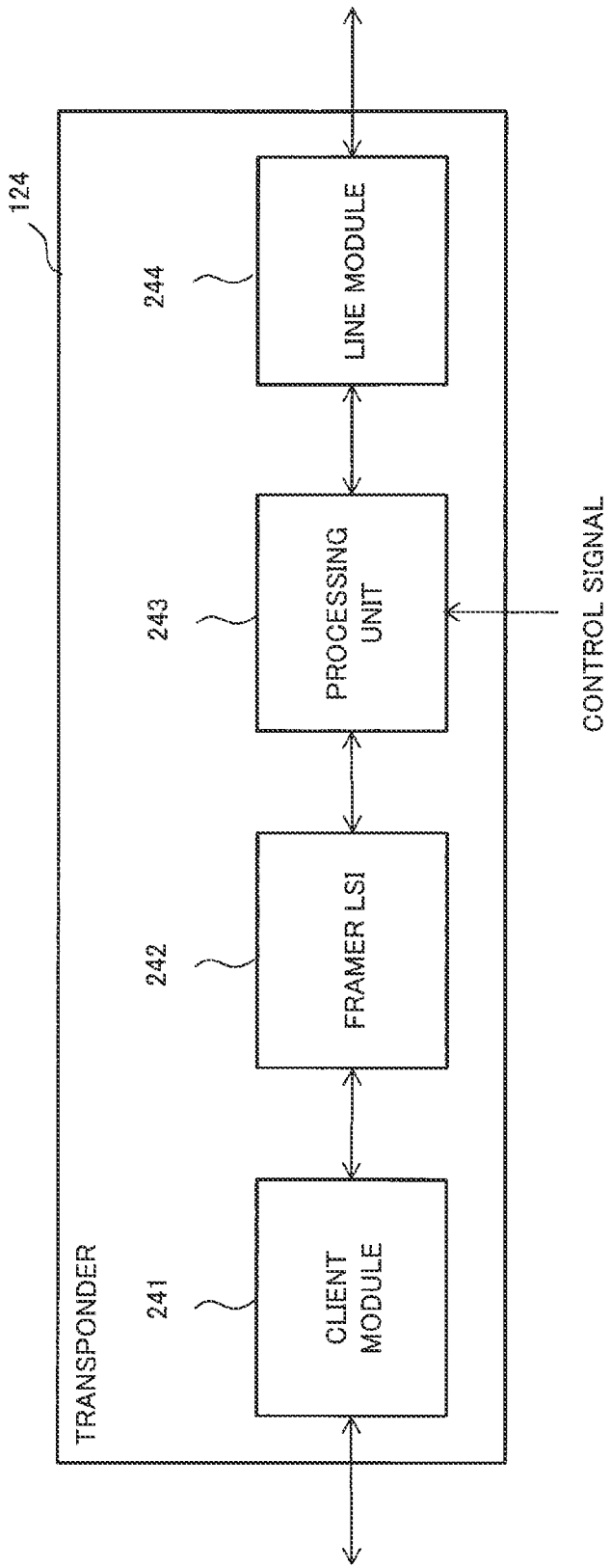
FIG. 19 is a configuration example of a transponder 124 in the sixth exemplary embodiment of the present invention.

FIG. 19 is a configuration example of the transponder 124 in the sixth exemplary embodiment of the present invention. The transponder 124 comprises a client module 241, a Framer LSI 242, a processing unit 243, and a line module 244.

The client module 241 converts an optical signal received from a client device (not illustrated) into an electric signal, and outputs the signal as a signal received from a client to the Framer LSI 242.

The Framer LSI 242 accommodates the client signal input from the client module 241 in a frame for a line signal, and outputs the signal to the processing unit 243.

The processing unit 243, when a control signal which requests to output a signal of a predetermined pattern is received, outputs an electric signal including a predetermined pattern (such as a dummy pattern or a fixed pattern) in place of the frame for a line signal to the line module 244. On the other hand, when a control signal which requests to output an optical signal of a predetermined pattern is not received, the frame for a line signal received from the Framer LSI 242 is output to the line module 244.

The processing unit 243, in place of generation of a dummy pattern and a fixed pattern, may as a scrambler randomly reshuffle a bit string of an electric signal input from the Framer LSI 242.

The line module 244 converts the input electric signal (a frame for a line signal or an electric signal of a predetermined pattern) into an optical signal of a predetermined wavelength, and outputs the signal to the multiplexing unit 122.

Figure 20:
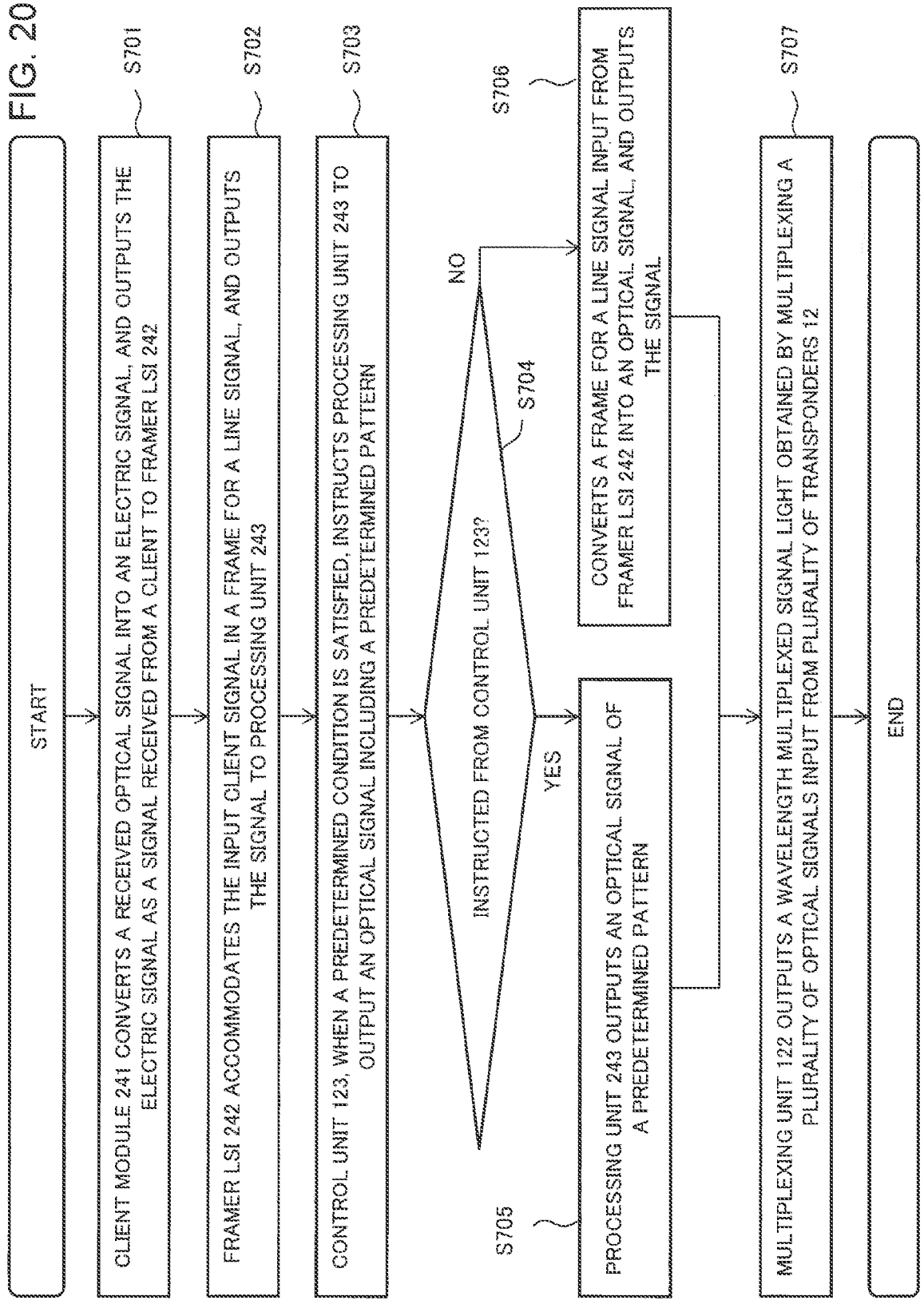
FIG. 20 is a flow chart illustrating an operational example of the optical transmission device 1-2 in the sixth exemplary embodiment of the present invention.

FIG. 20 is a flow chart illustrating an operational example of the optical transmission device 1-2 in the sixth exemplary embodiment of the present invention.

The client module 241 converts an optical signal received from a client device (not illustrated) into an electric signal, and outputs the electric signal as a signal received from a client to the Framer LSI 242 (S701).

The Framer LSI 242 accommodates the client signal input from the client module 241 in a frame for a line signal, and outputs the signal to the processing unit 243 (S702).

The control unit 123, when a predetermined condition is satisfied, instructs the processing unit 243 in the transponder 124 to output an optical signal including a predetermined pattern (S703).

The processing unit 243 determines whether the control unit 123 has instructed (S704).

The processing unit 243, when instructed from the control unit 123 (YES in S704), outputs an optical signal of a predetermined pattern (S705).

On the other hand, the processing unit 243, when not instructed by the control unit 123 (NO in S704), converts a frame for a line signal input from the Framer LSI 242 into an optical signal, and outputs the signal to the multiplexing unit 122 (S706).

The multiplexing unit 122 outputs a wavelength multiplexed signal light obtained by multiplexing a plurality of optical signals input from the plurality of transponders 124 to the transmission path 2 (S707).

Figure 21:
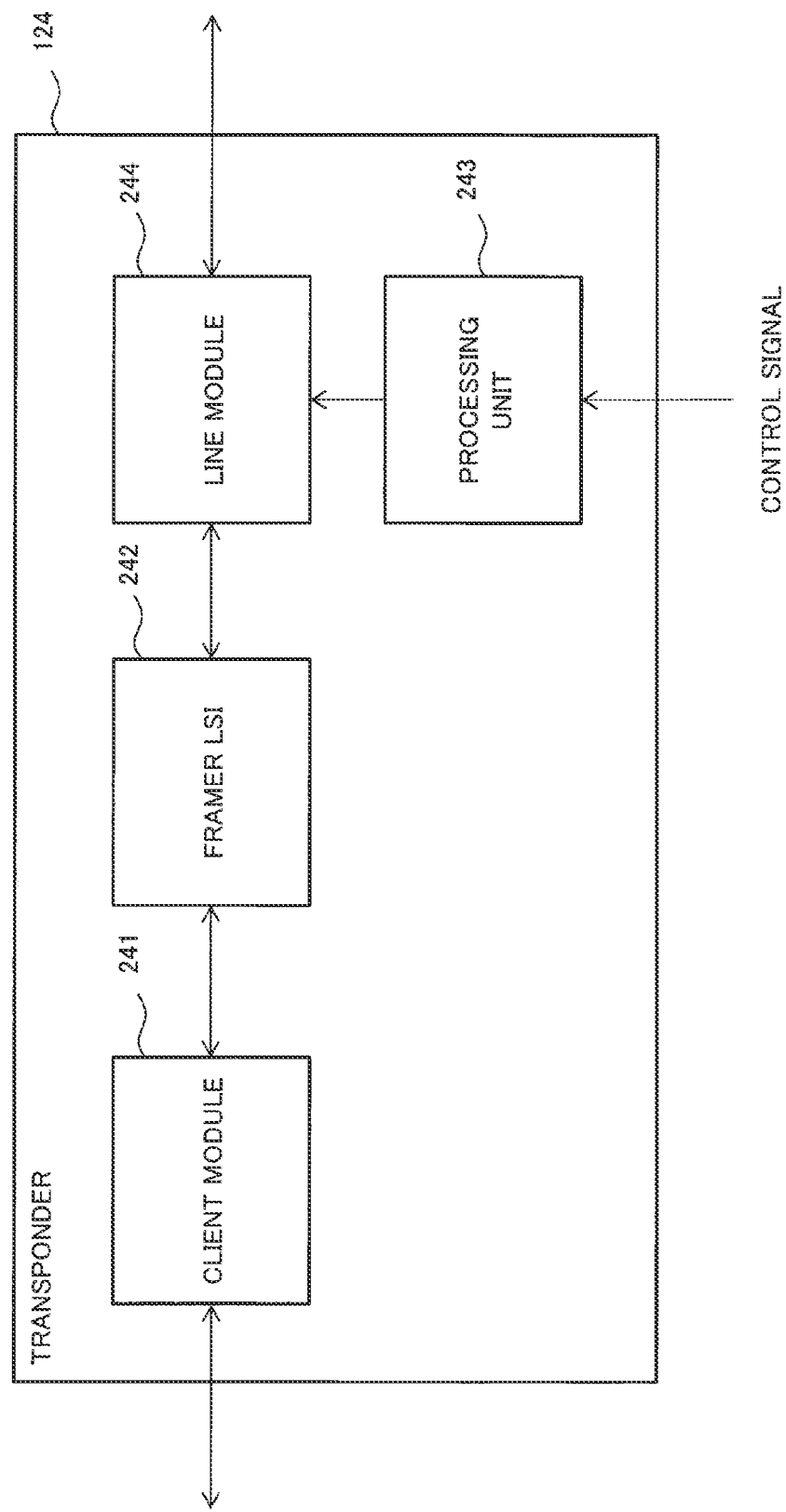
FIG. 21 is another configuration example of the transponder 124 in the sixth exemplary embodiment of the present invention.

The transponder 124 may be a configuration example illustrated in FIG. 21. In this case, the processing unit 243, when a control signal which requests to output a signal of a predetermined pattern is received, outputs an electric signal including a predetermined pattern (such as a dummy pattern or a fixed pattern) to the line module 244. The line module 244, when an electric signal including a predetermined pattern is input from the processing unit 243, converts, in place of the frame for a line signal, an electric signal including a predetermined pattern into an optical signal of a predetermined wavelength, and outputs the signal to the multiplexing unit 122.

As mentioned above, the optical transmission device 1-2 of the sixth exemplary embodiment of the present invention, when a control signal which requests to output an optical signal of a predetermined pattern is received, outputs an optical signal of a predetermined pattern (such as a dummy pattern or a fixed pattern). For this reason, the optical transmission device 1-2 can transmit a signal of a predetermined pattern in place of an optical signal including data, for example, when an optical signal including data has been forwarded to a device which is not an original transmission destination. As a result, the optical transmission device 1-2 can prevent an optical signal including data from being forwarded to a device which is not an original transmission destination, thereby securing secrecy of data included in the optical signal.

Seventh Exemplary Embodiment

A summary of a seventh exemplary embodiment of the present invention will be described with reference to the drawings. In the seventh exemplary embodiment of the present invention, a description of a configuration similar to the above-described exemplary embodiments of the present invention will be omitted.

The seventh exemplary embodiment of the present invention is an exemplary embodiment when a processing unit is a polarization scrambler. In other words, the seventh exemplary embodiment of the present invention is an exemplary embodiment when the processing unit 33 of the optical branch device 3 is a polarization scrambler 42 of FIG. 22 described below, and the processing unit 143 of the optical transmission/reception device 1-3 is a polarization scrambler 145 of FIG. 23 described below. The processing unit 243 of the optical transmission device 1-1 may also be a polarization scrambler.

In the seventh exemplary embodiment of the present invention, data is superimposed on an optical signal by polarization modulation.

Here, the polarization scramblers 42 and 145 polarization-modulate the input optical signal, and output the polarization-modulated optical signal.

For the polarization scramblers 42 and 145, a polarization scrambler described, for example, in Japanese Patent No. 3777045 can be used. The polarization scrambler is obtained by forming an optical waveguide on a substrate having an electrooptic effect such as lithium niobate, providing an electrode on the substrate, and optically coupling an optical fiber to an input/output portion of the optical waveguide. In a polarization scrambler having such a configuration, a signal light of a linearly polarized wave enters the optical waveguide with its polarization direction inclined at 45 degrees with respect to the vertical direction of the optical waveguide, whereby the linearly polarized wave is decomposed into a vertical component and a horizontal component. At this time, by applying a modulating signal such as a sine wave to an electrode provided on the optical waveguide, the refractive indices of the vertical component and the horizontal component of the optical waveguide change by an electrooptic effect, thereby changing the velocity of each direction component of propagation in the optical waveguide. By this, a phase difference is generated between the vertical component and the horizontal component of a signal light, which makes the polarization state of an optical signal to be emitted random.

As mentioned above, in the seventh exemplary embodiment of the present invention, data is superimposed on an optical signal by a polarization modulation. For this reason, when the polarization state of an optical signal is made random by the polarization scramblers 42 or 145, data cannot be decoded from the optical signal. As a result, since data cannot be restored even when the optical signal is forwarded to a device which is not an original transmission destination, secrecy of the data is secured.

A configuration example of an optical communication system in the seventh exemplary embodiment of the present invention is similar to FIG. 1.

Figure 22:
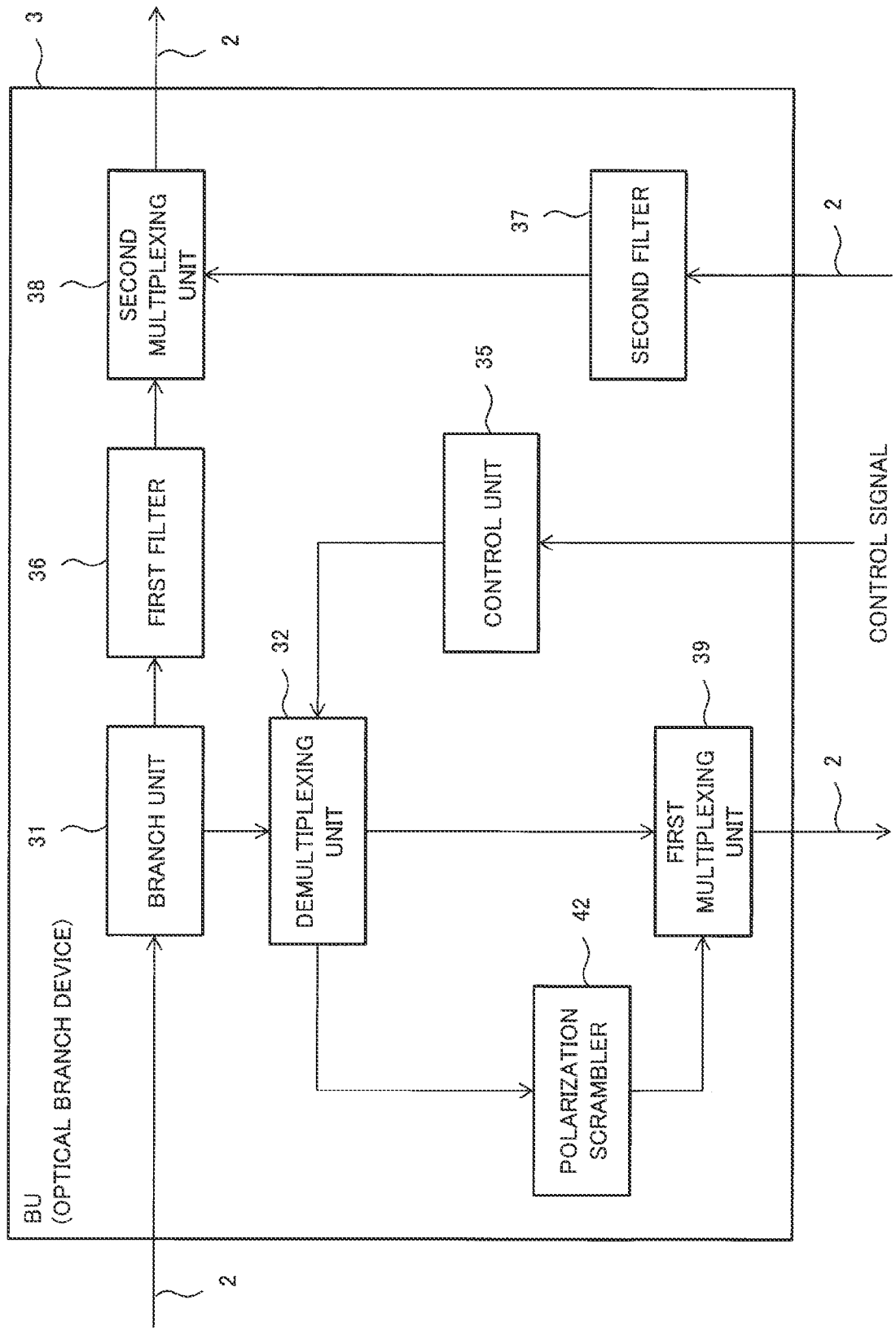
FIG. 22 is a configuration example of the optical branch device 3 in a seventh exemplary embodiment of the present invention.

FIG. 22 is a configuration example of the optical branch device 3 in the seventh exemplary embodiment of the present invention. As illustrated in FIG. 22, the optical branch device 3 includes the polarization scrambler 42 in place of the processing unit 33. The polarization scrambler 42 polarization-modulates an optical signal input from the demultiplexing unit 32, and inputs the polarization-modulated optical signal to a first multiplexing unit 39.

A configuration example of the optical transmission/reception device 1-3 in the seventh exemplary embodiment of the present invention is similar to FIG. 11.

Figure 23:
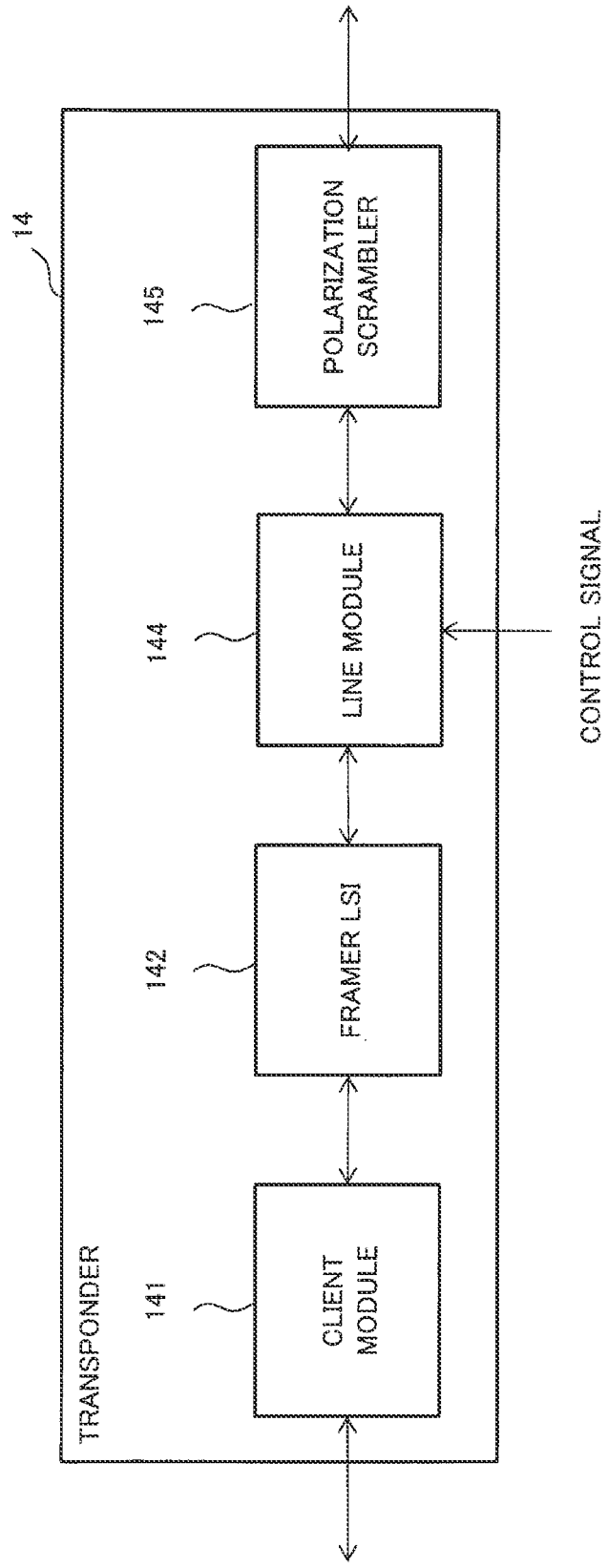
FIG. 23 is a diagram illustrating a configuration example of the transponder 14 included in the optical transmission/reception device 1-3 in the seventh exemplary embodiment of the present invention.

FIG. 23 is a diagram illustrating a configuration example of the transponder 14 included in the optical transmission/reception device 1-3 in the seventh exemplary embodiment of the present invention. The transponder 14 includes a polarization scrambler 145. The polarization scrambler 145 polarization-modulates an optical signal input from the line module 144 based on a control signal from the control unit 13. In this case, the control unit 13, when a control signal which requests to output an optical signal of a predetermined pattern is received, requests the polarization scrambler 145 to polarization-modulates an optical signal.

As mentioned above, the optical branch device 3 in the seventh exemplary embodiment of the present invention polarization-modulates a predetermined optical signal included in a wavelength multiplexed optical signal to be transmitted to the optical transmission/reception device 1-3. For example, the optical branch device 3 polarization-modulates an optical signal destined for the optical reception device 1-1 by the polarization scrambler 42, thereby making the optical signal irreproducible even when the optical signal is received by the optical transmission/reception device 1-3. As described above, the optical branch device 3 in the seventh exemplary embodiment of the present invention can make the optical signal irreproducible even when an optical signal including data is forwarded to a device which is not an original transmission destination, thereby securing secrecy of data included in the optical signal.

The optical transmission/reception device 1-3 of the seventh exemplary embodiment outputs an optical signal to which a polarization modulation has been applied from the transponder 14 corresponding to the reception unit 17 which has received an optical signal to which a predetermined processing is applied among a plurality of transponders 14. As a result, the optical transmission/reception device 1-3 can use an optical signal output from at least one of the plurality of transponders as a dummy light, and can secure secrecy of data which has been superimposed on the optical signal.

Further, when the processing unit 243 is a polarization scrambler, the optical transmission device 1-2 can apply a polarization modulation to an optical signal including data and transmit the data, for example, when an optical signal including data is forwarded to a device which is not an original transmission destination. As a result, the optical transmission device 1-2 can make the optical signal irreproducible even when an optical signal including data is forwarded to a device which is not an original transmission destination, thereby securing secrecy of data included in the optical signal.

Eighth Exemplary Embodiment

A summary of an eighth exemplary embodiment of the present invention will be described with reference to the drawings. In the eighth exemplary embodiment of the present invention, a description of a configuration similar to the above-described exemplary embodiments will be omitted.

The eighth exemplary embodiment of the present invention is an exemplary embodiment when the processing unit 33 of the optical branch device 3 is a PMD (Polarization Mode Dispersion) addition device 43 of FIG. 26 described below. In the eighth exemplary embodiment of the present invention, the PMD addition device 43 generates a primary PMD and a secondary PMD with respect to an optical signal to be input, thereby making an optical signal output from the PMD addition device 43 irreproducible from the input optical signal.

An optical signal to which a PMD is added splits into polarized waves having different oscillating directions by 90 degrees to propagate. The split two polarized waves propagate at different velocities to cause a difference in time at which the waves reach the optical reception device 1-1. Such a difference is referred to as a DGD (Differential Group Delay), which is a scale for indicating the degree of a PMD. Since, as a DGD of an optical signal increases, adjacent data in time overlap, a digital data of "0" and "1" superimposed on the optical signal cannot be correctly distinguished. In other words, the PMD addition device 43 purposely generates a PMD causing a large DGD with respect to an optical signal, thereby making data superimposed on the optical signal irreproducible.

Figure 24:
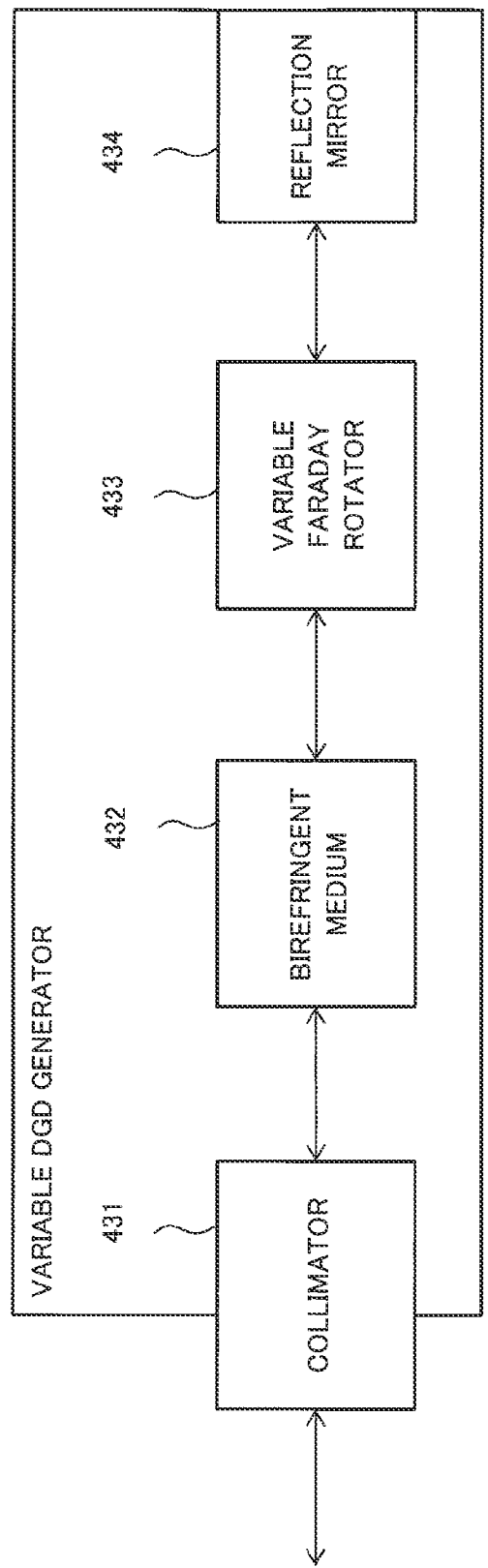
FIG. 24 is a diagram illustrating a configuration example of a variable DGD generator in an eighth exemplary embodiment of the present invention.

Here, for the PMD addition device 43, a variable DGD generator described in Japanese Patent No. 4142300 can be used. FIG. 24 is a diagram illustrating a configuration example of a variable DGD generator described in Japanese Patent No. 4142300. The variable DGD generator comprises a collimator 431, a birefringent medium 432, a variable faraday rotator 433, and a reflection mirror 434.

An optical signal is converted into a light beam in the collimator 431, and enters the birefringent medium 432. The propagation velocities of polarized wave components in the directions of the fast axis and the slow axis of the birefringent medium 432 of the light beam which has entered the birefringent medium 432 differ. In other words, a DGD is added to a light beam which has entered the birefringent medium 432.

A light beam to which a DGD has been added enters the variable faraday rotator 433, rotated at a predetermined rotation angle (θ/2), and is emitted from the variable faraday rotator 433. The optical signal emitted from the variable faraday rotator 433 is reflected by the reflection mirror 434, and reenters the variable faraday rotator 433. A plane of polarization of the light beam which has reentered the variable faraday rotator 433 is further rotated by a rotation angle of θ/2, and the light beam is emitted from the variable faraday rotator 433. A DGD is added to the light beam whose plane of polarization has been rotated by θ, and the light beam is converted into an optical signal in the collimator 431. As described above, since an optical path is turned back by the reflection mirror 434, a DGD is added twice. In other words, the variable DGD generator generates a primary PMD and a secondary PMD with respect to an optical signal.

In the PMD addition device 43, the properties of the birefringent medium 432 or the rotation angle θ of the variable faraday rotator 433 is set in such a way that a PMD can be generated to a degree to which the input optical signal cannot be reproduced from an optical signal to be output.

Figure 25:
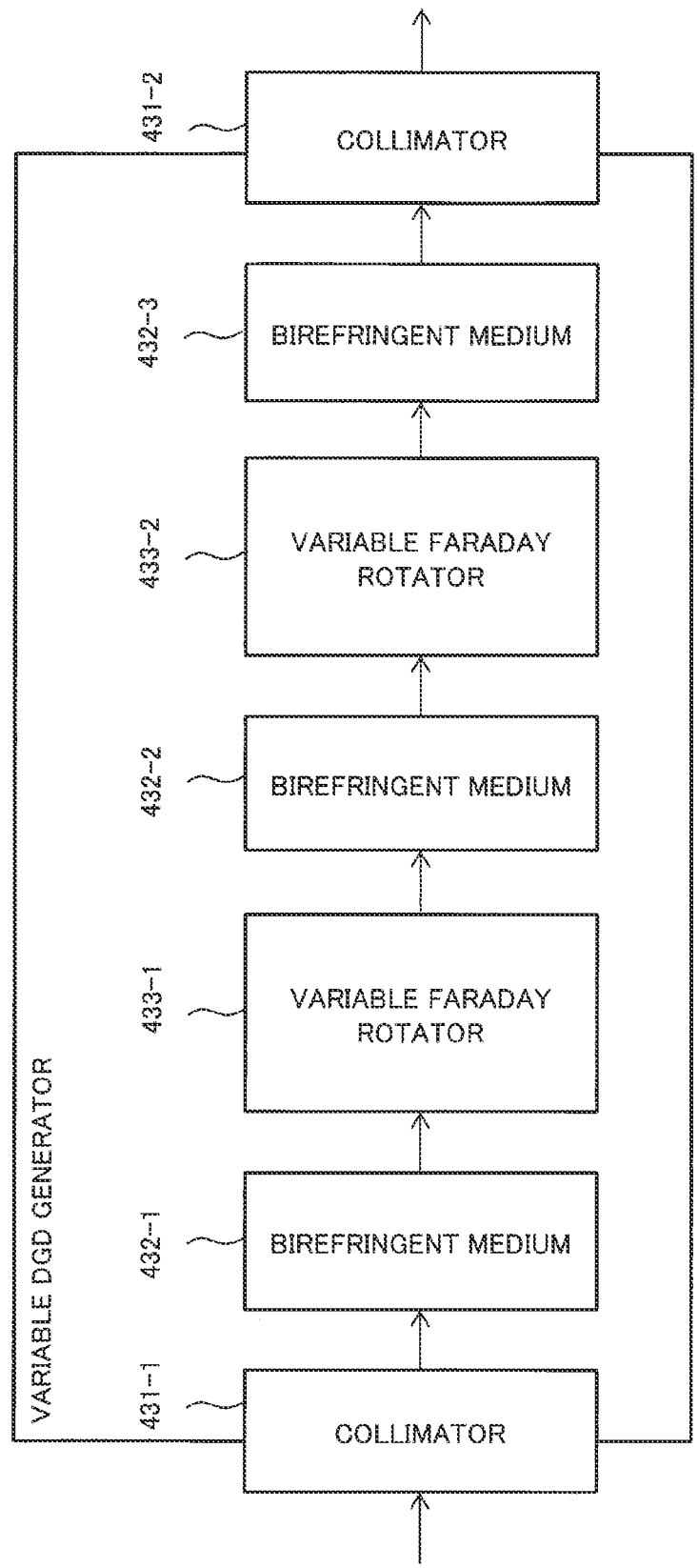
FIG. 25 is a diagram illustrating another configuration example of a variable DGD generator in the eighth exemplary embodiment of the present invention.

For the birefringent medium 432, for example, an electrooptic crystal such as lithium niobate or lanthanum lead titanate zirconate can be used. As illustrated in FIG. 25, the variable DGD generator may be configured by arranging the collimator 431, the birefringent medium 432, and the variable faraday rotator 433 in series without using the reflection mirror 434.

Figure 26:
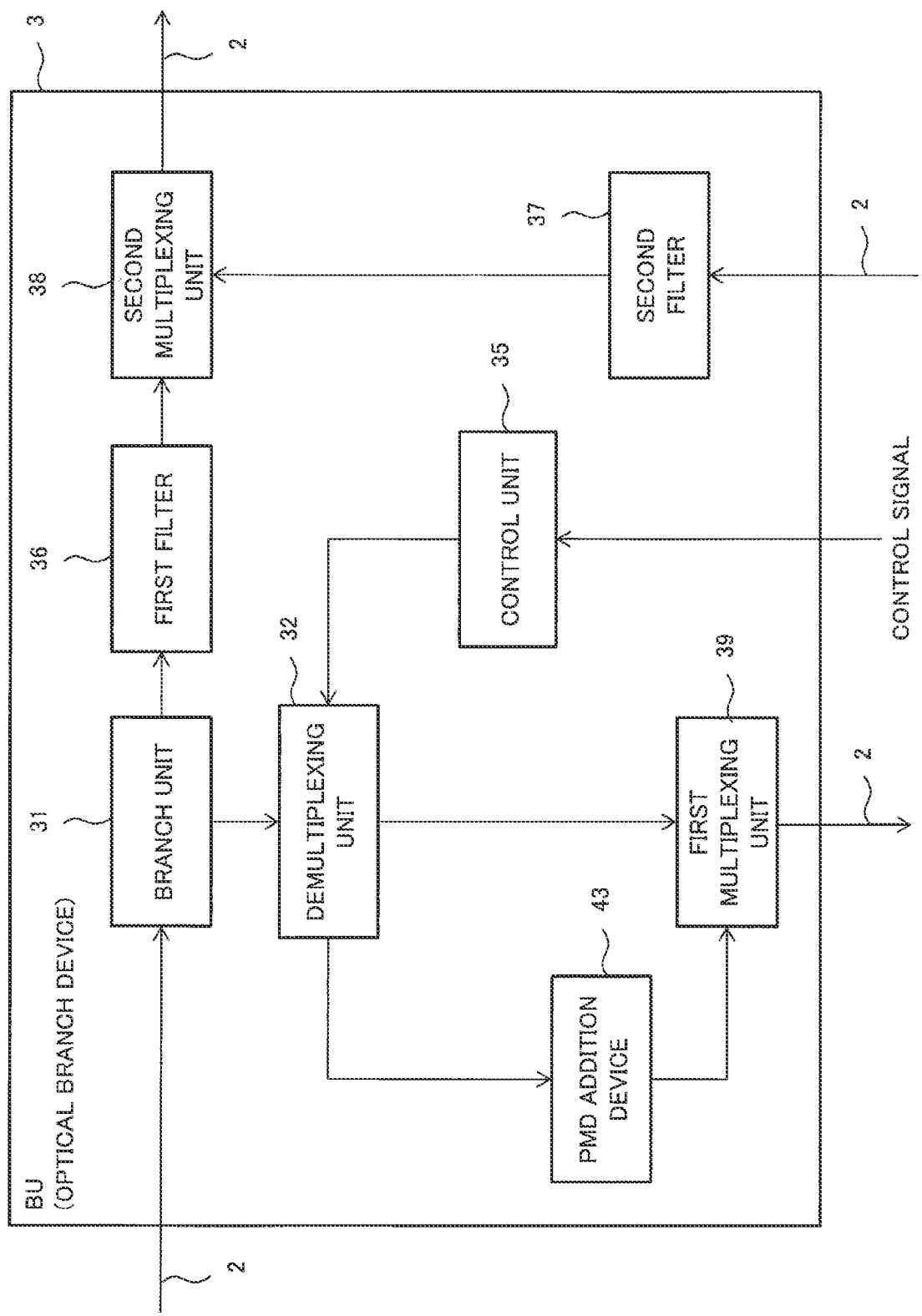
FIG. 26 is a configuration example of the optical branch device 3 in the eighth exemplary embodiment of the present invention.

FIG. 26 is a configuration example of the optical branch device 3 in the eighth exemplary embodiment of the present invention. As illustrated in FIG. 26, the optical branch device 3 includes the PMD addition device 43 in place of the processing unit 33. The PMD addition device 43 generates a PMD in an optical signal input from the demultiplexing unit 32, and inputs the optical signal to the first multiplexing unit 39.

The optical branch device 3 in the eighth exemplary embodiment of the present invention passes, for example, an optical signal destined for the optical reception device 1-1, among optical signals included in a wavelength multiplexed optical signal to be transmitted to the optical transmission/reception device 1-3, to the PMD addition device 43, and generates a PMD with respect to the optical signal. As a result, the optical transmission/reception device 1-3 which has received an optical signal to which the PMD has been added cannot extract data superimposed on the optical signal. As a result, the optical branch device 3 in the eighth exemplary embodiment can make the optical signal irreproducible even when an optical signal including data is forwarded to a device which is not an original transmission destination, thereby securing secrecy of data included in the optical signal.

Ninth Exemplary Embodiment

A summary of a ninth exemplary embodiment of the present invention will be described with reference to the drawings. In the ninth exemplary embodiment of the present invention, a description of a configuration similar to the above-described exemplary embodiments of the present invention will be omitted.

The ninth exemplary embodiment of the present invention is an exemplary embodiment when the processing unit 33 of the optical branch device 3 is a highly nonlinear fibers (HNLF: Highly Nonlinear Fibers) 44 of FIG. 27 described below.

Here, for a highly nonlinear fibers 44, for example, a non-linear dispersion-shifting optical fiber of Japanese Patent No. 4070083 can be used. The non-linear dispersion-shifting optical fiber adds a nonlinear optics phenomenon to an input optical signal, thereby generating a phase modulation, a wavelength conversion, or the like. Examples of a nonlinear optics phenomenon in the non-linear dispersion-shifting optical fiber include four-wave mixing, self-phase modulation, cross phase modulation, and stimulated Brillouin scattering. When such a phenomenon is caused in the non-linear dispersion-shifting optical fiber, a wavelength conversion, phase modulation, scattering or the like occurs in the input optical signal, and a noise component in the optical signal increases, or the input optical signal cannot be sufficiently transmitted. For this reason, as the degree of wavelength conversion, phase modulation, scattering or the like generated in an optical signal increases, a receiving side device cannot reproduce information (data) superimposed on the input optical signal.

As mentioned above, the ninth exemplary embodiment of the present invention inputs an optical signal to the highly nonlinear fibers 44 to generate wavelength conversion, phase modulation, scattering or the like in the optical signal, thereby making data superimposed on the optical signal irreproducible.

A configuration example of an optical communication system in the ninth exemplary embodiment of the present invention is similar to FIG. 1.

Figure 27:
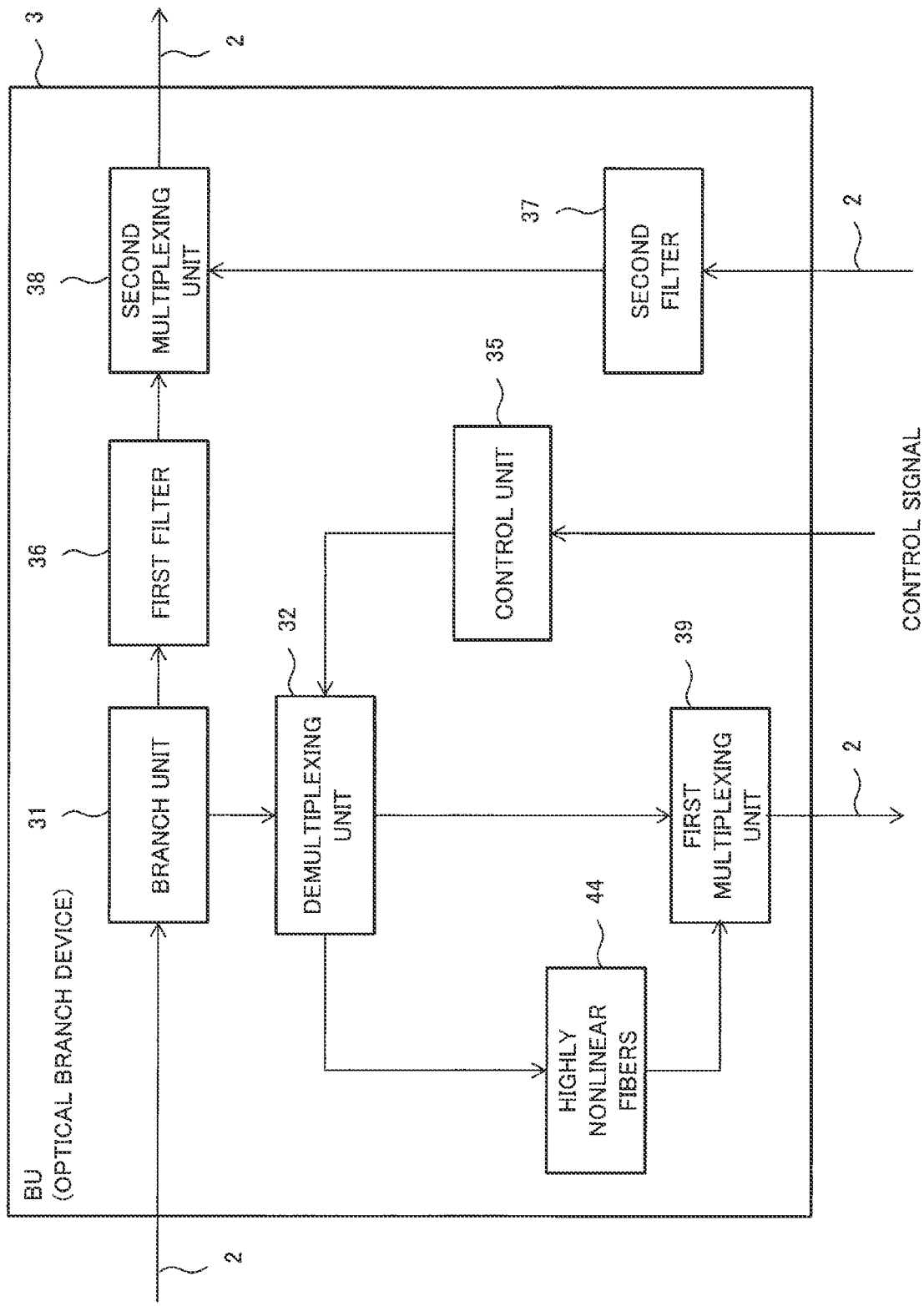
FIG. 27 is a configuration example of the optical branch device 3 in a ninth exemplary embodiment of the present invention.

FIG. 27 is a configuration example of the optical branch device 3 in the ninth exemplary embodiment of the present invention. As illustrated in FIG. 27, the optical branch device 3 includes the highly nonlinear fibers 44 in place of the processing unit 33. The waveform of an optical signal input from the demultiplexing unit 32 deteriorates while the optical signal transmits through the highly nonlinear fibers 44. The highly nonlinear fibers 44 input an optical signal whose waveform is deteriorated to the first multiplexing unit 39. In the ninth exemplary embodiment of the present invention, the length and properties of the highly nonlinear fibers 44 are set (adjusted) in such a way that the waveform of the input optical signal can be deteriorated to a degree to be irreproducible from an optical signal to be output.

The optical branch device 3 in the ninth exemplary embodiment of the present invention passes, for example, an optical signal destined for the optical reception device 1-1 through the highly nonlinear fibers 44, thereby making the optical signal irreproducible in the optical transmission/reception device 1-3. As a result, the optical branch device 3 in the ninth exemplary embodiment of the present invention can make the optical signal irreproducible even when an optical signal including data is forwarded to a device which is not an original transmission destination, thereby securing secrecy of data included in the optical signal.

Tenth Exemplary Embodiment

A summary of a tenth exemplary embodiment of the present invention will be described with reference to the drawings. In the tenth exemplary embodiment of the present invention, a description of a configuration similar to the above-described exemplary embodiments will be omitted.

In the tenth exemplary embodiment of the present invention, a variable filter is arranged in the optical branch device 3 illustrated in FIG. 6 in place of the demultiplexing unit 32, and the control unit 35 specifies a wavelength of an optical signal which passes through the variable filter. The control unit 35 instructs the processing unit 33 to output an optical signal having a wavelength corresponding to the wavelength of an optical signal to be blocked by the variable filter and having a predetermined pattern. The wavelength corresponding to the wavelength of an optical signal is, for example, the same wavelength as that of the optical signal.

Figure 28:
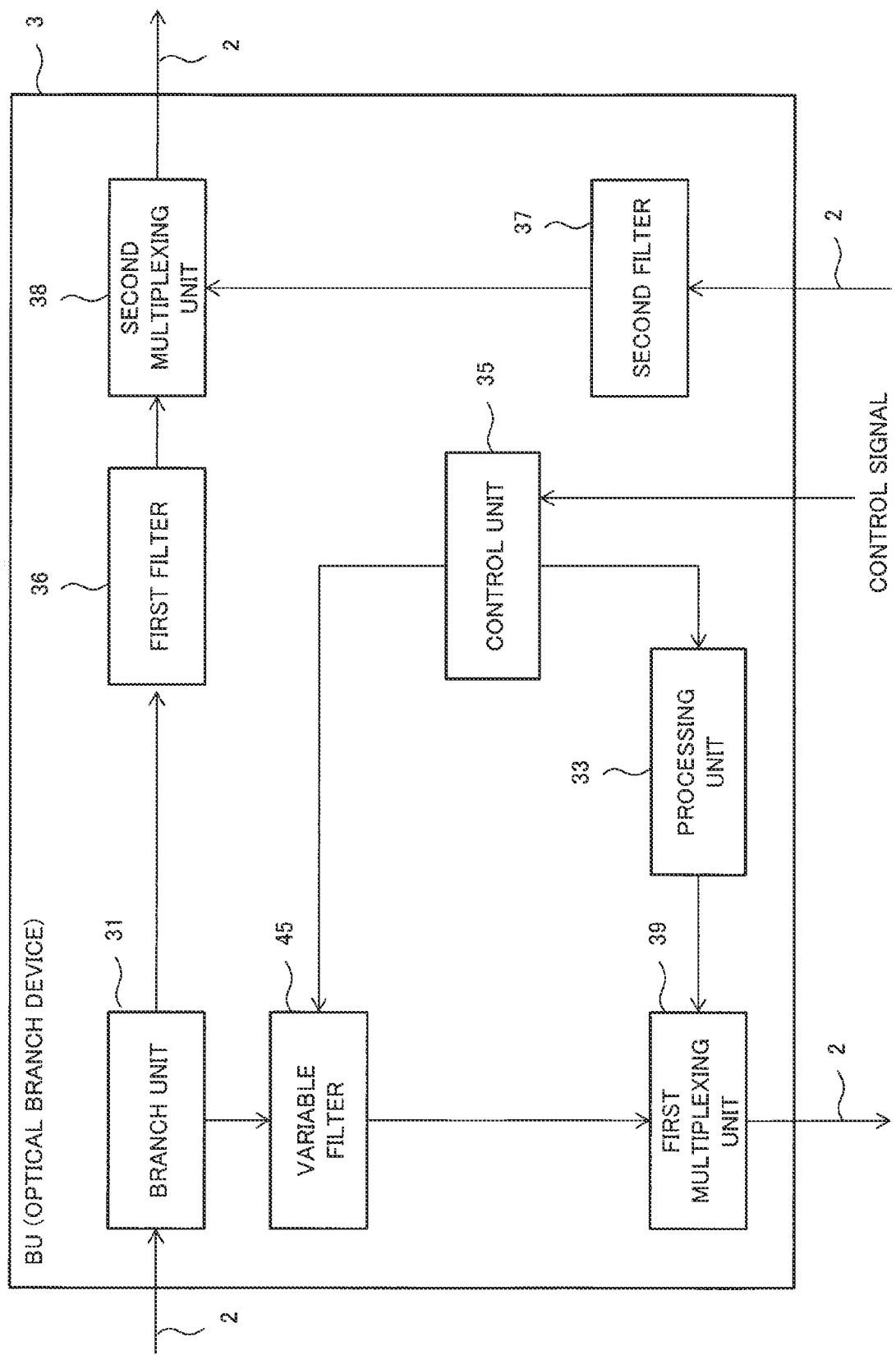
FIG. 28 is a diagram illustrating a configuration example of the optical branch device 3 in a tenth exemplary embodiment of the present invention.

FIG. 28 is a diagram illustrating a configuration example of the optical branch device 3 in the tenth exemplary embodiment of the present invention. The optical branch device 3 comprises a variable filter 45 in place of the demultiplexing unit 32.

The variable filter 45 passes only an optical signal having a predetermined wavelength among wavelength multiplexed optical signals input from the branch unit 31 based on an instruction from the control unit 35. The variable filter 45 inputs an optical signal which has passed therethrough to the first multiplexing unit 39.

The control unit 35, for example, notifies a wavelength of an optical signal to pass among wavelength multiplexed optical signals based on a control signal. On the other hand, the control unit 35 specifies to the processing unit 33 a wavelength of an optical signal to be output. The wavelength of an optical signal to be output from the processing unit 33 is a wavelength corresponding to the wavelength of an optical signal blocked by the variable filter 45.

The processing unit 33 outputs an optical signal to which a predetermined processing has been applied to the first multiplexing unit 39.

The first multiplexing unit 39 outputs a wavelength multiplexed optical signal obtained by multiplexing an optical signal input from the variable filter 45 and an optical signal to which a predetermined processing has been applied input from the processing unit 33 to the optical transmission/reception device 1-3.

Figure 29:
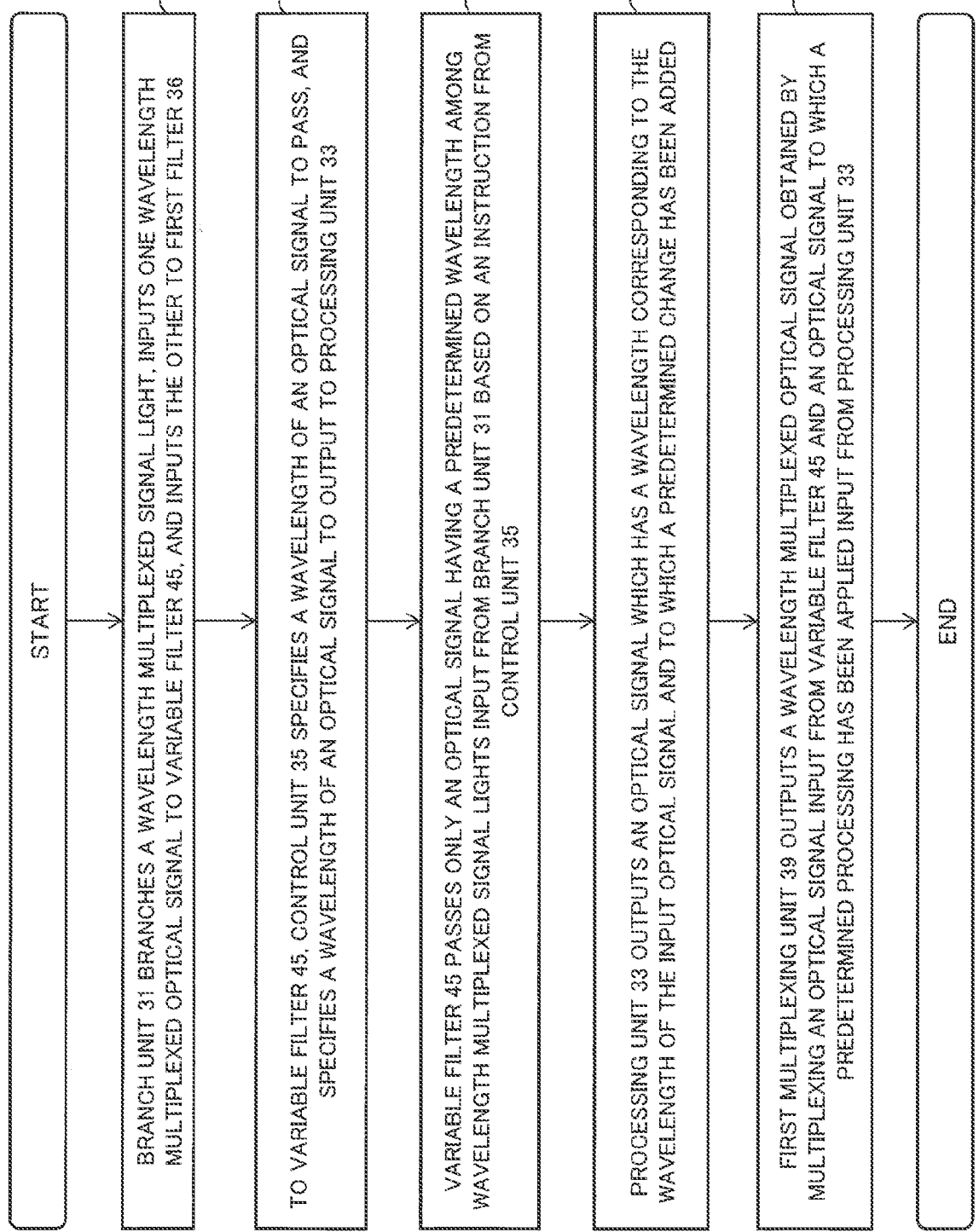
FIG. 29 is a flow chart illustrating an operational example of the optical branch device 3 in the tenth exemplary embodiment of the present invention.

FIG. 29 is a flow chart illustrating an operational example of the optical branch device 3 in the tenth exemplary embodiment of the present invention. FIG. 29 is an operational example when the optical branch device 3 outputs a wavelength multiplexed optical signal including an optical signal to which a predetermined processing has been applied.

The branch unit 31 branches a wavelength multiplexed optical signal input from the transmission path 2, inputs one wavelength multiplexed optical signal to the variable filter 45, and inputs the other to the first filter 36 (S801).

To the variable filter 45, the control unit 35 specifies a wavelength of an optical signal to pass, and specifies a wavelength of an optical signal to output to the processing unit 33 (S802).

The variable filter 45 passes only an optical signal having a predetermined wavelength among wavelength multiplexed optical signals input from the branch unit 31 based on an instruction from the control unit 35, and inputs the signal to the first multiplexing unit 39 (S803).

The processing unit 33 outputs an optical signal which has a wavelength corresponding to the wavelength specified by the control unit 35 and to which a predetermined processing has been applied (S804).

The first multiplexing unit 39 outputs a wavelength multiplexed optical signal obtained by multiplexing an optical signal input from the variable filter 45 and an optical signal to which a predetermined processing has been applied input from the processing unit 33 to the transmission path 2 (S805).

As mentioned above, the optical branch device 3 in the tenth exemplary embodiment of the present invention outputs the optical signal to which a predetermined processing has been applied in such a way that, for example, an original optical signal cannot be restored even when an optical signal destined for the optical reception device 1-1 is forwarded to the optical transmission/reception device 1-3. As a result, the optical branch device 3 can make a device which is not an original transmission destination not reproduce an optical signal including data, thereby securing secrecy of data included in the optical signal.

Eleventh Exemplary Embodiment

A summary of an eleventh exemplary embodiment of the present invention will be described with reference to the drawings. In the eleventh exemplary embodiment of the present invention, a description of a configuration similar to the above-described exemplary embodiments of the present invention will be omitted.

Figure 30:
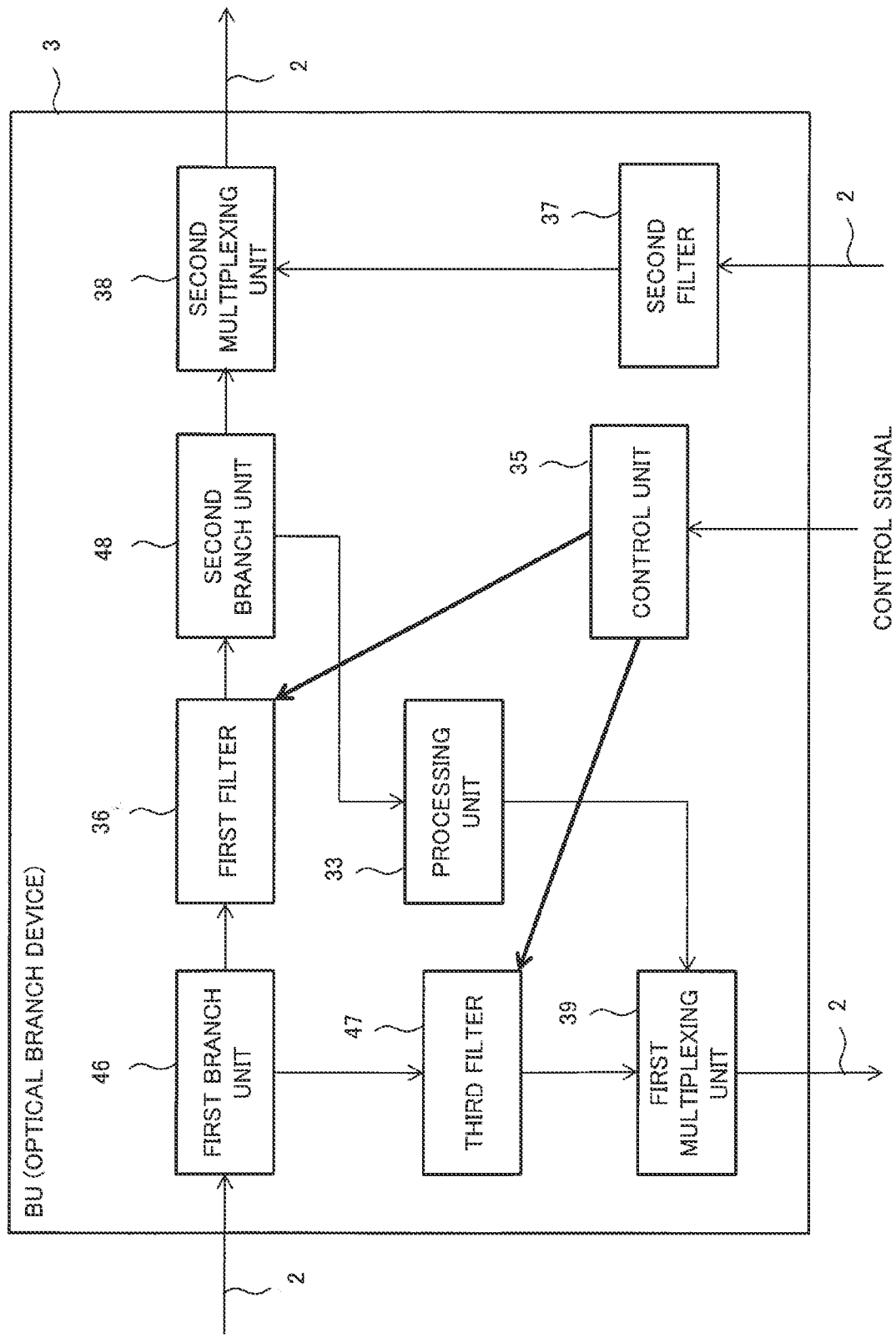
FIG. 30 is a diagram illustrating a configuration example of the optical branch device 3 in an eleventh exemplary embodiment of the present invention.

FIG. 30 is a diagram illustrating a configuration example of the optical branch device 3 in the eleventh exemplary embodiment of the present invention. The optical branch device 3 comprises a first filter 36, a first branch unit 46, and a third filter 47. The first branch unit 46 branches a wavelength multiplexed optical signal from the optical transmission device 1-2, inputs one to the third filter 47, and inputs the other to the first filter 36. The third filter 47 passes only an optical signal of an optical signal Sub-band 2 destined for the optical transmission/reception device 1-3 among wavelength multiplexed optical signals. On the other hand, first filter 36 passes only an optical signal of an optical signal destined for the optical reception device 1-1 Sub-band 1 among wavelength multiplexed optical signals.

The optical branch device 3 comprises a processing unit 33, a control unit 35, a second filter 37, a second multiplexing unit 38, a first multiplexing unit 39, and a second branch unit 48. The second branch unit 48 inputs an optical signal (Sub-band 1) input from the first filter 36 to the processing unit 33 and the second multiplexing unit 38.

The control unit 35 notifies a wavelength of an optical signal to pass to the first filter 36 and the third filter 47. The control unit 35 may receive a control signal for requesting replacement to an optical signal of a predetermined pattern, and specify a wavelength of an optical signal which passes through each of the first filter 36 and the third filter 47 based on the received control signal.

The processing unit 33 outputs an optical signal which has a wavelength corresponding to a wavelength of an optical signal to be output from the first filter 36 and to which a predetermined processing has been applied to the first multiplexing unit 39. The first multiplexing unit 39 outputs a wavelength multiplexed optical signal obtained by multiplexing an optical signal input from the third filter 47 and an optical signal to which a predetermined processing has been applied input from the processing unit 33 to the transmission path 2.

The second filter 37 passes an optical signal other than an optical signal to which a predetermined change has been applied included in a wavelength multiplexed optical signal from the optical transmission/reception device 1-3. The second multiplexing unit 38 outputs a wavelength multiplexed optical signal obtained by multiplexing an optical signal input from the second branch unit 48 and an optical signal input from the second filter 37 to the transmission path 2.

Figure 31:
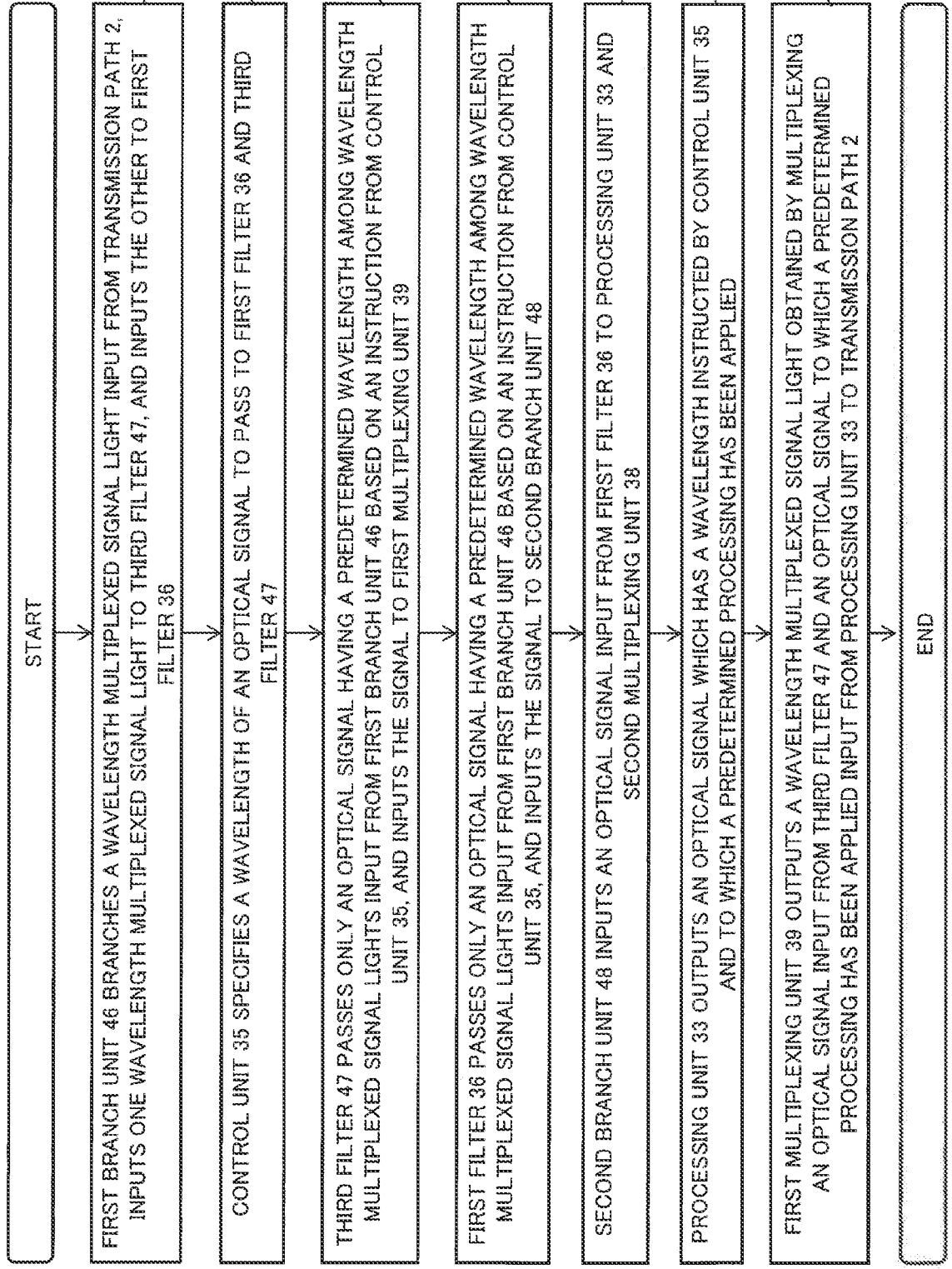
FIG. 31 is a flow chart illustrating an operational example of the optical branch device 3 in the eleventh exemplary embodiment of the present invention.

FIG. 31 is a flow chart illustrating an operational example of the optical branch device 3 in the eleventh exemplary embodiment of the present invention. FIG. 31 is an operational example when the optical branch device 3 outputs a wavelength multiplexed optical signal including an optical signal to which a predetermined processing is applied.

The first branch unit 46 branches a wavelength multiplexed optical signal input from the transmission path 2, inputs one wavelength multiplexed optical signal to the third filter 47, and inputs the other to the first filter 36 (S901).

The control unit 35 specifies a wavelength of an optical signal to pass to the first filter 36 and the third filter 47 (S902).

The third filter 47 passes only an optical signal having a predetermined wavelength among wavelength multiplexed optical signals input from the first branch unit 46 based on an instruction from the control unit 35, and inputs the signal to the first multiplexing unit 39 (S903).

The first filter 36 passes only an optical signal having a predetermined wavelength among wavelength multiplexed optical signals input from the first branch unit 46 based on an instruction from the control unit 35, and inputs the signal to the second branch unit 48 (S904).

The second branch unit 48 inputs an optical signal input from the first filter 36 to the processing unit 33 and the second multiplexing unit 38 (S905).

The processing unit 33 outputs an optical signal obtained by applying a predetermined processing to a light input from the second branch unit 48 (S906).

The first multiplexing unit 39 outputs a wavelength multiplexed optical signal obtained by multiplexing an optical signal input from the third filter 47 and an optical signal of a predetermined pattern input from the processing unit 33 to the transmission path 2 (S907).

As mentioned above, the optical branch device 3 in the eleventh exemplary embodiment of the present invention outputs the optical signal to which a predetermined processing has been applied in such a way that, for example, an original optical signal cannot be restored even when an optical signal destined for the optical reception device 1-1 is forwarded to the optical transmission/reception device 1-3. As a result, the optical branch device 3 can make a device which is not an original transmission destination of an optical signal including data not reproduce an optical signal including data, thereby securing secrecy of data included in the optical signal.

Twelfth Exemplary Embodiment

A twelfth exemplary embodiment of the present invention will be described with reference to the drawings. In the twelfth exemplary embodiment of the present invention, a description of a configuration similar to the above-described exemplary embodiments will be omitted.

In the twelfth exemplary embodiment of the present invention, when a failure is generated in a part of the transmission path 2 and an optical signal from a part of base stations disappears, a path is switched in the BU (optical branch device) 3 to compensate the disappeared optical signal by an optical signal from another base station. In this case, the optical transmission device 1-2 outputs an optical signal which is to be transmitted to a device which is not an original communication counterpart by converting the signal into an optical signal to which a predetermined change has been applied in advance to prevent the device which is not an original communication counterpart from receiving the optical signal used for the compensation.

The total power of an optical signal propagating in the transmission path 2 is set to be constant. When a part of wavelength components of the optical signal disappears by a breakage of the transmission path 2 or the like, the total power of the optical signal is kept constant by amplifying another wavelength component of the optical signal.

By increasing only the power of a specific wavelength component of an optical signal up to a predetermined value or larger, however, optical spectrum changes caused by deterioration of a waveform of the optical signal or the like by a nonlinear effect of an optical fiber, thereby deteriorating the transmission quality of the optical signal.

Accordingly, in the twelfth exemplary embodiment of the present invention, when an optical signal from a part of base stations is blocked and a part of wavelength components of an optical signal which is carried in the transmission path 2 disappears, the disappeared wavelength component is compensated by an optical signal from another base station. This prevents only the power of a specific wavelength component of an optical signal from increasing, thereby inhibiting deterioration of the transmission quality of the optical signal.

The optical signal used for compensation is, however, forwarded to a device which is not an original communication counterpart. Accordingly, in the twelfth exemplary embodiment of the present invention, the transponder 14 of the optical transmission device 1-2 converts an optical signal to be forwarded to a device which is not an original communication counterpart into an optical signal to which a change is applied in advance, and transmits the converted signal. As a result, an optical signal used for the compensation is not received by a device which is not an original transmission destination. In other words, in the twelfth exemplary embodiment of the present invention, a disappeared part of wavelength components of an optical signal propagating in the transmission path 2 can be compensated, and at the same time, an original optical signal is made irreproducible even when an optical signal used for compensation is received by a device which is not an original communication counterpart.

Figure 32:
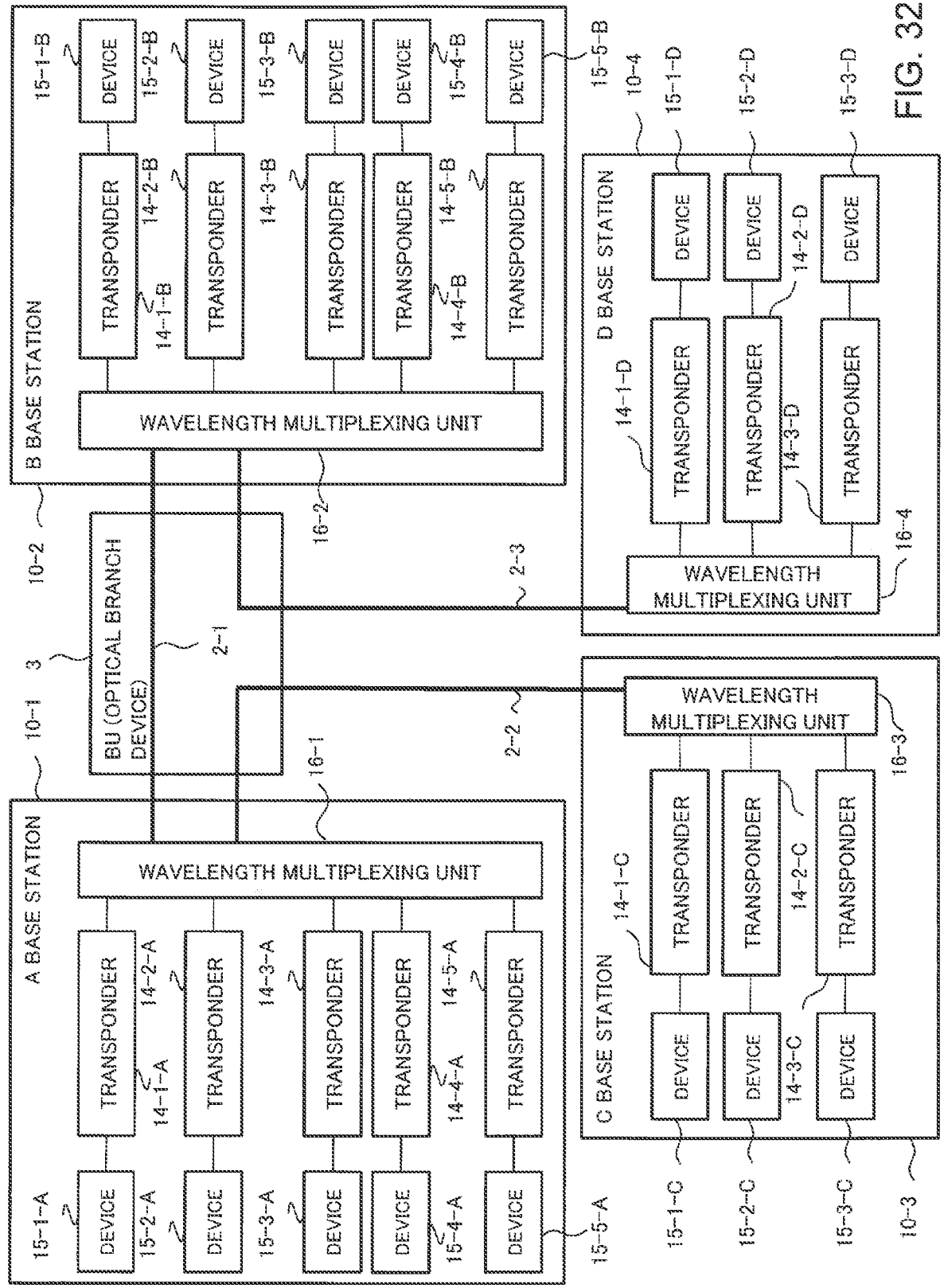
FIG. 32 is a diagram illustrating a configuration example of a communication system before a failure occurs in a transmission path 2 in a twelfth exemplary embodiment of the present invention.

FIG. 32 is a diagram illustrating a configuration example of a communication system before a failure occurs in the transmission path 2 in the twelfth exemplary embodiment of the present invention. As illustrated in FIG. 32, the communication system includes the A base station 10-1, the B base station 10-2, a C base station 10-3, a D base station 10-4, and the optical branch device 3 to which these base stations are connected. Each base station 10 includes the transponder 14, a client device 15, and wavelength multiplexing units 16-1 to 16-4. In FIG. 32, the client devices 15 are described as devices 15-1-A to 15-5-A, devices 15-1-B to 15-5-B, devices 15-1-C to 15-3-C, devices 15-1-D to 15-3-D. Similarly, the transponders 14 are also described in FIG. 32 distinguished by reference signs.

FIG. 33 is a table illustrating optical signals transmitted by an interval between an A base station 10-1 and the optical branch device 3 and an interval between the optical branch device 3 and a B base station 10-2 in the communication system illustrated in FIG. 32. Since a failure has not occurred in the transmission path 2, in both of an interval between the A base station 10-1 and the optical branch device 3 and an interval between the optical branch device 3 and the B base station 10-2, five pairs of the transponders 14 perform communication.

Figure 34:
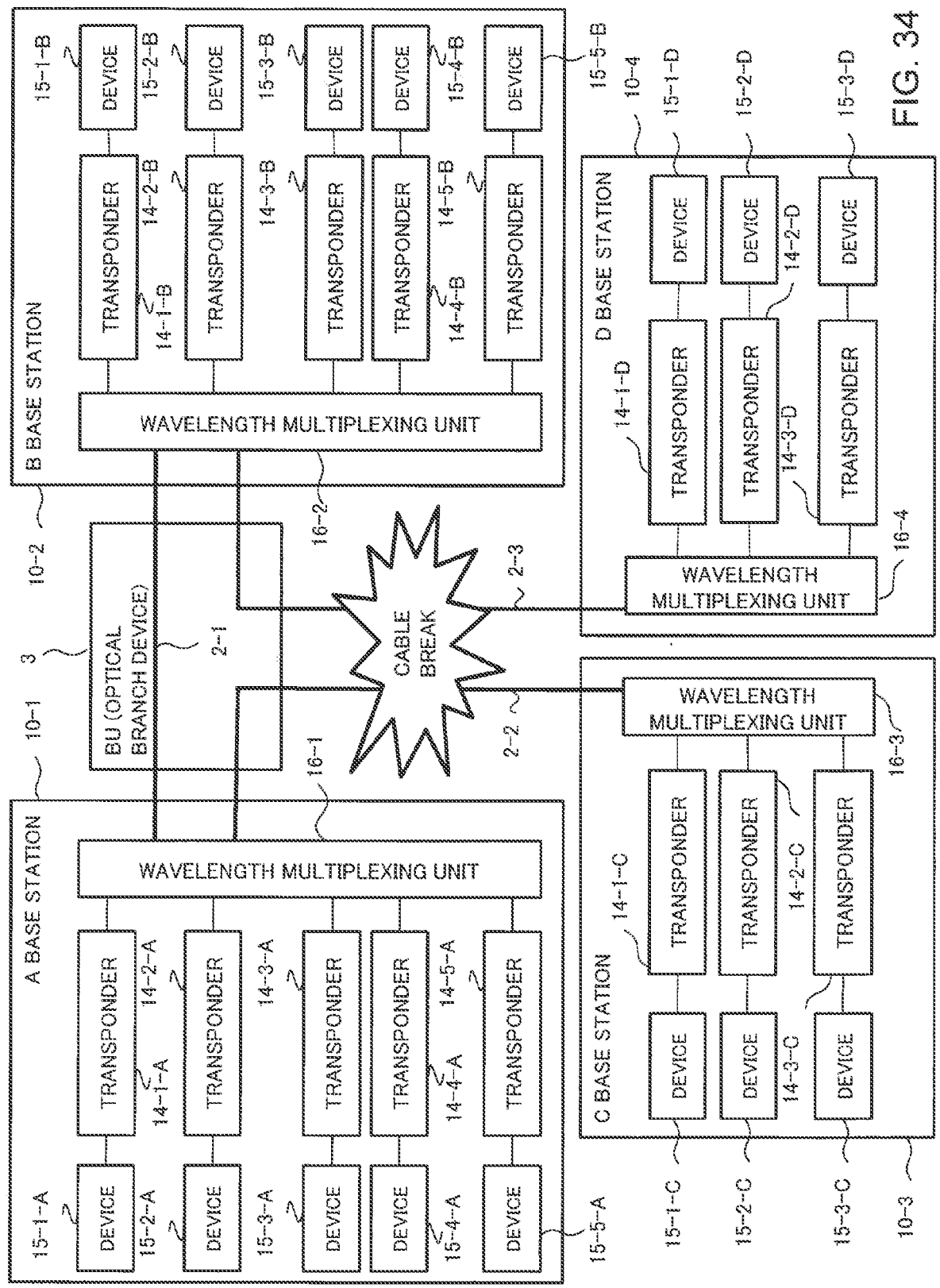
FIG. 34 is a configuration example of a communication system when a failure occurs in a part of the transmission path 2 and an optical signal from a part of the base stations 10 disappears in the twelfth exemplary embodiment of the present invention.

On the other hand, FIG. 34 is a configuration example of a communication system when a failure occurs in a part of the transmission path 2 and an optical signal from a part of the base stations 10 disappears in the twelfth exemplary embodiment of the present invention.

An example of a communication system of FIG. 34 is, for example, an example in which a failure has occurred in the transmission paths 2-2 and 2-3 between the C base station 10-3 and the D base station 10-4 and the optical branch device 3, and an optical signal from the C base station and the D base station to the optical branch device 3 has disappeared. Specifically, among optical signals transmitted in an interval between the A base station 10-1 and the optical branch device 3, and an interval between the optical branch device 3 and the B base station 10-2, a wavelength component of an optical signal which has been transmitted/received between the A base station 10-1 and the C base station 10-3, and between the B base station 10-2 and the D base station 10-4 disappears.

FIG. 35 is a table illustrating a connection relation of the transponder 14 which transmits/receives an optical signal in an interval between the A base station 10-1 and the optical branch device 3 and an interval between the optical branch device 3 and the B base station 10-2 of the communication system illustrated in FIG. 34. As described above, when a failure occurs in the transmission path 2 between the C base station and the D base station, and the optical branch device 3, a connection between the A base station 10-1 and the C base station 10-3, and a connection between the B base station 10-2 and the D base station 10-4 break. As a result, as illustrated in FIG. 35, in an interval between the A base station 10-1 and the optical branch device 3 and an interval between the optical branch device 3 and the B base station 10-2, only a communication between the A base station 10-1 and the B base station 10-2 survives.

When an optical signal is continued to be transmitted in the states of FIG. 34 and FIG. 35 (in a state in which a part of wavelength components disappears in a wavelength multiplexed optical signal), however, the transmission quality of an optical signal deteriorates as described above. Accordingly, in the twelfth exemplary embodiment of the present invention, the optical branch device 3 switches a path to compensate the disappeared optical signal by an optical signal from another base station.

In the twelfth exemplary embodiment of the present invention, the optical branch device 3 switches a path in such a way that an optical signal transmitted from the transponders 14-3-A, 14-4-A, and 14-5-A of the A base station 10-1 is received by the transponders 14-3-B, 14-4-B, and 14-5-B of the B base station 10-2.

FIG. 36 is a table illustrating a connection relation of the transponder 14 which transmits/receives an optical signal in an interval between the A base station 10-1 and the optical branch device 3 and an interval between the optical branch device 3 and the B base station 10-2 of a communication system after the optical branch device 3 has switched a path. When the optical branch device 3 switches a path, an optical signal transmitted/received between the transponder 14 of the A base station 10-1 and the transponder 14 of the C base station 10-3 is forwarded to the transponder 14 of the B base station 10-2, and a disappeared optical signal is compensated. An optical signal transmitted/received between the transponder 14 of the B base station 10-1 and the transponder 14 of the D base station 10-4 is forwarded to the transponder 14 of the A base station 10-1, and a disappeared optical signal is compensated.

An optical signal used for compensation is, however, forwarded to a device (i.e., the transponder 14 of the B base station 10-2 or the transponder 14 of the A base station 10-1) which is not an original communication counterpart.

Accordingly, in the twelfth exemplary embodiment of the present invention, an optical signal used for compensation may be an optical signal to which a predetermined processing has been applied by the optical branch device 3. Examples of the predetermined change include generating a primary PMD and a secondary PMD to an optical signal to be input or polarization modulation of an optical signal to be output. In other words, the demultiplexing unit 32 of the optical branch device 3 inputs an optical signal (for example, an optical signal output from the transponder 14-3-A of the A base station 10-1) used for compensation to the processing unit 33, and outputs the signal in place of an optical signal to which a predetermined change has been applied. By outputting an optical signal to which a predetermined change has been applied, the transponder 14-3-B of the B base station 10-2 cannot reproduce an original optical signal even when an optical signal including data (i.e., an optical signal output from the transponder 14-3-A of the A base station 10-1) is received.

In the twelfth exemplary embodiment of the present invention, the transponder 14 in the optical transmission device 1-2 may output an optical signal to which a predetermined change has been applied in place of an optical signal including data. For example, an optical signal transmitted from the transponder 14-3-A of the A base station 10-1 is used for compensation, and is received by the transponder 14-3-B of the B base station 10-2. A device of an original communication counterpart of the transponder 14-3-B of the B base station 10-2 is a transponder 14-1-D of the D base station 10-4. In this case, the transponder 14-3-A of the A base station 10-1 outputs an optical signal to which a predetermined change has been applied in place of an optical signal (optical signal to be forwarded to a device which is not a device of an original communication counterpart) used for compensation. By outputting an optical signal to which a predetermined change has been applied, the transponder 14-3-B of the B base station 10-2 cannot reproduce an original optical signal even when the optical signal is received.

In the twelfth exemplary embodiment of the present invention, as mentioned above, when a failure is generated in the transmission path 2 and an optical signal from a part of base stations disappears, a path in the optical branch device 3 is switched to compensate the disappeared optical signal by an optical signal from anther base station. This prevents only the power of a specific wavelength component of an optical signal from increasing, thereby inhibiting deterioration of the transmission quality of the optical signal. In this case, an optical signal used by the optical branch device 3 for compensation is an optical signal to which a predetermined processing has been applied. As a result, a device which is not a device of an original communication counterpart cannot reproduce an original optical signal even when an optical signal including data is received. As a result, the optical branch device 3 can prevent a device which is not an original transmission destination from receiving an optical signal including data, thereby securing secrecy of data included in the optical signal.

In the twelfth exemplary embodiment of the present invention, the transponder 14 on the transmitting side converts an optical signal used for compensation, which is an optical signal including data, into an optical signal to which a predetermined change has been applied. As a result, a device which is not a device of an original communication counterpart cannot reproduce an original optical signal even when the optical signal is received. As a result, the optical transmission device 1-2 can prevent a device which is not an original transmission destination from receiving an optical signal including data, thereby securing secrecy of data included in the optical signal.

Thirteenth Exemplary Embodiment

A thirteenth exemplary embodiment of the present invention will be described with reference to the drawings. In the thirteenth exemplary embodiment of the present invention, a description of a configuration similar to the above-described exemplary embodiment will be omitted.

Figure 37:
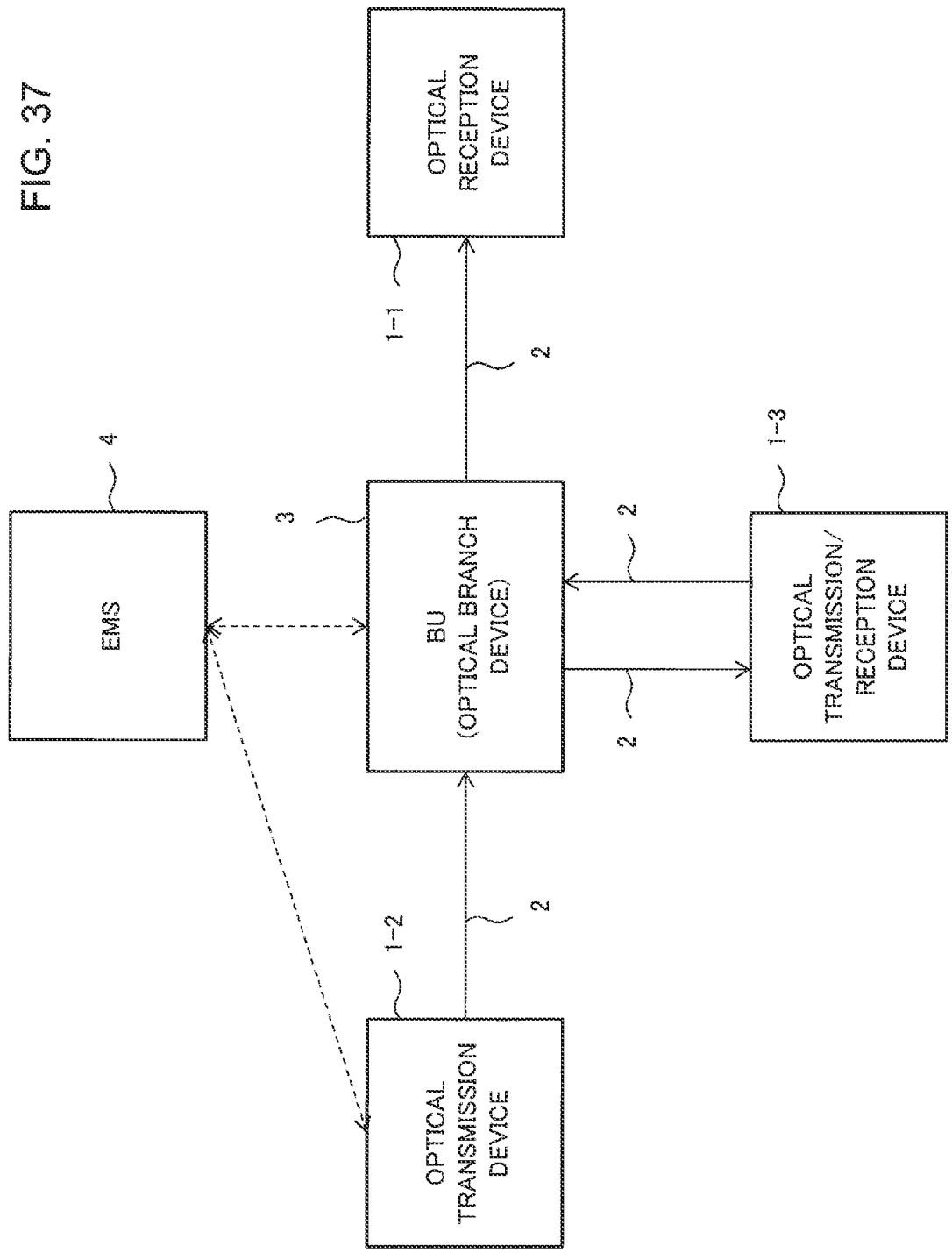
FIG. 37 is a configuration example of an optical communication system in a thirteenth exemplary embodiment of the present invention.

FIG. 37 is a configuration example of an optical communication system in the thirteenth exemplary embodiment of the present invention. As illustrated in FIG. 37, the optical communication system includes the optical reception device 1-1, the optical transmission device 1-2, the optical transmission/reception device 1-3, the transmission path 2, the optical branch device 3, and an EMS (Element Management System) 4. The configurations of the optical reception device 1-1, the optical transmission device 1-2, the optical transmission/reception device 1-3, the transmission path 2 and the optical branch device 3 are similar to those of the optical reception device 1-1, the optical transmission device 1-2, the optical transmission/reception device 1-3, the transmission path 2, and the optical branch device 3 of the above-described exemplary embodiments.

The EMS 4 is a device which performs network management of an optical communication system, and collects information about a communication path of an optical signal from a device included in the optical communication system. The EMS 4 detects a failure which has occurred in the transmission path 2 based on the information about a communication path, and requests the optical branch device 3 to switch a path. The EMS 4 requests to switch a path in such a way that an optical signal transmitted from the transponders 14-3-A, 14-4-A and 14-5-A of the A base station 10-1 is received by the transponders 14-3-B, 14-4-B, and 14-5-B of the B base station 10-2 when a failure occurs in the transmission path 2 between the C base station and the D base station and the optical branch device 3, as illustrated in FIG. 34.

When a path of the optical branch device 3 is switched, in order to make an optical signal to be used for compensation an optical signal to which a predetermined change has been applied, the EMS 4 instructs the demultiplexing unit 32 in the optical branch device 3 to input the optical signal to be used for compensation to the processing unit 33. When a failure occurs in the transmission path 2 between the C base station and the D base station, and the optical branch device, as illustrated in FIG. 34, the EMS 4 requests demultiplexing unit 32 to convert an optical signal output from the transponders 14-3-A, 14-4-A, and 14-5-A of the A base station 10-1 into an optical signal to which a predetermined change has been applied. This prevents the B base station from receiving an optical signal output from the transponders 14-3-A, 14-4-A and 14-5-A of the A base station 10-1.

The demultiplexing unit 32 requested from the EMS 4 inputs an optical signal to be used for compensation to the processing unit 33 based on the request.

When a predetermined processing is applied to an optical signal having a predetermined wavelength in the optical branch device 3, the EMS may notify the predetermined wavelength to the optical transmission/reception device 1-3. When the notification is received, the optical transmission/reception device 1-3 can apply a predetermined change to an optical signal output from the output unit 11 (transponder 14) which receives an optical signal having the notified predetermined wavelength.

The EMS 4, when a failure occurred in the transmission path 2 is detected, requests the processing unit 33 of the transponder 14 included in the optical transmission device 1-2 to add a predetermined processing to an optical signal. The EMS 4, when a failure occurs in the transmission path 2 between the C base station and the D base station and the optical branch device as illustrated in FIG. 34, requests the processing unit 33 of the transponders 14-3-A, 14-4-A and 14-5-A of the A base station 10-1 to add a predetermined processing to an optical signal.

In response to a request from the EMS 4, the processing unit 33 requested from the EMS 4 outputs, in place of the input electric signal, an electric signal including a dummy pattern in which 0 and 1 are randomly arranged, or a fixed pattern in which 0 and 1 are arranged in a specific pattern, or an electric signal in which a bit string is randomly reshuffled.

As mentioned above, in the thirteenth exemplary embodiment of the present invention, the EMS 4 instructs the demultiplexing unit 32 of the optical branch device 3 to input an optical signal used for compensation to the processing unit 33. As a result, the optical branch device 3 can prevent an optical signal including data from being forwarded to a device which is not an original transmission destination, thereby securing secrecy of data included in the optical signal.

The EMS 4 performs network management, and requests the optical branch device 3 to switch a path or requests the optical transmission device 1-2 to add a predetermined processing to an optical signal and transmit the signal. As a result, the optical transmission device 1-2 can prevent an optical signal including data from being forwarded to a device which is not an original transmission destination while keeping the power of an optical signal transmitted in the transmission path 2 constant, thereby securing secrecy of data included in the optical signal.

Fourteenth Exemplary Embodiment

A fourteenth exemplary embodiment of the present invention will be described. In the fourteenth exemplary embodiment, a computer, a CPU (Central Processing Unit), an MPU (Micro-Processing Unit), or the like of the optical transmission device 1-2, the optical branch device 3, or the optical transmission/reception device 1-3 executes a software (program) which realizes a function of each of the above-described exemplary embodiments. In the fourteenth exemplary embodiment of the present invention, a device which executes the software (program) is not limited to the optical transmission device 1-2, the optical branch device 3, or the optical transmission/reception device 1-3, and any device can be employed.

In the fourteenth exemplary embodiment of the present invention, the optical transmission device 1-2, the optical branch device 3, or the optical transmission/reception device 1-3 acquires a software (program) which realizes a function of each of the above-described exemplary embodiments via various storage media such as a CD-R (Compact Disc Recordable) or via a network. A program which the optical transmission device 1-2, the optical branch device 3, or the optical transmission/reception device 1-3 acquires, or a storage medium storing the program constitutes the present invention. The software (program) may be stored, for example, in a predetermined storage unit included in the optical transmission device 1-2, the optical branch device 3 or the optical transmission/reception device 1-3.

A computer, a CPU, an MPU, or the like of the optical transmission device 1-2, the optical branch device 3, or the optical transmission/reception device 1-3 reads a program code of the acquired software (program), and executes the program code. As a result, the same processing as the processing of the optical transmission device 1-2, the optical branch device 3 or the optical transmission/reception device 1-3 in each of the above-described exemplary embodiments is executed.

The fourteenth exemplary embodiment of the present invention can be applied to uses such as a program realized in a computer, a CPU, an MPU, or the like of the optical transmission device 1-2, the optical branch device 3, or the optical transmission/reception device 1-3.

Although exemplary embodiments of the present invention have been described, the present invention is not limited to the above-described exemplary embodiments. The present invention can be carried out based on variations, substitutions, or adjustment of each exemplary embodiment. The present invention can also be carried out in any combination of the exemplary embodiments. In other words, the present invention involves various variations or modifications which can be realized in accordance with all the content of the disclosure and technical ideas herein.

This application claims priority based on Japanese Patent Application No. 2014-066137 filed on Mar. 27, 2014, the entire disclosure of which is herein incorporated.

A part or the whole of the above-described exemplary embodiments may also be described as the following supplementary notes, but the present invention is not limited thereto.

[Supplementary Note 1]

An optical transmission/reception device comprising:
a demultiplexing unit which receives a wavelength multiplexed optical signal, and demultiplexes the signal into a plurality of optical signals;
a plurality of reception units which receive each of the plurality of optical signals demultiplexed by the demultiplexing unit;
a plurality of output units which respectively output optical signals having different wavelengths;
a control unit which requests to apply a predetermined change to an optical signal output from at least one of the plurality of output units when the received wavelength multiplexed optical signal includes an optical signal to which a predetermined processing is applied; and
a multiplexing unit which multiplexes the plurality of optical signals output from the plurality of output units and outputs the multiplexed signal.

[Supplementary Note 2]

The optical transmission/reception device according to supplementary note 1, wherein the control unit requests to apply the predetermined change to an optical signal output from an output unit corresponding to a reception unit which has received the optical signal to which a predetermined processing is applied.

[Supplementary Note 3]

The optical transmission/reception device according to supplementary note 1 or 2, wherein each of the plurality of output units, when requested from the control unit, adds a predetermined pattern to the optical signal to be output as the predetermined change.

[Supplementary Note 4]

The optical transmission/reception device according to any one of supplementary notes 1 to 3, wherein each of the plurality of output units, when requested from the control unit, scrambles the optical signal to be output as the predetermined change.

[Supplementary Note 5]

The optical transmission/reception device according to any one of supplementary notes 1 to 4, wherein each of the plurality of output units, when requested from the control unit, deteriorates transmission characteristics of the optical signal to be output as the predetermined change.

[Supplementary Note 6]

The optical transmission/reception device according to any one of supplementary notes 1 to 5, wherein each of the plurality of output units comprises a processing unit which applies a predetermined change to the optical signal to be output when requested from the control unit.

[Supplementary Note 7]

An optical communication system comprising:
an optical communication device which outputs a wavelength multiplexed optical signal; and
an optical transmission/reception device comprising:
 a demultiplexing unit which receives the wavelength multiplexed optical signal, and demultiplexes the signal into a plurality of optical signals;
 a plurality of reception units which receive each of the plurality of optical signals demultiplexed by the demultiplexing unit;
 a plurality of output units which respectively output optical signals having different wavelengths;
 a control unit which requests to apply a predetermined change to an optical signal output from at least one of the plurality of output units when the received wavelength multiplexed optical signal includes an optical signal to which a predetermined processing is applied; and a multiplexing unit which multiplexes the plurality of optical signals output from the plurality of output units and outputs the multiplexed signal.

[Supplementary Note 8]

The optical communication system according to supplementary note 7, wherein the optical communication device adds the predetermined processing to an optical signal other than an optical signal destined for the optical transmission/reception device among optical signals included in the wavelength multiplexed optical signal.

[Supplementary Note 9]

The optical communication system according to supplementary note 7 or 8, further comprising a control device which notifies a wavelength of an optical signal to which the optical communication device has applied the predetermined processing to the optical transmission/reception device, wherein the control unit requests an output unit which outputs an optical signal having a wavelength notified by the control device to apply a predetermined change to the optical signal to be output.

[Supplementary Note 10]

An optical communication method comprising:

receiving a wavelength multiplexed optical signal, requesting to apply a predetermined change to an optical signal to be output when the received wavelength multiplexed optical signal includes an optical signal to which a predetermined processing is applied, multiplexing a plurality of optical signals having different wavelengths including an optical signal to which the predetermined change has been applied, and outputting the multiplexed signal.

[Supplementary Note 11]

The optical communication method according to supplementary note 10, the method comprising adding a predetermined pattern to the optical signal to be output in response to the request.

[Supplementary Note 12]

The optical communication method according to supplementary note 10 or 11, the method comprising scrambling the optical signal to be output in response to the request.

[Supplementary Note 13]

The optical communication method according to any one of supplementary notes 10 to 12, the method comprising deteriorating transmission characteristics of the optical signal to be output in response to the request.

[Supplementary Note 14]

A program which allows a computer to execute:

a processing to receive a wavelength multiplexed optical signal;

a processing to request to apply a predetermined change to an optical signal to be output when the received wavelength multiplexed optical signal includes an optical signal to which a predetermined processing is applied; and a processing to multiplex a plurality of optical signals having different wavelengths including the optical signal to which a predetermined change has been applied, and to output.

[Supplementary Note 15]

The program according to supplementary note 14, comprising a processing to add a predetermined pattern to the optical signal to be output in response to the request.

[Supplementary Note 16]

The program according to supplementary note 14 or 15, comprising a processing to scramble the optical signal to be output in response to the request.

[Supplementary Note 17]

The program according to any one of supplementary notes 14 to 16, comprising a processing to deteriorate transmission characteristics of the optical signal to be output in response to the request.

REFERENCE SIGNS LIST 1-1 optical reception device
1-2 optical transmission device
1-3 optical transmission/reception device
2, 2-1, 2-2, 2-3 transmission path
3 optical branch device
4 EMS
11, 11-1, 11-N output unit
12 multiplexing unit
13 control unit
14, 14-1, 14-N transponder
15, 15-1, 15-N client device
16, 16-1, 16-N wavelength multiplexing unit
17 reception unit
18 demultiplexing unit
19 optical multiplexing/demultiplexing unit
30 reception unit
31 branch unit
32 demultiplexing unit
33 processing unit
34 multiplexing unit
35 control unit
36 first filter
37 second filter
38 second multiplexing unit
39 first multiplexing unit
40 first WSS
41 second WSS
42 polarization scrambler
43 PMD addition device
44 highly nonlinear fibers
45 variable filter
46 first branch unit
47 third filter
48 second branch unit
121 transmission unit
122 multiplexing unit
123 control unit
124, 124-1, 124-N transponder
141 client module
142 Framer LSI
143 processing unit
144 line module
145 polarization scrambler
241 client module
242 Framer LSI
243 processing unit
244 line module
431, 431-1, 431-2 collimator
432, 432-1, 432-2, 432-3 birefringent medium
433, 433-1, 433-2 variable faraday rotator
434 reflection mirror

The invention claimed is:

1. An optical transmission device comprising:

a transponder configured to output an optical signal; and a multiplexer configured to output a multiplexed optical signal including the optical signal to a transmission path, wherein
the transponder is further configured to, in response to a failure in the transmission path, apply a process to the optical signal.

2. The optical transmission device according to claim 1, further comprising:
a controller configured to send a processing request to the transponder, wherein
the controller is further configured to:
receive a control signal in response to the failure in the transmission path, and
send the processing request after receiving the control signal, and
the transponder is further configured to, in response to the processing request from the controller, apply the process to the optical signal.

3. The optical transmission device according to claim 1, further comprising:
a controller configured to send a processing request to the transponder, wherein
the controller is further configured to:
receive a control signal in response to switching a destination of the optical signal, and
send the processing request after receiving the control signal, and
the transponder is further configured to, in response to the processing request from the controller, apply the process to the optical signal.

4. The optical transmission device according to claim 1, wherein, in response to the failure in the transmission path, the transponder is further configured to add a predetermined pattern to the optical signal.

5. The optical transmission device according to claim 1, wherein, in response to the failure in the transmission path, the transponder is further configured to scramble the optical signal.

6. The optical transmission device according to claim 1, wherein, in response to the failure in the transmission path, the transponder is further configured to degrade optical properties of the optical signal.

7. An optical communication system comprising:
an optical transmission device configured to output a multiplexed optical signal; and
an optical reception device configured to receive the multiplexed optical signal, wherein the optical transmission device comprises:
a transponder configured to output an optical signal; and
a multiplexer configured to output the multiplexed optical signal including the optical signal to a transmission path, wherein
the transponder is further configured to, in response to a failure in the transmission path, apply a process to the optical signal.

8. The optical communication system according to claim 7, further comprising:
a controller configured to send a processing request to the transponder, wherein
the controller is further configured to:
receive a control signal in response to the failure in the transmission path; and
send the processing request after receiving the control signal, and
the transponder is further configured to, in response to the processing request from the controller, apply the process to the optical signal.

9. The optical communication system according to claim 7, further comprising:
a controller configured to send a processing request to the transponder, wherein
the controller is further configured to:
receive a control signal in response to switching a destination of the optical signal; and
send the processing request after receiving the control signal, and
the transponder is further configured to, in response to the processing request from the controller, apply the process to the optical signal.

10. The optical communication system according to claim 7, wherein, in response to the failure in the transmission path, the transponder is further configured to add a predetermined pattern to the optical signal.

11. The optical communication system according to claim 7, wherein, in response to the failure in the transmission path, the transponder is further configured to scramble the optical signal.

12. The optical communication system according to claim 7, wherein, in response to the failure in the transmission path, the transponder is further configured to degrade optical properties of the optical signal.

13. An optical communication method performed inside an optical transmission device, the optical communication method comprising:
generating an optical signal;
applying a process to the optical signal in response to a failure in a transmission path;
outputting a multiplexed optical signal including the optical signal to the transmission path;
receiving a control signal in response to switching a destination of the optical signal;
sending a processing request after receiving the control signal; and
applying the process to the optical signal in response to the processing request.

14. The optical communication method according to claim 13, further comprising, in response to the failure in the transmission path, adding a predetermined pattern to the optical signal.

15. The optical communication method according to claim 13, further comprising, in response to the failure in the transmission path, scrambling the optical signal.

16. The optical communication method according to claim 13, further comprising, in response to the failure in the transmission path, degrading optical properties of the optical signal.

* * * * *